US009212493B2

(12) United States Patent
Cappelle et al.

(10) Patent No.: US 9,212,493 B2
(45) Date of Patent: Dec. 15, 2015

(54) METHODS FOR MANUFACTURING AND PACKAGING FLOOR PANELS, DEVICES USED THEREBY, AS WELL AS FLOOR PANEL AND PACKED SET OF FLOOR PANELS

(71) Applicant: FLOORING INDUSTRIES LIMITED, SARL, Bertrange (LU)

(72) Inventors: Mark Cappelle, Staden (BE); Lode De Boe, Moorslede (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 14/285,988

(22) Filed: May 23, 2014

(65) Prior Publication Data

US 2014/0250810 A1    Sep. 11, 2014

Related U.S. Application Data

(60) Continuation of application No. 13/752,972, filed on Jan. 29, 2013, now Pat. No. 8,826,622, which is a
(Continued)

(30) Foreign Application Priority Data

Mar. 31, 2005  (BE) .................................. 2005/0169
Jan. 12, 2006  (BE) .................................. 2006/0024

(51) Int. Cl.
*E04F 15/02* (2006.01)
*F16B 5/00* (2006.01)
(Continued)

(52) U.S. Cl.
CPC ............ *E04F 15/02038* (2013.01); *B27B 5/06* (2013.01); *B27B 31/006* (2013.01);
(Continued)

(58) Field of Classification Search
CPC ............ E04F 15/02038; E04F 2201/03; E04F 2201/00; E04F 2201/01; E04F 2201/0107; E04F 2201/0115; E04F 2201/0123; E04F 2201/013; E04F 2201/0138; E04F 2201/0146; E04F 2201/0153; E04F 2201/0161; E04F 2201/0169; E04F 2201/0176; E04F 2201/0184; E04F 2201/0192; E04F 2201/02; E04F 15/02; E04F 15/04; E04F 15/02033; F16B 5/004; F16B 5/008; F16B 5/0012; F16B 5/0016
USPC .............................................. 52/589.1, 592.1
See application file for complete search history.

(56) References Cited

U.S. PATENT DOCUMENTS 124,228 A    3/1872    Stuart
753,791 A    3/1904    Fulghum
(Continued)

FOREIGN PATENT DOCUMENTS

CA    2 456 513 A1    2/2003
DE    202 05 774 U1    8/2002
(Continued)

*Primary Examiner* — Andrew J Triggs
(74) *Attorney, Agent, or Firm* — Workman Nydegger

(57) ABSTRACT

A method for manufacturing floor panels, wherein boards of laminate material are formed by means of a press treatment and wherein these boards are divided into several panels, from which the actual floor panels are formed. In a press treatment of the method, at least one impression is provided in the board, which at least is employed as a guiding groove for guiding the aforementioned board or the subsequently obtained panels in further treatments.

18 Claims, 21 Drawing Sheets

Related U.S. Application Data continuation of application No. 12/494,480, filed on Jun. 30, 2009, now Pat. No. 8,375,679, which is a division of application No. 11/887,363, filed as application No. PCT/IB2006/000993 on Mar. 28, 2006, now Pat. No. 8,161,701.

(60) Provisional application No. 60/672,538, filed on Apr. 19, 2005.

(51) Int. Cl.

| | | |
|---|---|---|
| *B27B 5/06* | (2006.01) | |
| *B27B 31/00* | (2006.01) | |
| *B27B 31/06* | (2006.01) | |
| *B27C 5/06* | (2006.01) | |
| *B27F 1/06* | (2006.01) | |
| *B27F 5/02* | (2006.01) | |
| *E04F 15/04* | (2006.01) | |
| *B65B 5/00* | (2006.01) | |
| *B65B 35/44* | (2006.01) | |
| *B65B 11/00* | (2006.01) | |

(52) U.S. Cl.
 CPC ............... *B27B 31/06* (2013.01); *B27C 5/06* (2013.01); *B27F 1/06* (2013.01); *B27F 5/026* (2013.01); *B65B 5/00* (2013.01); *B65B 11/004* (2013.01); *B65B 35/44* (2013.01); *E04F 15/02* (2013.01); *E04F 15/02033* (2013.01); *E04F 15/04* (2013.01); *F16B 5/0004* (2013.01); *F16B 5/0008* (2013.01); *F16B 5/008* (2013.01); *F16B 5/0012* (2013.01); *E04F 2201/00* (2013.01); *E04F 2201/01* (2013.01); *E04F 2201/013* (2013.01); *E04F 2201/0107* (2013.01); *E04F 2201/0115* (2013.01); *E04F 2201/0123* (2013.01); *E04F 2201/0138* (2013.01); *E04F 2201/0146* (2013.01); *E04F 2201/0153* (2013.01); *E04F 2201/0161* (2013.01); *E04F 2201/0176* (2013.01); *E04F 2201/0184* (2013.01); *E04F 2201/0192* (2013.01); *E04F 2201/02* (2013.01); *E04F 2201/03* (2013.01); *F16B 5/0016* (2013.01); *Y10T 156/1041* (2015.01)

(56) References Cited

U.S. PATENT DOCUMENTS

| | | | |
|---|---|---|---|
| 1,194,636 A | 8/1916 | Joy | |
| 1,331,018 A | 2/1920 | Luthy | |
| 1,723,306 A | 8/1929 | Sipe | |
| 1,743,492 A | 1/1930 | Sipe | |
| 1,809,393 A | 6/1931 | Rockwell | |
| 1,859,667 A * | 5/1932 | Gruner | 52/578 |
| 1,902,716 A | 3/1933 | Newton | |
| 2,026,511 A | 12/1935 | Storm | |
| 2,184,113 A | 12/1939 | Calafati | |
| 2,204,675 A | 6/1940 | Grunert | |
| 2,517,939 A | 8/1950 | Stewart | |
| 2,559,261 A | 7/1951 | Schwartz | |
| 2,596,280 A | 5/1952 | Nystrom | |
| 2,666,233 A | 1/1954 | Klemm | |
| 2,732,706 A | 1/1956 | Friedman | |
| 2,740,167 A | 4/1956 | Rowley | |
| 2,863,185 A | 12/1958 | Riedi | |
| 2,865,058 A | 12/1958 | Andersson et al. | |
| 3,023,681 A | 3/1962 | Worson | |
| 3,077,703 A | 2/1963 | Bergstrom | |
| 3,177,279 A | 4/1965 | Bilodeau | |
| 3,271,787 A | 9/1966 | Clary | |
| 3,325,585 A | 6/1967 | Brenneman | |
| 3,350,827 A | 11/1967 | Sugar | |
| 3,378,958 A | 4/1968 | Parks et al. | |
| 3,387,422 A | 6/1968 | Wanzer | |
| 3,396,640 A | 8/1968 | Fujihara | |
| 3,512,324 A | 5/1970 | Reed | |
| 3,517,927 A | 6/1970 | Kennel | |
| 3,526,071 A | 9/1970 | Watanabe | |
| 3,535,844 A | 10/1970 | Glaros | |
| 3,572,224 A | 3/1971 | Perry | |
| 3,579,941 A | 5/1971 | Tibbals | |
| 3,594,979 A | 7/1971 | Branson et al. | |
| 3,641,730 A | 2/1972 | Meckstroth | |
| 3,720,027 A | 3/1973 | Christensen | |
| 3,731,445 A | 5/1973 | Hoffmann et al. | |
| 3,742,669 A | 7/1973 | Mansfeld | |
| 3,760,547 A | 9/1973 | Brenneman | |
| 3,778,954 A | 12/1973 | Meserole | |
| 3,786,608 A | 1/1974 | Boettcher | |
| 3,835,620 A | 9/1974 | Boltz et al. | |
| 3,849,235 A | 11/1974 | Gwynne | |
| 3,919,820 A | 11/1975 | Green | |
| 3,950,915 A | 4/1976 | Cole | |
| 3,980,173 A | 9/1976 | Riggs | |
| 4,030,852 A | 6/1977 | Hein | |
| 4,064,571 A | 12/1977 | Phipps | |
| 4,080,086 A | 3/1978 | Watson | |
| 4,082,129 A | 4/1978 | Morelock | |
| 4,100,710 A | 7/1978 | Kowallik | |
| 4,107,892 A | 8/1978 | Bellem | |
| 4,113,399 A | 9/1978 | Hansen, Sr. | |
| 4,169,688 A | 10/1979 | Toshio | |
| 4,196,554 A | 4/1980 | Anderson et al. | |
| 4,227,430 A | 10/1980 | Jansson et al. | |
| 4,299,070 A | 11/1981 | Oltmanns et al. | |
| 4,304,083 A | 12/1981 | Anderson | |
| 4,426,820 A | 1/1984 | Terbrack et al. | |
| 4,471,012 A | 9/1984 | Maxwell | |
| 4,479,333 A | 10/1984 | Hendrich | |
| 4,512,131 A | 4/1985 | Laramore | |
| 4,538,392 A | 9/1985 | Hamar et al. | |
| 4,599,841 A | 7/1986 | Haid | |
| 4,648,165 A | 3/1987 | Whitehorne | |
| 4,819,932 A | 4/1989 | Trotter, Jr. | |
| 5,007,222 A | 4/1991 | Raymond | |
| 5,024,045 A | 6/1991 | Fluent et al. | |
| 5,071,282 A | 12/1991 | Brown | |
| 5,109,898 A | 5/1992 | Schacht | |
| 5,113,632 A | 5/1992 | Hanson | |
| 5,135,597 A | 8/1992 | Barker | |
| 5,148,850 A | 9/1992 | Urbanick | |
| 5,173,012 A | 12/1992 | Ortwein et al. | |
| 5,182,892 A | 2/1993 | Chase | |
| 5,247,773 A | 9/1993 | Weir | |
| 5,295,341 A | 3/1994 | Kajiwara | |
| 5,344,700 A | 9/1994 | McGath et al. | |
| 5,348,778 A | 9/1994 | Knipp et al. | |
| 5,454,212 A | 10/1995 | Tanaka | |
| 5,465,546 A | 11/1995 | Buse | |
| 5,542,537 A | 8/1996 | Ford | |
| 5,548,937 A | 8/1996 | Shimonohara | |
| 5,598,682 A | 2/1997 | Haughian | |
| 5,618,602 A | 4/1997 | Nelson | |
| 5,634,309 A | 6/1997 | Polen | |
| 5,694,730 A | 12/1997 | Del Rincon et al. | |
| 5,706,621 A | 1/1998 | Pervan | |
| 5,755,068 A | 5/1998 | Ormiston | |
| 5,860,267 A | 1/1999 | Pervan | |
| 5,862,912 A | 1/1999 | Schelhorn | |
| 5,899,038 A | 5/1999 | Stroppiana | |
| 5,950,389 A | 9/1999 | Porter | |
| 6,006,486 A | 12/1999 | Moriau et al. | |
| 6,023,907 A | 2/2000 | Pervan | |
| 6,052,960 A | 4/2000 | Yonemura | |
| 6,065,262 A | 5/2000 | Motta | |
| 6,101,778 A | 8/2000 | Martensson | |
| 6,173,548 B1 | 1/2001 | Hamar et al. | |
| 6,182,410 B1 | 2/2001 | Pervan | |
| 6,203,653 B1 | 3/2001 | Seidner | |
| 6,209,278 B1 * | 4/2001 | Tychsen | 52/592.4 |
| 6,216,409 B1 * | 4/2001 | Roy et al. | 52/589.1 |

(56) References Cited

U.S. PATENT DOCUMENTS

| | | |
|---|---|---|
| 6,231,961 B1 | 5/2001 | Sperber |
| 6,254,301 B1 | 7/2001 | Hatch |
| 6,256,952 B1 | 7/2001 | Fahy, Jr. et al. |
| 6,272,437 B1 | 8/2001 | Woods et al. |
| 6,295,779 B1 | 10/2001 | Canfield |
| 6,314,701 B1 | 11/2001 | Meyerson |
| 6,324,803 B1 | 12/2001 | Pervan |
| 6,330,980 B1 | 12/2001 | Fiedrich |
| 6,358,352 B1 | 3/2002 | Schmidt |
| 6,363,677 B1 | 4/2002 | Chen et al. |
| 6,385,936 B1 | 5/2002 | Schneider |
| 6,397,547 B1 | 6/2002 | Martensson |
| 6,418,683 B1 | 7/2002 | Martensson et al. |
| 6,440,538 B1 | 8/2002 | Ungar |
| 6,446,405 B1 | 9/2002 | Pervan |
| 6,446,413 B1 | 9/2002 | Gruber |
| 6,450,235 B1 | 9/2002 | Lee |
| 6,465,046 B1 | 10/2002 | Hansson et al. |
| 6,490,836 B1 | 12/2002 | Moriau et al. |
| 6,505,452 B1 | 1/2003 | Hannig et al. |
| 6,510,665 B2 | 1/2003 | Pervan |
| 6,516,579 B1 | 2/2003 | Pervan |
| 6,532,709 B2 | 3/2003 | Pervan |
| 6,536,178 B1 | 3/2003 | Palsson et al. |
| 6,550,206 B2 | 4/2003 | Lee |
| 6,553,724 B1 | 4/2003 | Bigler |
| 6,576,079 B1 | 6/2003 | Kai |
| 6,591,568 B1 | 7/2003 | Palsson |
| 6,601,359 B2 * | 8/2003 | Olofsson ............... 52/588.1 |
| 6,617,009 B1 | 9/2003 | Chen et al. |
| 6,647,689 B2 * | 11/2003 | Pletzer et al. ............... 52/592.1 |
| 6,647,690 B1 * | 11/2003 | Martensson ............... 52/601 |
| 6,651,400 B1 | 11/2003 | Murphy |
| 6,681,820 B2 | 1/2004 | Olofsson |
| 6,691,480 B2 | 2/2004 | Garcia |
| 6,729,091 B1 | 5/2004 | Martensson |
| 6,763,643 B1 | 7/2004 | Martensson |
| 6,766,622 B1 | 7/2004 | Thiers |
| 6,769,219 B2 | 8/2004 | Schwitte et al. |
| 6,769,835 B2 | 8/2004 | Stridsman |
| 6,772,568 B2 | 8/2004 | Thiers et al. |
| 6,786,019 B2 | 9/2004 | Thiers |
| 6,802,164 B1 | 10/2004 | Newbrough et al. |
| 6,802,166 B1 | 10/2004 | Gerhard |
| 6,804,926 B1 | 10/2004 | Eisermann |
| 6,854,235 B2 | 2/2005 | Martensson |
| 6,862,857 B2 | 3/2005 | Tychsen |
| 6,863,768 B2 | 3/2005 | Haffner et al. |
| 6,865,855 B2 | 3/2005 | Knauseder |
| 6,874,291 B1 | 4/2005 | Weber |
| 6,874,292 B2 | 4/2005 | Moriau et al. |
| 6,880,307 B2 | 4/2005 | Schwitte et al. |
| 6,898,913 B2 | 5/2005 | Pervan |
| 6,920,732 B2 | 7/2005 | Martensson |
| 6,922,964 B2 | 8/2005 | Pervan |
| 6,922,965 B2 | 8/2005 | Rosenthal et al. |
| 6,928,779 B2 | 8/2005 | Moriau et al. |
| 6,931,811 B2 | 8/2005 | Thiers |
| 6,955,020 B2 | 10/2005 | Moriau et al. |
| 6,966,161 B2 | 11/2005 | Palsson et al. |
| 6,993,877 B2 | 2/2006 | Moriau et al. |
| 7,021,019 B2 | 4/2006 | Knauseder |
| 7,040,068 B2 | 5/2006 | Moriau et al. |
| 7,051,486 B2 | 5/2006 | Pervan |
| 7,055,290 B2 | 6/2006 | Thiers |
| 7,121,058 B2 * | 10/2006 | Palsson et al. ............... 52/592.2 |
| 7,131,242 B2 * | 11/2006 | Martensson et al. ......... 52/591.3 |
| RE39,439 E | 12/2006 | Pervan |
| 7,149,633 B2 | 12/2006 | Woods et al. |
| 7,152,383 B1 | 12/2006 | Wilkinson, Jr. et al. |
| 7,188,456 B2 | 3/2007 | Knauseder |
| 7,219,392 B2 | 5/2007 | Mullet et al. |
| 7,249,445 B2 | 7/2007 | Thiers |
| 7,251,916 B2 | 8/2007 | Konzelmann et al. |
| 7,328,536 B2 | 2/2008 | Moriau et al. |
| 7,332,053 B2 | 2/2008 | Palsson et al. |
| 7,337,588 B1 | 3/2008 | Moebus |
| 7,377,081 B2 | 5/2008 | Ruhdorfer |
| 7,441,385 B2 | 10/2008 | Palsson et al. |
| 7,444,791 B1 | 11/2008 | Pervan |
| 7,451,578 B2 | 11/2008 | Hannig |
| 7,454,875 B2 | 11/2008 | Pervan et al. |
| 7,467,499 B2 | 12/2008 | Moriau et al. |
| 7,484,337 B2 | 2/2009 | Hecht |
| 7,497,058 B2 | 3/2009 | Martensson |
| 7,516,588 B2 | 4/2009 | Pervan |
| 7,533,500 B2 | 5/2009 | Morton et al. |
| 7,552,568 B2 | 6/2009 | Palsson et al. |
| 7,556,849 B2 | 7/2009 | Thompson et al. |
| 7,568,322 B2 | 8/2009 | Pervan |
| 7,584,583 B2 * | 9/2009 | Bergelin et al. ............... 52/588.1 |
| 7,591,116 B2 | 9/2009 | Thiers et al. |
| 7,596,920 B2 * | 10/2009 | Konstanczak ............... 52/589.1 |
| 7,614,197 B2 | 11/2009 | Nelson |
| 7,617,645 B2 | 11/2009 | Moriau et al. |
| 7,617,651 B2 | 11/2009 | Grafenauer |
| 7,621,092 B2 | 11/2009 | Groeke et al. |
| 7,621,093 B2 | 11/2009 | Thiers et al. |
| 7,621,094 B2 | 11/2009 | Moriau et al. |
| 7,632,561 B2 | 12/2009 | Thiers |
| 7,634,884 B2 | 12/2009 | Pervan et al. |
| 7,634,886 B2 | 12/2009 | Moriau et al. |
| 7,634,887 B2 | 12/2009 | Moriau et al. |
| 7,637,066 B2 | 12/2009 | Moriau et al. |
| 7,637,067 B2 | 12/2009 | Moriau et al. |
| 7,637,068 B2 | 12/2009 | Pervan |
| 7,640,708 B2 | 1/2010 | Moriau et al. |
| 7,644,554 B2 | 1/2010 | Moriau et al. |
| 7,644,555 B2 | 1/2010 | Moriau et al. |
| 7,644,557 B2 | 1/2010 | Moriau et al. |
| 7,647,741 B2 | 1/2010 | Moriau et al. |
| 7,647,743 B2 | 1/2010 | Moriau et al. |
| 7,650,727 B2 | 1/2010 | Moriau et al. |
| 7,650,728 B2 | 1/2010 | Moriau et al. |
| 7,654,054 B2 | 2/2010 | Moriau et al. |
| 7,658,048 B2 | 2/2010 | Moriau et al. |
| 7,661,238 B2 | 2/2010 | Moriau et al. |
| 7,665,265 B2 | 2/2010 | Moriau et al. |
| 7,665,266 B2 | 2/2010 | Moriau et al. |
| 7,665,267 B2 | 2/2010 | Moriau et al. |
| 7,665,268 B2 | 2/2010 | Moriau et al. |
| 7,669,376 B2 | 3/2010 | Moriau et al. |
| 7,669,377 B2 | 3/2010 | Moriau et al. |
| 7,673,431 B2 | 3/2010 | Moriau et al. |
| 7,677,005 B2 | 3/2010 | Pervan |
| 7,677,008 B2 | 3/2010 | Moriau et al. |
| 7,681,371 B2 | 3/2010 | Moriau et al. |
| 7,698,868 B2 | 4/2010 | Moriau et al. |
| 7,698,869 B2 | 4/2010 | Moriau et al. |
| 7,707,793 B2 | 5/2010 | Moriau et al. |
| 7,712,280 B2 | 5/2010 | Moriau et al. |
| 7,721,503 B2 | 5/2010 | Pervan et al. |
| 7,726,089 B2 | 6/2010 | Moriau et al. |
| 7,735,288 B2 | 6/2010 | Moriau et al. |
| 7,757,452 B2 | 7/2010 | Pervan |
| 7,757,453 B2 | 7/2010 | Moriau et al. |
| 7,770,350 B2 | 8/2010 | Moriau et al. |
| 7,779,596 B2 | 8/2010 | Pervan |
| 7,802,415 B2 | 9/2010 | Pervan et al. |
| 7,806,624 B2 | 10/2010 | McLean et al. |
| 7,810,297 B2 | 10/2010 | Moriau et al. |
| 7,827,754 B2 | 11/2010 | Moriau et al. |
| 7,827,755 B2 | 11/2010 | Moriau et al. |
| 7,841,144 B2 | 11/2010 | Pervan |
| 7,841,145 B2 | 11/2010 | Pervan et al. |
| 7,841,150 B2 | 11/2010 | Pervan |
| 7,842,212 B2 | 11/2010 | Thiers |
| 7,856,784 B2 | 12/2010 | Martensson |
| 7,856,785 B2 | 12/2010 | Pervan |
| 7,866,110 B2 | 1/2011 | Pervan |
| 7,896,571 B1 | 3/2011 | Hannig et al. |
| 7,908,816 B2 | 3/2011 | Grafenauer et al. |
| 7,913,471 B2 | 3/2011 | Pervan |
| 7,918,062 B2 | 4/2011 | Chen |

(56) References Cited

U.S. PATENT DOCUMENTS

| | | |
|---|---|---|
| 7,954,295 B2 | 6/2011 | Pervan |
| 8,006,458 B1 | 8/2011 | Olofsson et al. |
| 8,011,155 B2 | 9/2011 | Pervan |
| 8,024,904 B2 | 9/2011 | Hannig |
| 8,042,311 B2 | 10/2011 | Pervan et al. |
| 8,079,196 B2 | 12/2011 | Pervan |
| 8,132,384 B2 | 3/2012 | Hannig |
| 8,146,318 B2 | 4/2012 | Palsson et al. |
| 8,161,701 B2 | 4/2012 | Cappelle et al. |
| 8,166,723 B2 | 5/2012 | Moriau et al. |
| 8,234,831 B2 | 8/2012 | Pervan |
| 8,245,478 B2 * | 8/2012 | Bergelin et al. .............. 52/592.1 |
| 8,276,342 B2 | 10/2012 | Martensson |
| 8,281,549 B2 * | 10/2012 | Du .............................. 52/747.1 |
| 8,293,058 B2 | 10/2012 | Pervan et al. |
| 8,365,494 B2 | 2/2013 | Moriau et al. |
| 8,387,327 B2 | 3/2013 | Pervan |
| 8,429,869 B2 | 4/2013 | Pervan |
| 8,535,589 B2 | 9/2013 | Thiers |
| 8,544,233 B2 | 10/2013 | Palsson et al. |
| 8,578,675 B2 | 11/2013 | Palsson et al. |
| 8,584,423 B2 * | 11/2013 | Pervan et al. ................ 52/588.1 |
| 8,631,621 B2 | 1/2014 | Hannig |
| 8,661,762 B2 * | 3/2014 | Martensson et al. ......... 52/591.3 |
| 8,677,714 B2 | 3/2014 | Pervan |
| 8,707,650 B2 | 4/2014 | Pervan et al. |
| 2001/0054565 A1 | 12/2001 | McCown et al. |
| 2002/0007609 A1 | 1/2002 | Pervan |
| 2002/0014047 A1 | 2/2002 | Thiers |
| 2002/0031646 A1 | 3/2002 | Chen et al. |
| 2002/0056245 A1 | 5/2002 | Thiers |
| 2002/0095894 A1 | 7/2002 | Pervan |
| 2002/0152707 A1 | 10/2002 | Martensson |
| 2002/0170258 A1 | 11/2002 | Schwitte et al. |
| 2002/0170259 A1 | 11/2002 | Ferris |
| 2002/0178674 A1 | 12/2002 | Pervan |
| 2002/0178680 A1 | 12/2002 | Martensson et al. |
| 2003/0009971 A1 | 1/2003 | Palmberg |
| 2003/0024199 A1 | 2/2003 | Pervan et al. |
| 2003/0024200 A1 | 2/2003 | Moriau et al. |
| 2003/0024201 A1 | 2/2003 | Moriau et al. |
| 2003/0029115 A1 | 2/2003 | Moriau et al. |
| 2003/0029116 A1 | 2/2003 | Moriau et al. |
| 2003/0029117 A1 | 2/2003 | Moriau et al. |
| 2003/0033784 A1 | 2/2003 | Pervan |
| 2003/0037504 A1 | 2/2003 | Schwitte et al. |
| 2003/0066588 A1 | 4/2003 | Palsson et al. |
| 2003/0079820 A1 | 5/2003 | Palsson et al. |
| 2003/0094230 A1 | 5/2003 | Sjoberg |
| 2003/0101681 A1 | 6/2003 | Tychsen |
| 2003/0115812 A1 | 6/2003 | Pervan |
| 2003/0136494 A1 | 7/2003 | Windmoller et al. |
| 2003/0145549 A1 | 8/2003 | Palsson et al. |
| 2003/0154681 A1 * | 8/2003 | Pletzer et al. .................... 52/578 |
| 2003/0159385 A1 | 8/2003 | Thiers |
| 2003/0180091 A1 | 9/2003 | Stridsman |
| 2003/0188504 A1 | 10/2003 | Ralf |
| 2003/0196405 A1 | 10/2003 | Pervan |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0107659 A1 | 6/2004 | Glockl |
| 2004/0123548 A1 | 7/2004 | Gimpel et al. |
| 2004/0128934 A1 | 7/2004 | Hecht |
| 2004/0139678 A1 | 7/2004 | Pervan |
| 2004/0159066 A1 | 8/2004 | Thiers et al. |
| 2004/0172904 A1 | 9/2004 | Martensson |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hanning |
| 2004/0211144 A1 | 10/2004 | Stanchfield |
| 2004/0250493 A1 | 12/2004 | Thiers et al. |
| 2004/0255538 A1 | 12/2004 | Ruhdorfer |
| 2004/0261348 A1 | 12/2004 | Vulin |
| 2005/0016099 A1 | 1/2005 | Thiers |
| 2005/0025934 A1 | 2/2005 | Thiers |
| 2005/0034404 A1 | 2/2005 | Pervan |
| 2005/0066605 A9 | 3/2005 | Thiers et al. |
| 2005/0144881 A1 | 7/2005 | Tate et al. |
| 2005/0160694 A1 | 7/2005 | Pervan |
| 2005/0166514 A1 | 8/2005 | Pervan |
| 2005/0166515 A1 | 8/2005 | Boucke |
| 2005/0210810 A1 | 9/2005 | Pervan |
| 2005/0235593 A1 | 10/2005 | Hecht |
| 2005/0252130 A1 | 11/2005 | Martensson |
| 2005/0284075 A1 | 12/2005 | Moriau et al. |
| 2005/0284076 A1 | 12/2005 | Moriau et al. |
| 2006/0005499 A1 | 1/2006 | Moriau et al. |
| 2006/0032168 A1 | 2/2006 | Thiers et al. |
| 2006/0032177 A1 | 2/2006 | Moriau et al. |
| 2006/0070332 A1 | 4/2006 | Palsson et al. |
| 2006/0070333 A1 | 4/2006 | Pervan |
| 2006/0101769 A1 | 5/2006 | Pervan et al. |
| 2006/0179772 A1 | 8/2006 | Thiers |
| 2006/0179773 A1 | 8/2006 | Pervan |
| 2006/0179774 A1 | 8/2006 | Thiers |
| 2006/0179775 A1 | 8/2006 | Thiers |
| 2006/0179776 A1 | 8/2006 | Thiers |
| 2006/0196138 A1 | 9/2006 | Moriau et al. |
| 2006/0201095 A1 | 9/2006 | Moriau et al. |
| 2006/0225370 A1 | 10/2006 | Moriau et al. |
| 2006/0225377 A1 | 10/2006 | Moriau et al. |
| 2006/0236630 A1 | 10/2006 | Moriau et al. |
| 2006/0236631 A1 | 10/2006 | Moriau et al. |
| 2006/0236632 A1 | 10/2006 | Moriau et al. |
| 2006/0236633 A1 | 10/2006 | Moriau et al. |
| 2006/0236634 A1 | 10/2006 | Moriau et al. |
| 2006/0236635 A1 | 10/2006 | Moriau et al. |
| 2006/0236636 A1 | 10/2006 | Moriau et al. |
| 2006/0236637 A1 | 10/2006 | Moriau et al. |
| 2006/0236638 A1 | 10/2006 | Moriau et al. |
| 2006/0236642 A1 | 10/2006 | Pervan |
| 2006/0236643 A1 | 10/2006 | Moriau et al. |
| 2006/0248829 A1 | 11/2006 | Moriau et al. |
| 2006/0248830 A1 | 11/2006 | Moriau et al. |
| 2006/0248831 A1 | 11/2006 | Moriau et al. |
| 2006/0254183 A1 | 11/2006 | Moriau et al. |
| 2006/0254184 A1 | 11/2006 | Moriau et al. |
| 2006/0254185 A1 | 11/2006 | Moriau et al. |
| 2006/0260249 A1 | 11/2006 | Moriau et al. |
| 2006/0260254 A1 | 11/2006 | Pervan |
| 2006/0272263 A1 | 12/2006 | Moriau et al. |
| 2007/0006543 A1 | 1/2007 | Engstrom |
| 2007/0028547 A1 | 2/2007 | Grafenauer et al. |
| 2007/0039664 A1 | 2/2007 | Quick |
| 2007/0051064 A1 | 3/2007 | Thiers |
| 2007/0094986 A1 | 5/2007 | Moriau et al. |
| 2007/0094987 A1 | 5/2007 | Moriau et al. |
| 2007/0094988 A1 | 5/2007 | Palsson et al. |
| 2007/0107360 A1 | 5/2007 | Moriau et al. |
| 2007/0107363 A1 | 5/2007 | Moriau et al. |
| 2007/0151189 A1 | 7/2007 | Yang |
| 2007/0175156 A1 | 8/2007 | Pervan et al. |
| 2007/0193178 A1 | 8/2007 | Groeke et al. |
| 2007/0251188 A1 | 11/2007 | Moriau et al. |
| 2008/0000182 A1 | 1/2008 | Pervan |
| 2008/0000186 A1 | 1/2008 | Pervan et al. |
| 2008/0005992 A1 | 1/2008 | Pervan |
| 2008/0010928 A1 | 1/2008 | Moriau et al. |
| 2008/0010929 A1 | 1/2008 | Moriau et al. |
| 2008/0010931 A1 | 1/2008 | Pervan et al. |
| 2008/0010937 A1 | 1/2008 | Pervan et al. |
| 2008/0010938 A1 | 1/2008 | Hannig |
| 2008/0028707 A1 | 2/2008 | Pervan |
| 2008/0034701 A1 | 2/2008 | Pervan |
| 2008/0034708 A1 | 2/2008 | Pervan |
| 2008/0041008 A1 | 2/2008 | Pervan |
| 2008/0053027 A1 | 3/2008 | Moriau et al. |
| 2008/0053028 A1 | 3/2008 | Moriau et al. |
| 2008/0060309 A1 | 3/2008 | Moriau et al. |
| 2008/0060310 A1 | 3/2008 | Moriau et al. |
| 2008/0060311 A1 | 3/2008 | Moriau et al. |

(56) References Cited

U.S. PATENT DOCUMENTS

| | | |
|---|---|---|
| 2008/0066415 A1 | 3/2008 | Pervan et al. |
| 2008/0066416 A1 | 3/2008 | Moriau et al. |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan |
| 2008/0134614 A1 | 6/2008 | Pervan et al. |
| 2008/0155930 A1 | 7/2008 | Pervan et al. |
| 2008/0168736 A1 | 7/2008 | Pervan |
| 2008/0216434 A1 | 9/2008 | Pervan |
| 2008/0216920 A1 | 9/2008 | Pervan |
| 2008/0271403 A1 | 11/2008 | Palsson et al. |
| 2008/0295432 A1 | 12/2008 | Pervan et al. |
| 2008/0301945 A1 | 12/2008 | Gibson et al. |
| 2009/0019808 A1 | 1/2009 | Palsson et al. |
| 2009/0038253 A1 | 2/2009 | Martensson |
| 2009/0038256 A1 | 2/2009 | Thiers |
| 2009/0078129 A1 | 3/2009 | Cappelle et al. |
| 2009/0133358 A1 | 5/2009 | Hecht |
| 2009/0151291 A1 | 6/2009 | Pervan |
| 2009/0193748 A1 | 8/2009 | Boo et al. |
| 2010/0170189 A1 | 7/2010 | Schulte |
| 2010/0275546 A1 | 11/2010 | Pervan |
| 2010/0300031 A1 | 12/2010 | Pervan et al. |
| 2010/0313511 A1 | 12/2010 | Thiers |
| 2010/0319290 A1 | 12/2010 | Pervan et al. |
| 2010/0319291 A1 | 12/2010 | Pervan et al. |
| 2010/0319292 A1 | 12/2010 | Moriau et al. |
| 2011/0011524 A1 | 1/2011 | Thiers |
| 2011/0023405 A1 | 2/2011 | Moriau et al. |
| 2011/0030303 A1 | 2/2011 | Pervan et al. |
| 2011/0042252 A1 | 2/2011 | Balmer et al. |
| 2011/0088344 A1 | 4/2011 | Pervan et al. |
| 2011/0088345 A1 | 4/2011 | Pervan |
| 2011/0088346 A1 | 4/2011 | Hannig |
| 2011/0154665 A1 | 6/2011 | Pervan et al. |
| 2011/0167750 A1 | 7/2011 | Pervan |
| 2011/0185663 A1 | 8/2011 | Martensson |
| 2011/0203214 A1 | 8/2011 | Pervan |
| 2011/0209430 A1 | 9/2011 | Pervan |
| 2011/0225922 A1 | 9/2011 | Pervan et al. |
| 2011/0252733 A1 | 10/2011 | Pervan et al. |
| 2011/0283650 A1 | 11/2011 | Pervan et al. |
| 2012/0011796 A1 | 1/2012 | Hannig |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0151865 A1 | 6/2012 | Pervan et al. |
| 2012/0174515 A1 | 7/2012 | Pervan et al. |
| 2012/0233948 A1 | 9/2012 | Palsson et al. |
| 2013/0042555 A1 | 2/2013 | Martensson |
| 2013/0067840 A1 | 3/2013 | Martensson et al. |
| 2013/0104487 A1 | 5/2013 | Moriau et al. |
| 2013/0133281 A1 | 5/2013 | Cappelle et al. |
| 2013/0145708 A1 | 6/2013 | Pervan |
| 2013/0219820 A1 | 8/2013 | Pervan |
| 2013/0247492 A1 | 9/2013 | Segaert |
| 2013/0291467 A1 | 11/2013 | Palsson et al. |
| 2014/0109501 A1 | 4/2014 | Darko |
| 2014/0137506 A1 | 5/2014 | Palsson |
| 2014/0262888 A1 | 9/2014 | Wahrmund |

FOREIGN PATENT DOCUMENTS

| | | |
|---|---|---|
| DE | 202 03 782 U1 | 7/2003 |
| DE | 103 16 695 A1 | 10/2004 |
| DE | 20 2004 018 661 U1 | 2/2005 |
| DE | 203 20 799 U1 | 4/2005 |
| DE | 10 2004 055 951 A1 | 7/2005 |
| EP | 1 308 577 A2 | 5/2003 |
| EP | 1 420 125 A2 | 5/2004 |
| WO | 02/092342 A1 | 11/2002 |
| WO | 03/012224 A1 | 2/2003 |
| WO | 03/016654 A1 | 2/2003 |
| WO | 03/083234 A1 | 10/2003 |
| WO | 03/087497 A1 | 10/2003 |
| WO | 03/089736 A1 | 10/2003 |
| WO | 2004/020764 A1 | 3/2004 |
| WO | 2004/037502 A1 | 5/2004 |
| WO | 2004/079130 A1 | 9/2004 |
| WO | 2004/083557 A1 | 9/2004 |
| WO | 2004/085765 A1 | 10/2004 |
| WO | 2005/054597 A2 | 6/2005 |
| WO | 2005/054599 A1 | 6/2005 |
| WO | 2005/068747 A1 | 7/2005 |
| WO | 2006/043893 A1 | 4/2006 |
| WO | 2006/056172 A1 | 6/2006 |
| WO | 2006/104436 A1 | 10/2006 |
| WO | 2009015492 A1 | 2/2009 |

\* cited by examiner

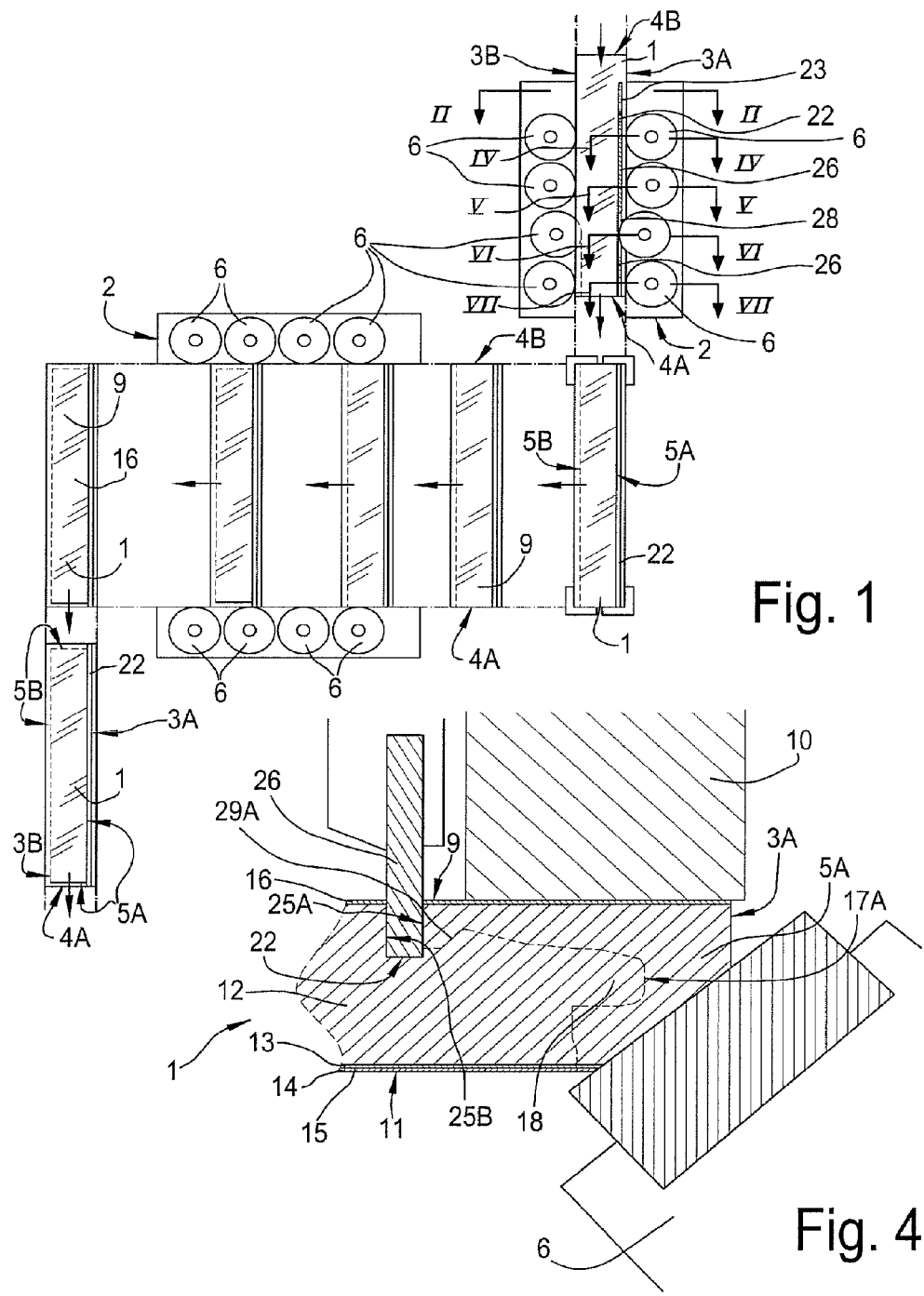

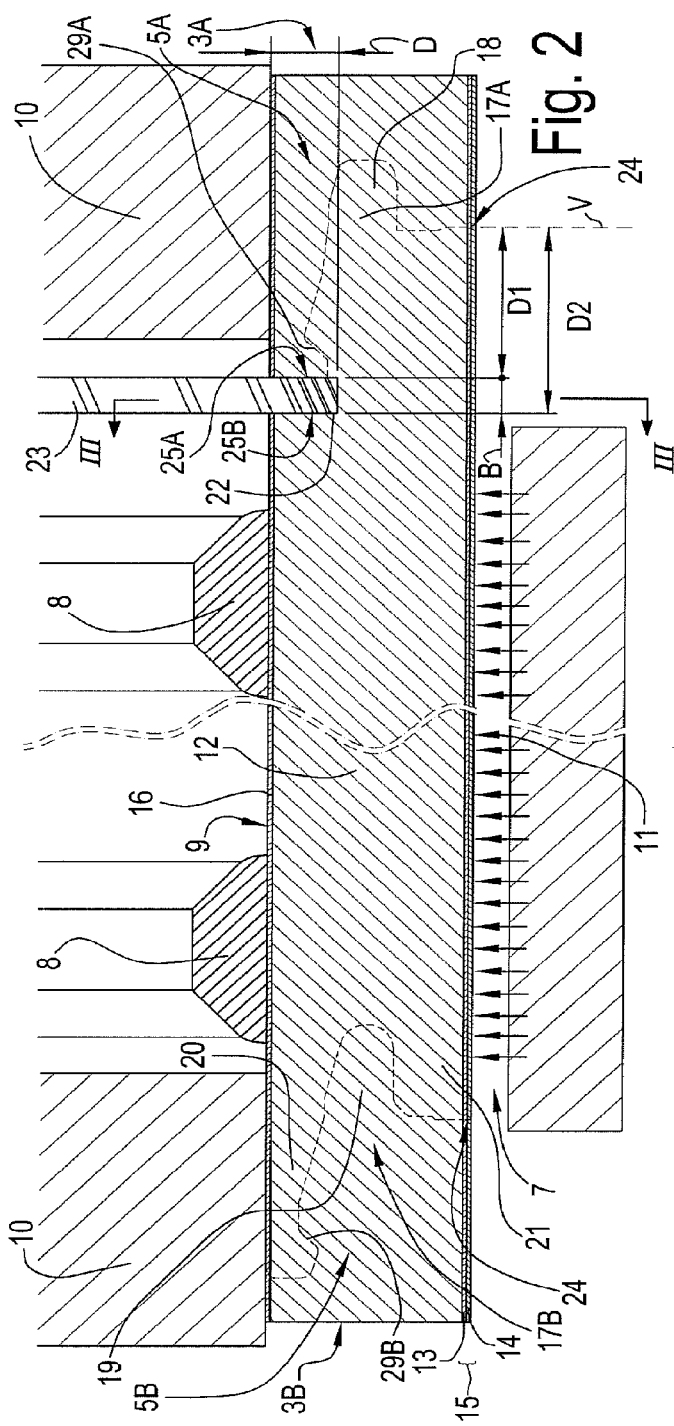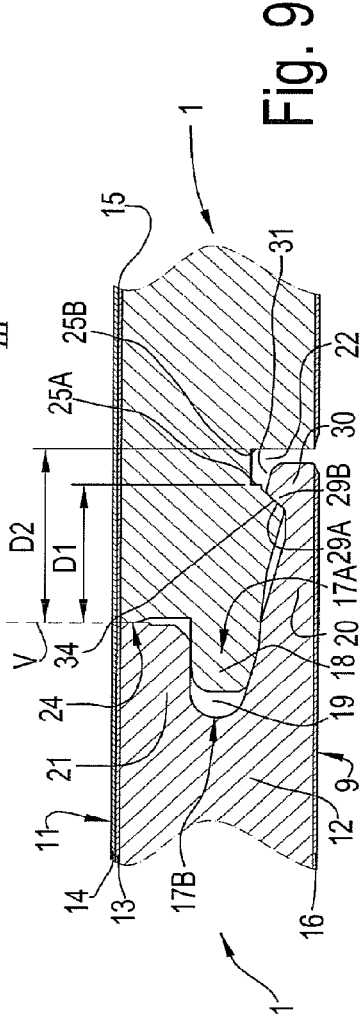

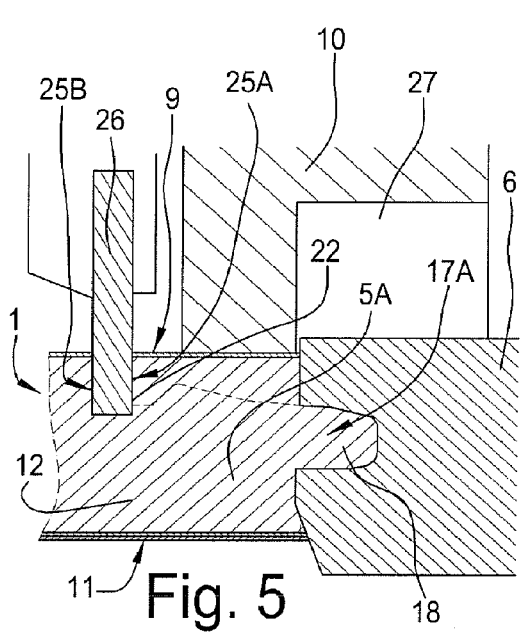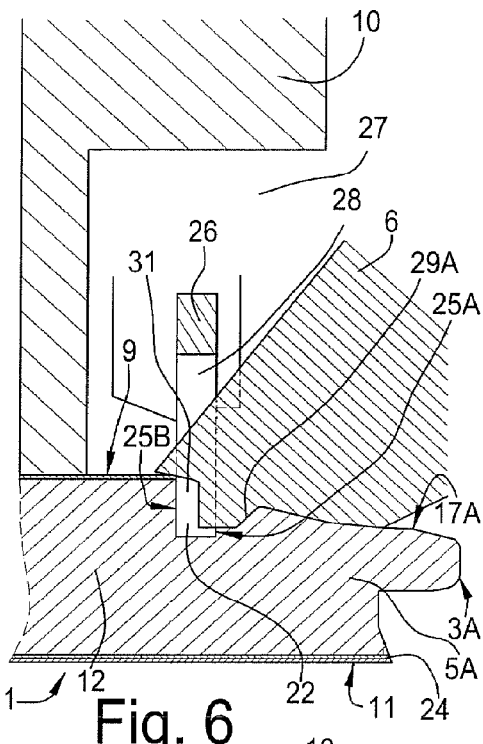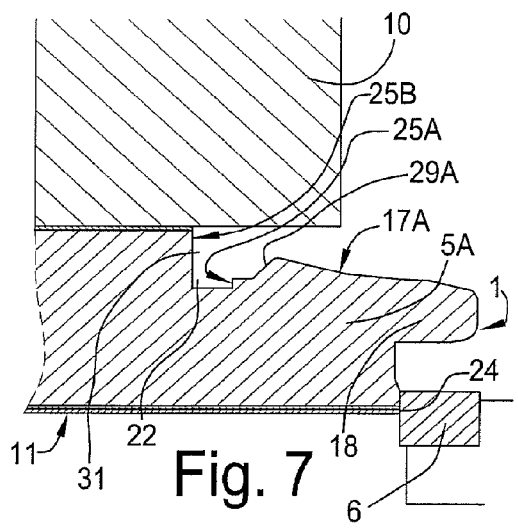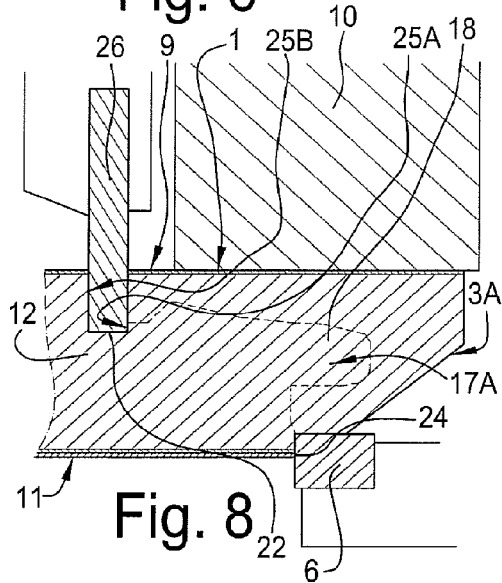

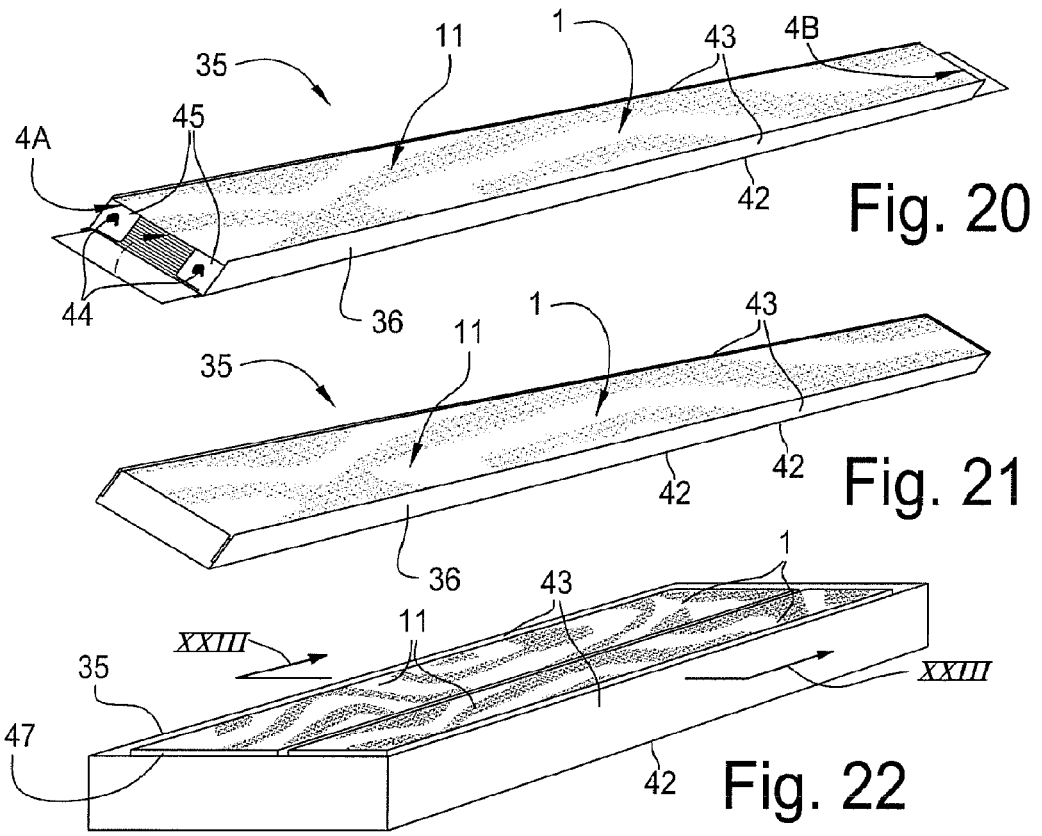
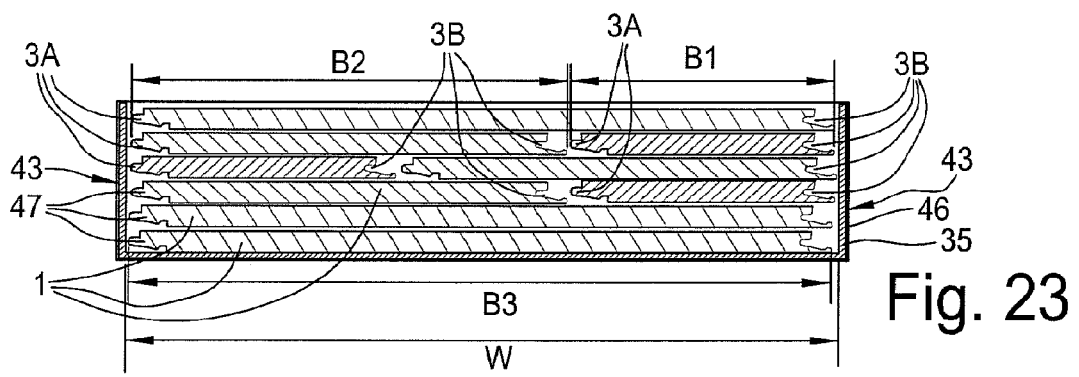
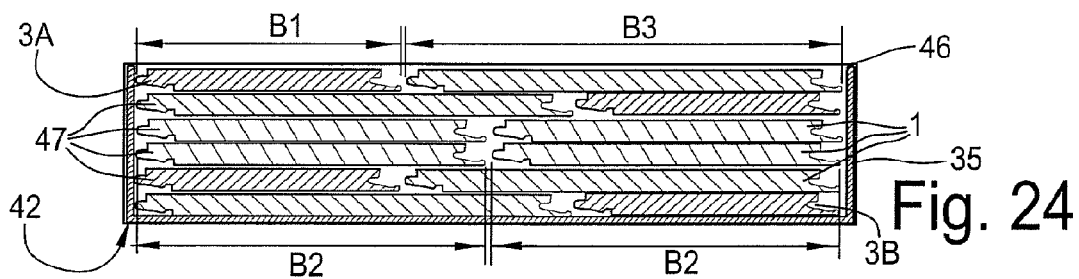

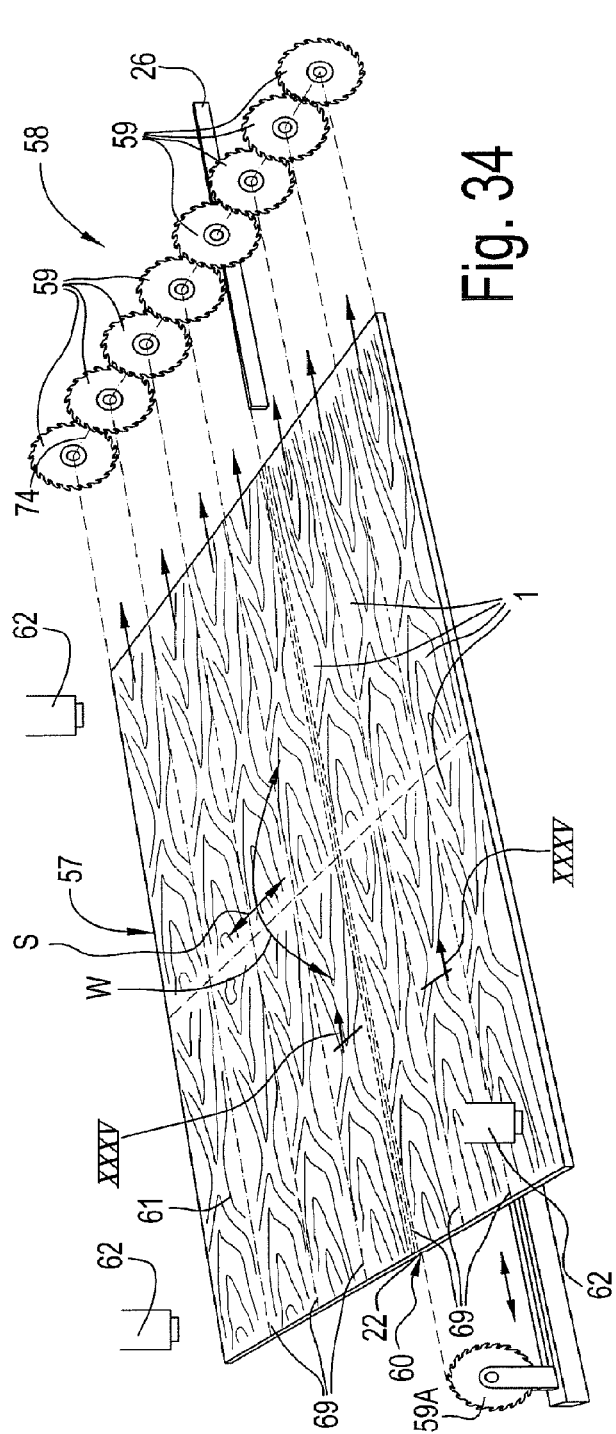
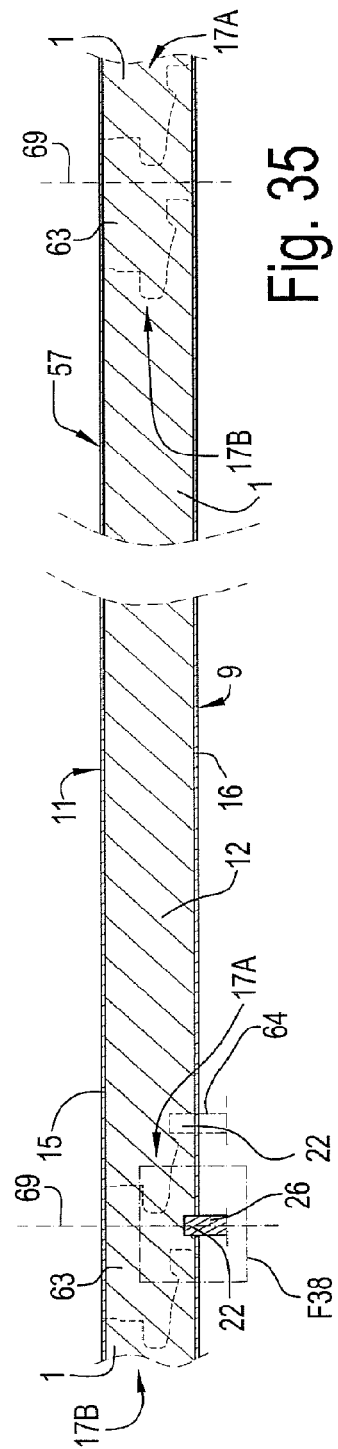
Fig. 34
Fig. 35

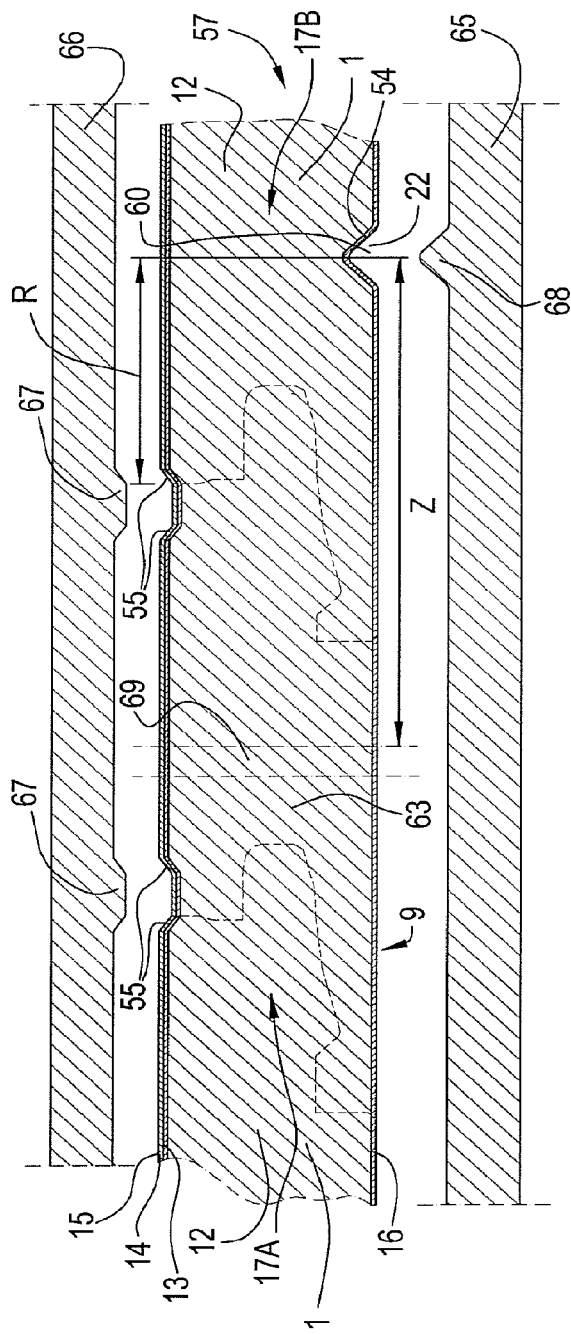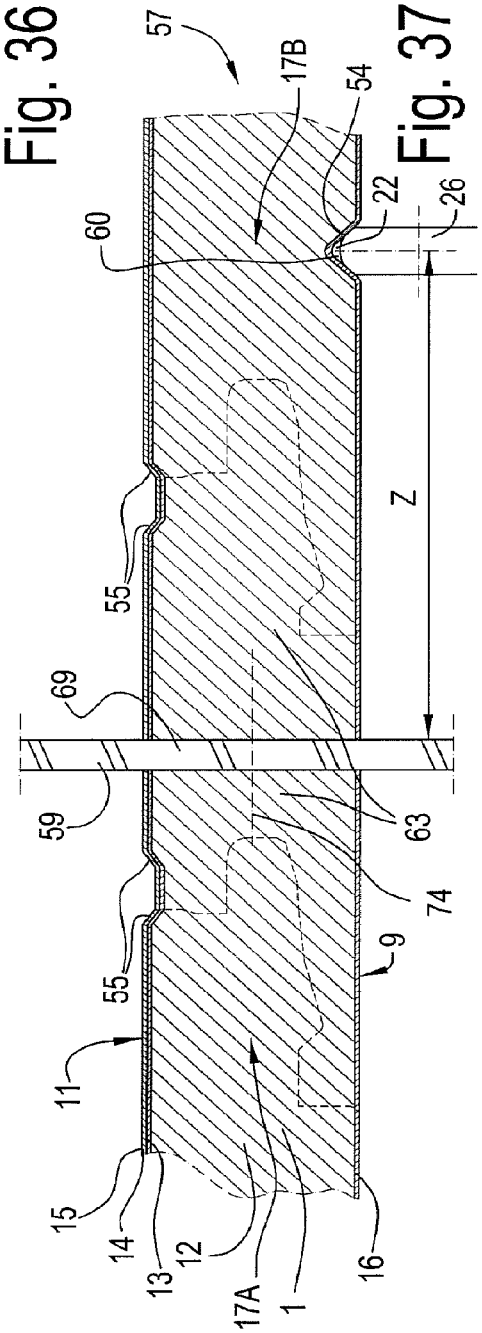

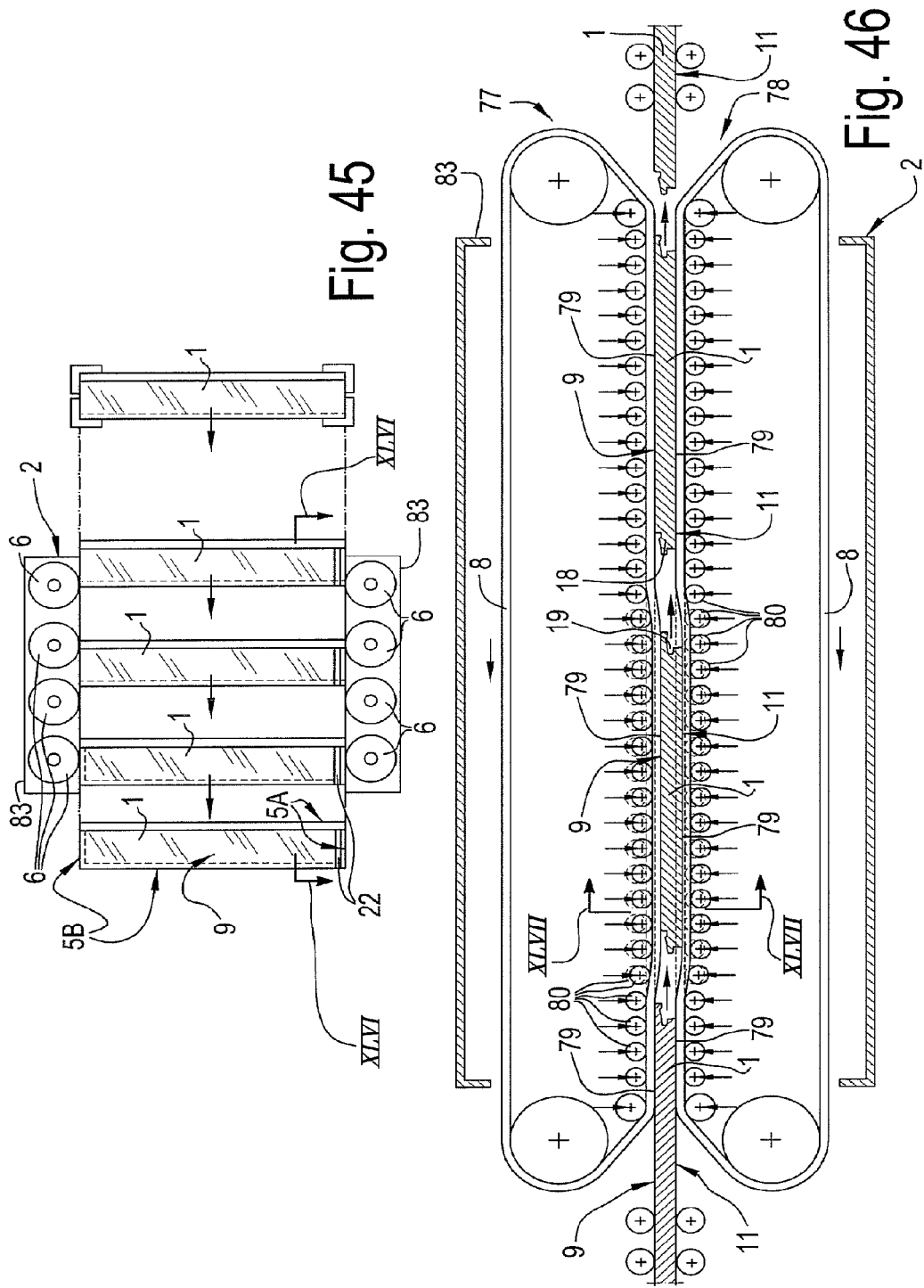

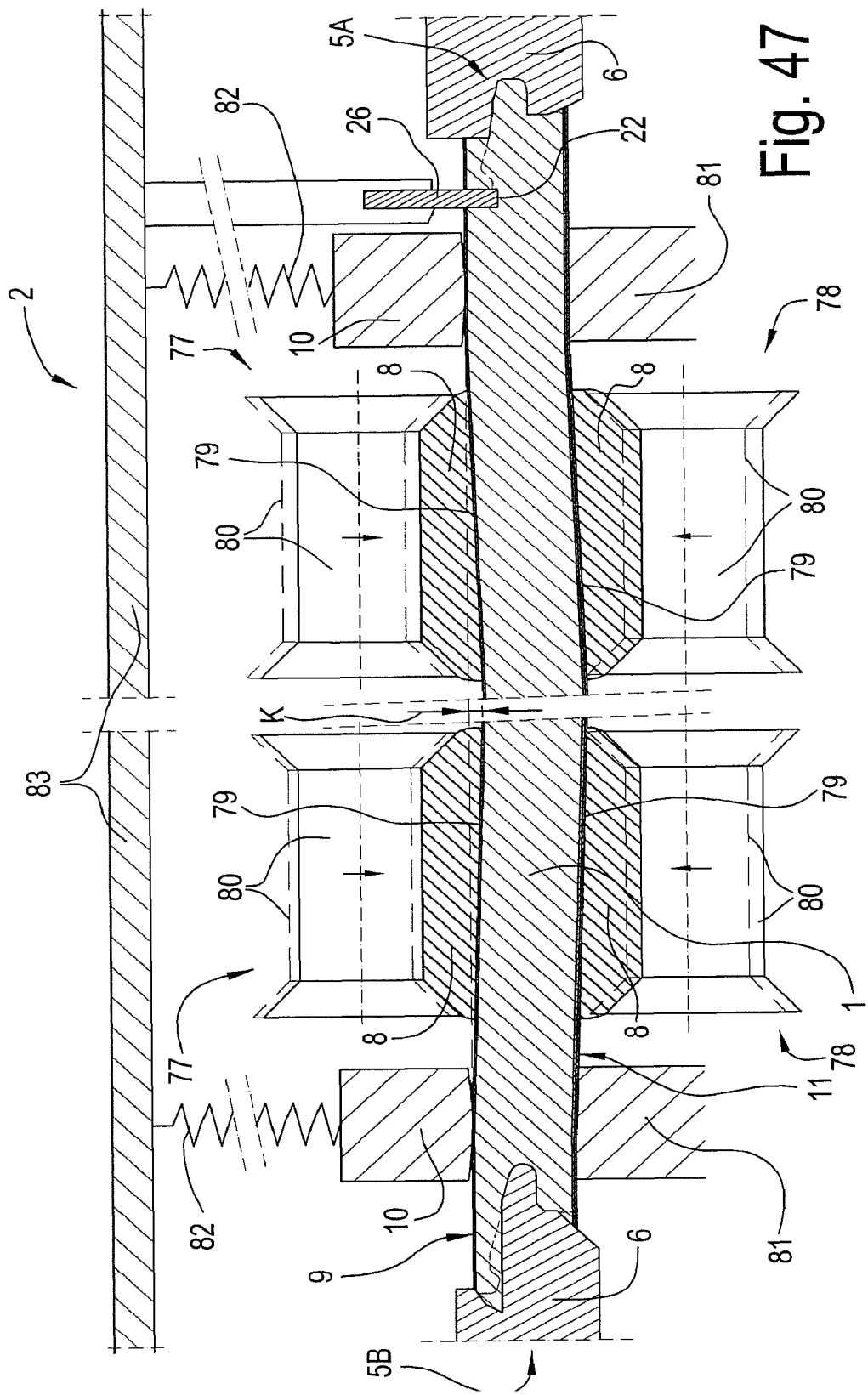

METHODS FOR MANUFACTURING AND PACKAGING FLOOR PANELS, DEVICES USED THEREBY, AS WELL AS FLOOR PANEL AND PACKED SET OF FLOOR PANELS

The invention relates to methods for manufacturing and packaging of floor panels, to devices used thereby, as well as to floor panels and packed sets of floor panels.

FIELD OF THE INVENTION

In general, the invention relates to hard floor panels, which, at two or more sides, are provided with coupling parts and which can be provided on an existing subfloor, either floatingly or glued, or in any other manner, in order to form a floor covering. Hereby, the invention is intended in particular for laminate panels, for example, with a printed decor and a top structure on the basis of synthetic material, prefabricated parquet, with panels mostly consisting of several layers of material with, at the upper side, a top layer of solid wood with a thickness of several millimeters, veneer parquet consisting of panels having a layer of veneer at their upper side, or solid parquet. This does not exclude that the invention is also applied for other hard floor panels, whether or not composed of several parts, for example, with top layers of other materials, such as, amongst others, cork, stone or stone-like materials, linoleum, carpet, and so on.

BACKGROUND

According to a first aspect, the invention relates to a method for manufacturing floor panels, which, as aforementioned, are provided with coupling parts at least at two opposite sides.

It is known that such coupling parts can be formed by means of a classical tongue and groove connection, wherein these, when installing the floor panels, possibly are glued into each other, or by means of mechanical coupling parts providing for a mutual locking of the floor panels in horizontal as well as in vertical directions, for example, as described in the international patent application WO 97/47834. This document describes how the respective coupling parts at two opposite sides can be formed in a continuous machine, in other words, while moving the floor panel over rotating mechanical cutting tools. This method is also called "continuous milling".

It is also known, for example, from the patent document WO 2004/037502, when using a continuous machine, to provide a guiding groove approximately in the middle of the lower side of flat panels by means of a saw treatment and to move the panels with this guiding groove over a guiding portion, while providing two opposite sides of the panels with profiled edge regions that comprise coupling parts. Applying this technique guarantees the parallelism of the two respective opposite sides, however, the presence of the guiding groove in the center of the panels may lead to undesired effects, such as, for example, the local weakening of the panels, the heightened risk of moisture penetration and/or warping and the like. The described continuous machine relates to a machine in which the panels are transported by means of an air bed and belts. Hereby, the air bed presses the panels upward against two belts, which, by means of friction, carry the panels along and convey them through the machine.

With such transport, considerably higher passage speeds can be achieved than with traditional chain conveyance systems.

According to a first aspect, the present invention now relates to a method for manufacturing floor panels that allows to obtain a better and/or cheaper and/or more flexible and/or more reliable finishing of the floor panels. The invention also aims at a floor panel obtained by such method.

SUMMARY

To this aim, the invention according to a first aspect relates to a method for manufacturing floor panels, wherein is started from panels, these panels, at their lower side, are provided with at least one guiding groove and these panels, at least at two opposite sides, are provided with profiled edge regions that comprise coupling parts, with the characteristic that at least one of the aforementioned two profiled edge regions is formed such that this region, seen in a cross-section of the panel, transverse to the guiding groove, extends at the lower side of the panel at least up to the guiding groove.

By "profiled edge region", any treated region is understood that is situated at the respective edge or in the direct proximity of the respective edge of the floor panel. Such profiled edge regions may comprise regions having a specific function, such as, for example, the function of coupling parts, as well as regions without function.

By the present invention is achieved that the guiding groove is no longer conspicuously present on the lower side of such panels. Also, the absence of these guiding groove outside of the profiled edge regions of a floor panel means the absence of a local weakening, which weakening might lead to a variety of undesired effects, such as, for example, enlarging the risk of warping of floor panels under the influence of heat and/or humidity. It is clear that these effects are of huge importance with thin floor panels, for example, floor panels with dimensions between 5 and 15 mm.

In consideration of the above, it is clear that at the lower side of the floor panels, apart from one or more guiding grooves situated in the edge profile or adjacent thereto, preferably no other guiding grooves are formed, are present, respectively, in the lower side of the floor panels.

The panels from which is started, may be obtained from a larger board, for example, by means of a saw treatment. Such board consists, for example, of a board-shaped laminate material, in the case of the production of laminate floor panels, or of another material, which then is chosen in function of the floor panels to be manufactured.

Such board-shaped laminate material comprises at least a core, whether or not composed of several parts, a decor, as well as a top layer on the basis of synthetic material. The top layer mostly consists of a number of carrier sheets, for example, of paper, which are soaked in resin, for example, a melamine resin. In such case, it is common to perform the laminate as so-called "DPL" (Direct Pressure Laminate), wherein the top layer is pressed directly upon the core, or so-called "HPL" (High Pressure Laminate), wherein the top layer as such is obtained by a press treatment, before the top layer as a whole is provided on the core. Also, other possibilities for forming such top layer are possible, for example, by making use of films, applying a substance to be hardened, such as a varnish or the like, or in any other manner. The decor is mostly printed, either directly on the core, with the possible intermediary of a primer, or on one or more of said carrier sheets or on the aforementioned film.

The core of such laminate material mostly consists of a wood-based material, such as, for example, MDF (Medium Density Fiberboard) or HDF (High density Fiberboard).

Laminate material, as described herein above, is mostly provided with a backing layer at the lower side in order to counteract possible deformations under the influence of humidity and/or crimping effects as a result of the press treatment performed in manufacturing. Herein, this backing layer then mostly also consists of a carrier sheet soaked in resin, which is provided against the lower side by means of a press treatment. Such backing layer offers a balance against possible tensile forces that are present in the material, and in this manner can counteract a possible warping of the material.

Also other materials than laminate material, which can be applied for the present invention, can be provided with a backing layer, which does not necessarily have to consist of a carrier sheet soaked in resin. So, such backing layer may also consist, for example, of wood, for example, when manufacturing the aforesaid prefabricated parquet.

Providing, according to the first aspect of the invention, a guiding groove at the lower side of a panel, leads to a repeatable positioning during several processing steps of the manufacture of a floor panel. The same guiding groove can in fact be applied during different processing steps; amongst others, it may, however, not necessarily, be applied for guiding the panels during the forming of at least a portion of the profiled edge regions, wherein the panels to this aim are moved with the guiding groove over one or more guiding portions. In this latter case, the parallelism of the profiled edge regions is guaranteed in an optimum manner. Preferably, the guiding groove is at least applied for guiding the panels while providing the aforementioned coupling parts, as a consequence of which a production of uniform coupling parts within narrow tolerance limits can be guaranteed.

It is noted that providing a guiding groove at the lower side of the panels does not necessarily have to take place after the panels have been brought approximately to their finished dimensions, however, according to the invention, may also take place beforehand, for example, by providing such guiding groove in the lower side of a board, from which several of such panels are formed.

Further, it is noted that, when performing the aforementioned profiled edge regions, preferably elements, such as pressure shoes, are applied, which press the panels, in the immediate proximity of both opposite edge regions to be profiled, with at least one of their flat panel sides onto elements, such as sliding shoes.

In a preferred form of embodiment, the aforementioned pressure-exerting elements or pressure shoes are movable independently from the aforementioned guiding portion, whereby preferably the guiding portion is fixedly installed, more particularly, is rigidly connected to a frame of the processing machine. This installation allows a very stable transport of the panels and a correspondingly high quality of the processing in the machine. Moreover, the accuracy of the guiding of the panels is independent of the wear, the positioning and/or the accuracy of the pressing shoes.

Also in the case that no pressure-exerting elements, as aforementioned, were applied and that the floor panels thus are supported in another suitable manner, the use of a fixedly arranged guiding portion, more particularly a guiding portion that is rigidly connected to the frame of the processing machine, combined with the first aspect of the invention, offers important advantages. By such arrangement of the guiding portion thus a fixed positioning thereof in respect to the applied tools, such as cutting tools, is obtained, which may contribute to narrow production tolerances.

It is clear that the invention preferably is performed on continuous machines, wherein the panels are transported in a continuous or almost continuous movement along one or more processing stations, for example, processing stations with rotating mechanical cutting tools. Hereby, preferably use is made of continuous machines, wherein the transport, as aforementioned, takes place by means of belts and an air bed, whereby high passage speeds can be achieved, even up to more than 300 m/min. As will become clear from the further introduction and from the description, it is not excluded that the invention is performed on continuous machines, whereby the panels are transported in another manner. Other possibilities are described hereafter by means of embodiments according to the sixth, seventh, twelfth and thirteenth aspect of the present invention.

In a preferred form of embodiment, the panels are moved over at least two guiding portions, between which, at least at the height of the guiding groove, a gap is present, wherein one or more processing tools and/or auxiliary tools for forming at least a portion of the respective profiled edge region are active in said gap.

In a preferred form of embodiment, the guiding groove and the profiled edge regions are performed such that the guiding groove, in a coupled condition of two of such floor panels, is covered at least partially, for example, at least halfway, is covered by a material portion. Still better, the guiding groove is covered at least up to three quarters or even entirely, or almost entirely, as a result of which influences from below can be restricted.

It is noted that according to the first aspect of the invention, it is not excluded that also other guiding grooves are provided at the lower side of the panels, for example, guiding grooves external to the profiled edge regions, although this, as aforementioned, preferably will not be the case.

When in the method according to the first aspect, it is started from a panel that is provided with a backing layer, the method has particular advantages, in particular in the case that the guiding groove is performed completely through the thickness of such backing layer. In that the profiled edge region extends at the lower side at least up to the guiding groove, the backing layer, at least for forming this guiding groove, is not interrupted locally, which provides for that the balance between the tensile forces in the backing layer and the tensile forces in the remaining material at least is not interrupted by forming the respective guiding groove, such that the risk of warping is minimized.

The aforementioned coupling parts are preferably performed with locking parts, such that, in a coupled condition of at least two of said floor panels, a mutual locking is obtained in a horizontal as well as a vertical direction. Herein, it is preferred that the coupling parts are substantially performed in the form of a tongue and a groove that is bordered by means of a lower and an upper lip, wherein then preferably the profiled edge region extending at the lower side of the panel at least up to the guiding groove is performed at that side of the panel at which the aforementioned tongue is formed. In a particular preferred form of embodiment, the guiding groove is situated at the tongue side at such a distance from the vertical plane in which the coupled floor panels adjoin with their upper side against each other, that one or both of the following criteria are met:

such that the distance, measured in a horizontal direction, between the aforementioned vertical plane and that side of the guiding groove situated closest thereto, is larger than 3 mm;

such that the distance, measured in a horizontal direction, between said vertical plane and the side of the guiding groove that is situated the farthest from it is smaller than 12 mm.

This form of embodiment results in a compact profiled edge portion, whereas still a good and/or sturdy connection of two floor panels is guaranteed. Herein, the aforementioned material portion that at least partially covers the guiding groove, can be formed by a portion of the lower lip. Preferably, the lower lip has a portion that extends beyond the upper lip, and the aforementioned locking parts comprise portions that engage behind each other and in this manner effect a locking in horizontal direction, wherein one of these locking parts is situated in the portion of the lower lip that extends beyond the upper lip, and the aforementioned material portion also is situated in the portion of the lower lip that extends beyond the upper lip.

Herein, the aforementioned locking part that is situated at the lower lip, in the coupled condition of two of such floor panels, preferably is situated at least partially in the guiding groove, or at least in a space originally forming part of the guiding groove. Such configuration minimizes the risk of dust and moisture penetrating into the connection system.

In general, it is preferred that, after forming the profiled edge regions, at least a remainder of the aforementioned guiding groove remains present, in other words, at least two lateral flank portions of this guiding groove are maintained, such that the remainder of the guiding groove still can be applied, for example, for other treatments, or for further conveyance of the floor panels.

It is clear that according to the invention, the guiding groove is particularly useful when manufacturing the floor panels, and that such guiding groove does not necessarily have to remain present at floor panels that are obtained by the application of a method according to the invention. Thus, the fact that such profiled edge region according to the first aspect of the invention is performed at least up to the guiding groove, does not exclude that such edge region is performed up to entirely beyond the guiding groove and, as a result hereof, the guiding groove is completely removed from the final floor panel.

It is also clear that it is not excluded that such locking system can also be performed in other forms than in a tongue and groove connection.

In general, it is noted that in applications where the floor panels have a backing layer, it is preferred that this backing layer is uninterrupted over the entire lower side of the floor panels, in other words, outside of the profiled edge regions.

It is noted that, when forming the aforementioned profiled edge regions and the guiding groove adjoining thereto and, thus, pertaining thereto, preferably mechanical cutting tools are applied, such as milling cutters, saws, planes or the like. Further, it is noted that the guiding groove is not necessarily provided in the same machine where also the actual profiled edge regions are formed, but can also be provided separately.

It is noted that according to the first aspect of the invention, the guiding groove can be applied before, during as well as after forming the actual profiled edge regions, thus, the portion of the edge regions exclusive of the guiding groove.

In a preferred form of embodiment, when forming the coupling parts, and in particular when forming a locking part providing for a locking in horizontal direction, with the same tool a portion of the actual coupling parts is formed, as well as simultaneously a material portion, which extends up to at least the location where the guiding groove is formed or shall be formed, is removed. In this form of embodiment, it is not necessary to remove additional material portions and/or to apply additional cutting tools in order to obtain that the respective edge region extends up to the guiding groove.

A method according to the first aspect of the invention can also be applied for manufacturing floor panels, where the aforementioned profiled edge regions at the upper edge of the floor panels are provided with a surface that is obtained by removing a material portion, for example, in the form of a bevelled edge. Examples of such floor panels with a bevelled edge are known, amongst others, from the WO 01/96688. According to the present invention, the floor panel, during forming, for example, milling, such bevelled edge, preferably will be guided by means of the guiding groove.

According to a deviating variant of the method according to the first aspect of the invention, the panels are provided with a guiding groove at their upper side instead of at their lower side, wherein at least one of the aforementioned two profiled edge regions is formed such that this region, seen in a cross-section of the panel, transverse to the guiding groove, extends at the upper side of the panel at least up to the guiding groove. In such case, it is preferred that the guiding groove is performed at the groove side of the panel, wherein a longer lower lip is formed at the groove, and the guiding groove is performed in the projecting longer portion of the lower lip and/or is performed in the material portion that originally is situated above the projecting longer portion of the lower lip.

It is noted that, according to the first aspect, the guiding groove can be provided in any manner. So, for example, it may be formed by the application of a machining operation, such as sawing, milling, planing or the like. According to an alternative embodiment, the guiding groove consists of an impression that is applied, for example, by means of a press treatment. This alternative form of embodiment entrains a broad range of advantages. So, for example, it becomes possible to obtain a guiding groove in the lower side of the panels without interrupting a possible backing layer, such that the above-mentioned disadvantages of interrupting the backing layer do not occur.

The possibility of providing a guiding groove by means of a press treatment is also advantageous when the first aspect is not applied. Therefore, the present invention, according to a second independent aspect, the latter being applied or not applied in combination with the first aspect, relates to a method for manufacturing floor panels, wherein boards of laminate material are formed by means of a press treatment and wherein these plates are divided into several panels, from which finally the actual floor panels are formed, with the characteristic that by means of a press treatment, and preferably the aforementioned press treatment, at least one impression is applied in the board, which is applied at least as a guiding groove for guiding said board or the subsequently obtained panels in further treatments, such as, for example, during forming said panels from said board of laminate material, or during the realization of profiled edge regions, which comprise coupling parts, at least at two opposite sides of the aforementioned panels.

Composing a board of laminate material with a press treatment and forming, by means of a press treatment, impressions having a substantially decorative purpose, is known as such, for example, from WO 01/96689. However, according to its second aspect, the present invention applies a press treatment for forming impressions that have a function in the manufacture of the floor panels, namely, in this case, the function of guiding groove.

There are various possibilities for providing the aforementioned impressions, which are utilized at least as a guiding groove. They can be formed either in the lower side or in the upper side, or in both.

When, according to a first possibility, the aforementioned impressions are provided at least in the lower side of the aforementioned board, they can be used as a guiding groove, as described in respect to the first aspect of the invention, or as known from the aforementioned WO 2004/037502. Here, the undesired effects, herein above mentioned in respect to said WO 2004/037502, can be avoided, in view of the fact that a press treatment offers the possibility of keeping the backing layer intact. It is noted that keeping the backing layer intact is desired, however, not necessary when performing a method according to the second aspect. For example, possible cracks in the backing layer are not excluded.

When, according to a second possibility, the aforementioned impressions are provided at least in the upper side of the aforementioned board, a series of new or improved possibilities is created in respect to the manufacture of floor panels.

In a preferred form of embodiment of these two possibilities, by means of the aforementioned press treatment at the upper side, more particularly, the decorative side of the aforementioned board, also impressions are performed that are determining for the appearance of the decorative side, as, for example, for realizing deepened regions, more particularly edge regions, and imitating structured surfaces, such as wood nerves and pores, whereby these impressions preferably are in register with a printed decor that possibly is present at the decorative side. The aforementioned press treatment preferably takes place between two heated press plates, which, with high pressure, are coming into contact with the upper side, the lower side, respectively, of the aforementioned board. The aforementioned structured surfaces and other deepened regions are realized in the decorative side by means of an upper press plate having a correspondingly structured surface. As the guiding groove and the impressions, which are determining the appearance of the decorative side, are realized by means of the same press treatment, their mutual position is easy to repeat.

In the case that the guiding groove, according to the aforementioned first possibility, is provided at least in the lower side of the board, or, in other words, is provided by means of the lower press plate, preferably a mutual positioning between the lower and the upper press plate is performed, such that the guiding groove, after the press treatment, is situated in a predetermined position in respect to the impressions provided at the decorative side.

In the case that the guiding groove, according to the aforementioned second possibility, is provided at least in the upper side of the board, it is not necessary to perform said mutual positioning between the lower and the upper press plate. According to this second possibility, the repeatability of the mutual position of the guiding groove and the impressions that are determining the appearance of the decorative side thus will be higher, as both are obtained by means of the same, namely, the upper, press plate.

Said repeatability is of particular importance in panels with impressions that are intended to be situated on the edge of the floor panels, such as deepened edge regions. This is the case, for example, when impressions are provided that are intended to form a beveled edge or another deepened edge region at the edge of the floor panels.

A method wherein a mechanical portion, such as an impressed guiding groove, is formed at a board for guiding this board or the panels subsequently obtained from this board, as such has various advantages in respect to an accurate manufacture of floor panels. Therefore, the invention, according to its third aspect, also relates to a method for manufacturing floor panels, starting from a board, wherein the method at least comprises the steps of dividing said board into several panels and, from the obtained panels, forming floor panels, with the characteristic that the method also comprises the steps of forming a mechanical portion at the board, preliminary to dividing it into said panels, and applying this mechanical portion for guiding the board or the panels, into which the board has been divided, in further treatments.

According to an important preferred form of embodiment of the third aspect of the invention, the aforementioned board forming the starting basis comprises a decorative side having a pattern, more particularly formed by a print and/or by impressions. In that case, the aforementioned mechanical portion preferably is applied in function of this pattern, more particularly in function of the location of this pattern. Applying this mechanical element for guiding the board or the panels, into which the board is divided, in one or more further treatments, provides for a precise performance of the respective treatments in respect to the aforementioned pattern.

The aforementioned decorative side can be formed in various manners.

According to a first possibility, the board from which is started is provided at least with a resin-impregnated printed carrier sheet, more particularly printed paper that acts as so-called decor layer. With such decorative side, the method according to the third aspect of the invention in general, and according to said preferred embodiment of this aspect in particular, has particular advantages. Herein, the print of the carrier sheet preferably represents a pattern, such as, for example, a wood motif.

According to a second possibility, the board from which is started is at least provided with a decorative side that is formed by printing a pattern on the board, whether or not by the intermediary of a primer or other layer.

In particular when applying printed patterns, such as in both aforementioned possibilities, a method according to the third aspect is advantageous. Such patterns can have a large variation in their dimensions, in the case of the first possibility, for example, because the printed carrier sheet is subjected to variable strain. Thus, it is of importance that said mechanical portion is applied in function of this pattern, such that further treatments still can obtain a high precision, independently of the fact whether the dimensions of the pattern have been altered.

Independently of the fact whether the aforementioned first or second possibility is applied, the pattern may also comprise one or more impressions. According to the aforementioned important preferred form of embodiment of the third aspect, the board can be divided in function of these impressions. This is of high importance in the case that said impressions are intended to form a deepened edge region at the panels or floor panels, as then is obtained that the further treatments can be performed such that the risk of removing this sunk edge region in an undesired manner entirely or partially, when forming the floor panels, is minimum. The entirely or partially removing of said edge region in an undesired manner may occur, for example, when, during forming of the possible profiled edge regions, reference is made to a cut applied in an imprecise manner when dividing the board.

It is clear that the respective mechanical portion can have any form. Preferably, a groove or a guiding groove is concerned. It can also be formed at any location, either in the decorative side or upper side, or, and preferably, at the lower side, or at both flat sides of the board. Also, it is not excluded that several of such mechanical portions are formed at the board. The mechanical portion may also be formed in any manner, for example, by means of a machining treatment, such as sawing, or by means of a press treatment, such as in the second aspect of the invention.

In a method according to the third aspect, said mechanical portion is applied for guiding the plate or the panels, into which the board has been divided, during further treatments.

It is noted that the utilization of a mechanical portion provided in the board, such as, for example, a guiding groove, during the dividing thereof strongly reduces the risk of a deviation of the board in the cutting direction, which leads to a more stable and/or more accurate result of the dividing process. So, for example, in a cutting device, where the passage movement of the board is effected by means of belts or the like, the risk of the board leaving its aligned position can be minimized. This advantage is of particular importance in said important preferred form of embodiment of the third aspect. Here, the aforementioned mechanical portion or said guiding groove preferably are applied by means of a tool, wherein the board and the aforementioned tool, in a preliminary step, are subjected to a mutual positioning, more particularly aligning, in order to obtain that the finally obtained mechanical portion or the guiding groove is positioned, more particularly aligned, in respect to the aforementioned pattern and/or the cuts to be realized.

In another preferred form of embodiment, the method also comprises the steps of performing, at least at two opposite sides of the panels, profiled edge regions comprising at least coupling parts, and of applying the mechanical portion for guiding the panels, into which the board has been divided, during the step of performing the profiled edge regions.

In all forms of embodiment of the third aspect, the aforementioned mechanical portion preferably is provided in a material portion of the board that is intended to be removed when dividing the board into panels and/of when forming profiled edge regions at least at two opposite sides of the final floor panels.

It is clear that, according to the third aspect of the invention, in the case that the mechanical portion relates to a groove or a guiding groove, this latter can be formed or applied in longitudinal direction as well as in transverse direction, and that this latter also can be formed or applied in both directions. In this latter case, the board, or the parts thereof into which the board has been divided when dividing it further, is moved with a longitudinal guiding groove, with a transverse guiding groove, respectively, over one or more guiding portions. By "longitudinal direction", here the feed direction of the cutting device is meant, whereas by "transverse direction", a direction transverse, and preferably perpendicular, to said "longitudinal direction" is meant.

According to its fourth independent aspect, the invention aims at an improved method for manufacturing floor panels, starting from boards having an upper side, more particularly a decorative side, with a pattern formed at least by printing, and the method moreover comprises the following steps:

dividing the aforementioned boards at least by means of parallel cuts into several panels by means of a cutting device with at least three cutting elements, wherein, by adjusting the cutting elements, the cuts are performed at locations in function of said pattern;

and forming the actual floor panels from the obtained panels by means of further treatments, amongst which may or may not be a further dividing process;

with the characteristic that in said adjustment, at least the aforementioned three cutting elements are adjusted in an manner independent from each other, in function of the pattern.

A method wherein, by adjustment of the cutting elements, the cuts are performed at locations in function of said pattern, more particularly in function of the location of said pattern, is known, for example, from EP 1 147 867. This EP describes a method wherein the cutting elements, in the present case, the saw blades, can be steadily shifted apart on the basis of a detection of the actual width and/or length of the entire decorative side of the plate, with the purpose of taking into account, when dividing the board, possible deviations in this width or length. The present inventors, however, have found that such method is insufficient, as the possible changing dimensions of the decorative side, more particularly the printed motif of the pattern, do not always manifest themselves in a regular manner over the length and/or the width of the decorative side.

Adjusting the cutting elements in a manner independent from each other, in function of the aforementioned pattern, such as according to the fourth aspect of the present invention, allows to create several novel control possibilities, as a result of which the dividing of the board can take place in a more accurate manner. Preferably, all cutting elements that are applied for dividing the boards, by means of parallel cuts, into several panels, are adjusted in a manner independent from each other, however, in function of the pattern.

In general, a method with the characteristics of the fourth aspect allows to obtain more accurate cuts under changed conditions. Such "changed conditions" occur, for example, when the decorative sides of globally identical boards do show mutual differences, more particularly show differences among the patterns, formed by printing, of these decorative sides.

According to a first example, such difference may occur when the pattern of the decorative sides, board after board, is situated at a, whether or not slightly, different position in respect to the edges of the plate, or, according to a second example, when the decorative side of the pattern, board after board, has undergone a, whether or not slight, stretching.

In particular, a method according to the fourth aspect allows that now, amongst others, changing dimensions of the decorative side that manifest themselves irregularly over the length and/or width thereof, now can be accommodated sufficiently by said adjustment of the cutting elements.

The possibility of dividing the board even under said changed conditions is of particular importance when the method is applied when manufacturing laminate floor panels, of the type where the aforementioned board from which is started, is provided at least with a resin-impregnated printed carrier sheet, more particularly printed paper acting as so-called decor layer. Both aforementioned examples of differences may occur in such laminate floor panels. However, it is in particular in boards that are provided with a resin-impregnated carrier sheet, that the risk of a difference as in the second example, namely, the occurrence of mutually differing strain among decorative sides, is particularly large. It is noted that such carrier sheets usually are applied when manufacturing laminate floor panels comprising a top layer of the aforementioned "DPL" or "HPL".

It is noted that by "adjusting in function of the pattern", it is generally meant that the pattern is observed, preferably automatically, and that these observations are applied for adjusting the cutting device. The observation may take place in any manner, for example, by cameras, sensors, scanners and the like. Preferably, it takes place in an independent manner, however, in function of the pattern adjustment of the cutting elements in function of observations, which are performed at the upper side of the respective board or of a corresponding reference board, at least at three locations distributed over the width of the board to be divided.

With the intention of having the aforementioned adjustment run more smoothly, the aforementioned observations and adjustment may be performed according to any of the following possibilities, or a combination thereof:

by recognizing, in the case of a decorative pattern, portions of the aforementioned pattern and performing the adjustment in function of the location thereof;

by providing reference marks, more particularly reference points and/or reference lines, in or next to the pattern, preferably together with the performance of the aforementioned printing, whereby these reference marks are observed and then, in function of the location of the observed reference marks, the adjustment is performed;

by working as in the preceding paragraph, wherein for the aforementioned reference marks, reference lines are applied that are present in the upper side per cut to be realized, and which preferably are obtained of lines of a light color, formed by a print or by interrupting a decorative print.

Further, it is noted that in the second through fourth aspects a board as such can be obtained from a larger board, for example, by dividing this larger board, and that according to these aspects, the panels that are obtained by dividing the board as such can be divided further into smaller panels, from which then finally the floor panels are formed.

According to all its aspects, the present invention does not exclude that the panels from which is started may also consist of other than the aforementioned materials, such as synthetic materials. Amongst others according to its first and second aspect, the invention also does not exclude that the panels from which is started are obtained in another manner than from a larger board, for example, by extrusion.

According to a fifth independent aspect, the invention also relates to a floor panel which, at least at two opposite sides, is provided with profiled edge regions, which comprise at least coupling parts, which consist at least of a tongue and a groove, with which, in the coupled condition of two of such panels, a locking in vertical direction is obtained, as well as locking parts, which, in a coupled condition of two of such panels, effect a locking in horizontal direction, wherein these locking parts have contact surfaces effecting at least the aforementioned locking in horizontal direction, with the characteristic that, at the lower side of the floor panel, close to the side of the floor panel that is provided with the aforementioned tongue, a groove with, at opposite sides, two substantially parallel and substantially vertical flanks is present, wherein this groove integrally forms part of the respective profiled edge region and wherein these flanks and said contact surfaces consist of different surfaces. It is clear that by "different surfaces" is meant that said vertical flanks and said contact surfaces are not situated in each other's prolongation. However, it is noted that said contact surfaces do not necessarily have to be flat. They may have any shape, such as, for example, a bent shape.

A floor panel having the characteristics of the fifth aspect of the invention is ideally suited for being manufactured by means of a method, amongst others, according to the first aspect. The aforementioned two flanks at opposite sides of the groove are extremely well suited for receiving a guiding element and, thus, for serving as a guiding groove when transporting such floor panels before, during or after their manufacture.

Moreover, the groove of the floor panels according to the fifth aspect of the invention can be performed such that in respect to positioning in respect to other parts of the floor panel the same properties are obtained as described in respect to the guiding groove of the first aspect of the invention. The particularity herein is that, for example, the groove, in the coupled condition of two floor panels, is at least partially covered by a portion of the aforementioned lower lip.

According to a sixth independent aspect, the invention aims at an improved method for manufacturing floor panels, which, amongst others, offers an enhanced stability when performing profiled edge regions at opposite sides of a panel. The sixth aspect can also be performed advantageously in combination with a method according to the first aspect, in other words, in combination with a guiding groove situated in said profiled edge region, which renders the transport of the panels and/or the processing thereof even more stable.

Herein, the method is of the type that comprises at least the following steps:

transporting the panels through a processing machine by means of at least a first mechanical carrier element and a second mechanical carrier element, wherein the panels, at their opposite first flat panel side and second flat panel side, come into contact with a respective carrier element and wherein at least the first mechanical carrier element, at least of the height of the respective contact with the flat panel side, is freely movable in a direction transverse to the respective flat panel side;

performing profiled edge regions at least at two opposite sides of the panels, while the panels, as aforementioned, are transported through the processing machine and herein are moved, with their edge regions to be profiled, along cutting tools.

It is clear that by "flat panel sides" generally the two largest surfaces of the panels are meant, or, in other words, the surfaces that, in the normal use of the floor panel, form the lower side and the upper side or the decorative side, respectively. In this context, the term "plane" is used only for indicating the upper side and lower side and does not mean that these sides must have a completely flat shape. It is noted that it is also not excluded that the aforementioned flat panel sides have impressions or other unevennesses.

A method of said type is known, for example, from DE 200 20 505 U1. In DE 200 20 505 U1, on the one hand, a belt supported by travel wheels is applied as a first movable carrier element, and, on the other hand, a conveyor chain fixedly installed in a direction of the respective flat panel side is used as a second carrier element. Herein, the travel wheels press the belt in the aforementioned direction against the respective flat panel side, such that the opposite flat panel side comes into contact with the fixedly installed conveyor chain. In other words, the first carrier element adapts in the aforementioned direction to the location of each respective floor panel. Methods, wherein a fixedly installed element is applied as the second mechanical carrier element, however, show reduced grip, when the panels show a certain curvature in length and/or in transverse direction. In those cases, the contact between the second carrier element and the respective panel side is lost, because the first, movable carrier element is no longer capable of pressing the panels onto the fixedly installed second carrier element. For this reason, the panels may be "stuck" in the processing machine, which leads to low quality treatments and a hindrance to production. The loss of contact with one of the carrier elements and/or the temporarily being stuck or slipping of the panels results in an increased risk of scratches and/or reduced gloss of the upper side or decorative side of the panels.

According to this sixth independent aspect, the invention relates to a method of the above-mentioned type, with the characteristic that the second mechanical carrier element also, at least at the height of the respective contact with the flat panel side, is freely movable in a direction transverse to the respective flat panel side, more particularly such that both carrier elements adapt themselves according to the aforementioned direction to the location of each respective floor panel at the height of the aforesaid carrier elements.

The mobility of the mechanical carrier elements at the height of said contact can be obtained in any manner.

So, for example, may one or both of the applied carrier elements, according to a first possibility, have a certain freedom of movement in a direction transverse to the plane of the panels.

According to a second possibility, one or both of the applied carrier elements, at the height of said contact, may consist of a compressible material. It is clear that the invention also relates to a method in which both possibilities are combined.

However the aforementioned mobility may have been obtained, in a preferred form of embodiment mechanical carrier elements are applied, which, at least at the height of the contact with the floor panels, are freely movable in the aforementioned direction over a distance of at least 0.3 millimeters, and still better at least 0.6 millimeters.

It is noted that, for realizing contacts over these distances, in each case when they are in the order of magnitude of 1 mm or larger, other elements must be applied than elements that comprise an air guiding. An air guiding in fact always maintains a constant small gap between its bed and the object to be transported; this is either the panel itself, or a belt, which then is in contact with the panel. Although it is not excluded that an air guiding, such as mentioned above in the introduction, may also have specific advantages, it is generally advantageous to avoid the application of an air guiding, if possible, as the air consumption may form a considerable portion of the cost price of such method.

A method according to the sixth aspect of the invention can preferably be realized with a first and second mechanical carrier element, which both are formed by a belt that, by means of travel wheels, then is pressed against the respective flat panel side. A method, in which only one mechanical carrier element is applied that comprises such positively supported belt, as such is known from the above-mentioned WO 2004/037502, however, the present invention, according to a preferred form of embodiment, relates to a method, where the aforementioned first as well as the aforementioned second mechanical carrier element is performed in such manner.

In comparison with a method in which a conveyor chain is applied as the second mechanical carrier element, the use of belts has the additional advantage that the so-called "polygon effect" will not occur. The polygon effect is occurs at conveyor chains, there, where the chain is reversed over a so-called return wheel. As a result of the length of its links, the chain bends irregularly when reversing. This irregular reversion results in speed variations of the chain and the panels transported thereby. These speed variations in their turn may lead to an inferior processing quality. However, it is not excluded that one or both of the aforementioned mechanical carrier elements, according to the sixth aspect of the invention, may also be performed as a chain that is at least movable at the height of said contact with the flat panel side.

In a preferred form of embodiment, the panels are provided with a guiding groove and does the method also comprise the step of guiding the panels by means of a guiding portion that engages in said guiding groove, while the panels, as aforementioned, are transported through the processing machine.

It is noted that, when performing the aforementioned profiled edge regions, preferably pressure-exerting elements, such as pressure shoes, are applied, which press the panels in the immediate proximity of both opposite edge areas to be profiled with at least one of their flat panel sides onto a counter element, such as a sliding shoe.

In a preferred form of embodiment, the aforementioned pressure-exerting elements are movable independently from said guiding portion, or even better is said guiding portion fixedly installed, or is more particularly rigidly connected to a frame of the processing machine. This arrangement allows a very stable transport of the panels and a correspondingly high quality of the treatments in the machine.

A method, which, as in a preferred embodiment of the sixth aspect, applies a first and a second mechanical carrier element for transporting the panels through a processing machine, wherein both carrier elements are formed by positively supporting belts, as such is of particular importance. Such method is in fact cheaper and more simple than a method, in which the panels are transported between a belt and a conveyor chain, or between a belt and an air bed, whereas such method still allows to obtain an accurate processing. Therefore, the invention, according to its seventh independent aspect, relates to a method for manufacturing floor panels, wherein the method comprises at least the following steps:

transporting the panels through a processing machine by means of at least a first and a second mechanical carrier element, which respectively cooperate with opposite first and second flat panel sides;

providing profiled edge regions at least at two opposite sides of the panels, while the panels, as aforementioned, are transported through the processing machine and therein, with their edge regions to be profiled, are moved along cutting tools;

characterized in that the first as well as the second mechanical carrier element is formed by a belt that is positively supported. By supporting the belts positively, more particularly mechanically, it is excluded that an air guiding is applied to this effect. The air consumption may indeed mean a considerable cost.

Such mechanical support of the belts may be obtained, for example, by applying belts, which are pressed, by means of travel wheels, in the direction of the aforementioned flat panel sides.

In a preferred form of embodiment of the seventh aspect, the panels are provided with a guiding groove, and the method also comprises the step of guiding the panels by means of a guiding portion that engages in said guiding groove, while they, as aforementioned, are transported through the processing machine.

Preferably, the aforementioned panels, in the immediate proximity of both opposite edge regions to be profiled, are pressed by means of a pressure-exerting element, such as a pressure shoe, with at least one of their flat panel sides onto a counter element, such as a sliding shoe.

In a preferred form of embodiment, the aforementioned pressure-exerting elements can be moved independently from the aforesaid guiding portion, or, still better, said guiding portion is fixedly installed and more particularly is rigidly connected to a frame of the processing machine. This arrangement allows a very stable transport of the panels and a correspondingly high quality of the treatments in the machine.

It is clear that a method according to the seventh aspect, or according to the preferred embodiments thereof, can be advantageously employed in combination with a method according to the first aspect of the invention. In other words, it is advantageous with a method according to the seventh aspect to employ a guiding groove situated in the profiled edge region of the panels.

It is also clear that the invention also relates to a device for transporting panels through a processing machine, characterized in that it comprises a first and second mechanical carrier element allowing that the device is employed in a method with the characteristics of the sixth and/or seventh aspect of the invention.

According to an eighth independent aspect, the invention aims at an improved method for packaging floor panels, which allows a particularly smooth and efficient packaging. To this aim, the invention relates to a method for packaging floor panels, of the type, wherein several floor panels, which are provided with coupling parts at least at two opposite sides, are packaged in a box, which is composed of at least one sheet-shaped packaging element by means of a folding process, with the characteristic that at least part of the aforementioned folding process is performed while the packaging element and the floor panels to be packaged have already been brought together.

Preferably, said sheet-shaped packaging element consists of cardboard, in particular corrugated cardboard.

The method according to the eighth aspect of the invention allows to package the floor panels in a smooth manner at a high frequency, as a result of which one packaging machine applying this method has such a high packaging capacity that this latter corresponds to the production capacity of several production lines of floor panels. Hereby, it is noted that such packaging machine may or may not be installed in line with one or more production lines. Also, such packaging machine can be fed with floor panels coming from a magazine in which major amounts of panels are stocked after having been produced on one or more production lines.

A method for packaging floor panels according to the eighth aspect of the present invention also offers the advantage that a buffer magazine for already folded boxes possibly is made redundant.

In a preferred form of embodiment of the eighth aspect of the present invention, the packaging element is folded around the quantity of floor panels to be packaged therein. This is, for example, possible by depositing the quantity of floor panels to be packed on said packaging element, while this, either when it is still unfolded or already partially folded, before, as already mentioned, folding the packaging element around the quantity of floor panels to be packaged. An important advantage of such packaging method is that the box can be assembled very close around the floor panels, such that floor panels in the box can not shift in mutual respect, which might lead to scratches on the decorative layer of the floor panels, to a heightened risk of damage to the coupling parts and/or other parts. In particular, this is of importance with floor panels comprising a core of MDF or HDF and/or wherein the coupling parts substantially consist of MDF of HDF.

In order to obtain a good packaging, preferably, during the folding process, the quantity of floor panels to be packaged and the bottom of the box to be formed first will be positioned against each other, directly or indirectly, and only afterwards the sidewalls will be folded against the quantity of floor panels. This offers the advantage that stacked upon each other floor panels, which are somewhat shifted in mutual respect, automatically will be positioned in mutual respect during folding of the sidewalls.

Preferably, also at least a number of portions of the box are interconnected during the formation thereof by means of glue, more particularly so-called "hot melt" glue. This offers the advantage that a number of complicated steps from traditional folding processes can be excluded.

It is noted that said box further also can be packaged in a plastic film, for example, a shrink film, such that the risk of moisture penetration, for example, during transport or stocking, is restricted. Because a package obtained according to the eighth aspect of the invention can rest very closely against the floor panels, the risk of a floor panel piercing this plastic film is minimized, too, such that an optimum protection against moisture penetration is obtained.

It is also noted that the floor panels in most cases are packaged in a quantity of 5 to 30 panels, and when relatively large panels are concerned, for example, panels that are longer than 1 m, preferably less than 10, such that in all cases the weight of the packaging unit is limited to a weight that is ergonomic for the user of the floor panels and that does not pose too high requirements in respect to the solidity of the packaging material. Within the scope of the invention, it is also possible that panels differing from each other, for example, panels of different length, are packaged together.

A method for packaging floor panels according to the eighth aspect of the present invention can be applied with any form of boxes. So, for example, boxes with inwardly inclined sidewalls can be applied, whereby the sidewalls then are folded against the floor panels. This kind of boxes may, for example, find its application there, where floor panels of differing shape are packed together, such as, for example, when packaging floor panels of different widths together, whereby the floor panels are stacked in layers in such a manner, that preferably the width of the layers decreases from the bottom towards the top in the box. Applying such box also allows for that, when several of such boxes, preferably with their sidewalls towards each other and alternately with the bottom directed upward or downward, are stacked on a pallet, there is almost no lost space or, in other words, that the space taken on the pallet consists almost exclusively of floor panels and of packaging material.

It is noted that according to the eighth aspect of the invention, by a "box" always a packaging element has to be understood that is manufactured from a sheet-shaped element and that, after folding, has at least a bottom and at least two sidewalls. The sheet-shaped element may be manufactured of different materials, however, here it is clear that herein, materials are intended that as such have a certain rigidity, such as, for example, cardboard, corrugated cardboard or the like.

It is clear that the invention also relates to a set of floor panels, with the characteristic that it is packaged by means of a method according to the eighth aspect of the invention.

According to a ninth aspect, the invention also relates to a packed set of floor panels, with as a characteristic that the set of floor panels is packed in a package that consists at least of a folded sheet-shaped element comprising a bottom and a number of upright sidewalls, whereby at least a number of the sidewalls are interconnected by means of glue. Moreover, preferably a shrink film or the like is provided around the whole. According to a variant, it is, however, not excluded to omit the shrink film and to provide the box with a cover lid. Preferably, the box herein is oblong and glue connections are exclusively present at the short sides. This latter allows a smooth production of such boxes, in view of the fact that exclusively glue connections have to be performed at the location of the short sides.

According to a tenth independent aspect, the invention aims at a method for advantageously packaging floor panels of different widths in one and the same package. To this aim, the invention relates to a method for packaging floor panels, more particularly floor panels of the type consisting of rectangular oblong floor panels that are intended for forming a floor covering, whereby these floor panels are industrially manufactured in at least two widths and are provided with coupling parts at least at two opposite sides, wherein floor panels of different widths are provided in the same package, more particularly the same box, with the characteristic that these floor panels are provided in a box in layers, wherein in at least one of these layers at least two floor panels are placed next to each other, with their longitudinal directions substantially parallel to each other.

This method has the advantage that a variety of beneficial packaging possibilities is created for providing and/or presenting such floor panels of different widths in a package, more particularly a box. So, for example, may the floor panels be provided next to each other in successive layers in such a manner that the filling degree of the package is optimized, notwithstanding the fact that different widths are present in one box. This method also allows to provide the floor panels next to each other in such a manner that the presence of different width is immediately, or almost immediately, visible, either immediately through a transparent portion of the package, or rather immediately after such box has been opened and possibly only a number of floor panels has been removed from it.

It is clear that, in order to obtain an efficient packaging, the majority of the layers and preferably all layers take up at least 70% of the internal width of the box, such that the freedom of movement of the floor panels in the package is restricted.

In a preferred form of embodiment, the filling degree of the package, seen in width direction, for each of the aforesaid layers is at least 90%, whereby the filling degree is defined as (A/B)×100, wherein:
A=the sum of the entire widths of the floor panels situated next to each other in one layer;
B=the internal width of the box.

By "width of the floor panels", herein the total width of the floor panels is meant, including the coupling means. In this form of embodiment, the risk of a mutual shifting of the floor panels is minimized, such that, for example, the risk that the decorative layer of the floor panels, as, for example, laminate panels, becomes damaged, is also restricted. With floor panels that are provided with coupling parts of MDF of HDF, the thus limited freedom of movement also results in a restriction of the risk of damage at these coupling parts.

The internal width of the box may, for example, be chosen such that it substantially corresponds to the largest of the aforesaid different widths of the floor panels. In this manner, the shifting of the widest floor panels is optimally restricted or even excluded. Additionally, this choice leads to a sturdy packaging, as the widest panels can contribute to the strength of the package.

It is clear that a method for packaging according to the tenth aspect requires less efforts in the distribution. In order to obtain that the installing person has too little or too much of a certain width, one box moreover preferably has as many floor panels of each width, and still better as many or almost as many meters run of floor panels of each width.

In a preferred form of embodiment, the method is applied for packaging floor panels of three different widths in the same package, wherein the sum of a first width and a second width is a whole, or almost a whole, multiple of the third width. So, for example, does the sum of the widths of the narrowest and of the widest floor panels substantially correspond to two times the width of the floor panels of intermediate width. According to an important form of embodiment of the invention, the present example allows a very compact packaging, whereby according to this form of embodiment, on the one hand, at least layers are formed, which, seen in a cross-section of the package, comprise exactly two floor panels that are of the intermediate width, and, on the other hand, layers are formed, which, also seen in a cross-section of the package, at the same time comprise only two floor panels, of which a first, however, is of the smallest width and a second is of the largest width.

It is noted that in one and the same package, also floor panels of different widths can be combined with floor panels of different lengths, preferably in a manner that does not allow any, or almost any, mutual shifting among the different floor panels, in width direction of the floor panels as well as in the longitudinal direction of the floor panels. Preferably, herein in one box of each width the same amount of meters run shall be provided, and/or of each length the same amount of square meters. For packaging these panels, a combination can be made of the present invention according to the tenth aspect and the packaging method for panels of different lengths that is known from BE 1015299.

The packaging method that is applied according to the tenth aspect of the invention preferably can be a method such as described by means of the eighth aspect of the invention, as such packaging still further restricts the shifting of the panels, however, other packaging methods can be applied as well, for example, packaging in an already assembled cardboard box and/or a shrink film.

It is noted that avoiding scratches by means of applying a method according to the eighth and/or the tenth aspect is of particular importance with laminate panels.

BRIEF DESCRIPTION OF DRAWINGS

With the intention of better showing the characteristics of the invention, hereafter, as an example without any limitative character, several preferred forms of embodiment are described, with reference to the accompanying drawings, wherein:

FIG. 1 schematically represents a method according to the first aspect of the invention;

FIG. 2 represents a cross-section according to the line II-II in FIG. 1;

FIGS. 4 to 7 represent cross-sections according to the lines IV-IV, V-V, VI-VI, VII-VII in FIG. 1;

FIG. 8 represents a variant of the invention;

FIGS. 9 to 12 represent floor panels, which have been obtained by means of a method according to the invention;

FIGS. 16 to 21, in perspective, represent views of the packaging steps taking place in the areas indicated by F16, F17, F18, F19, F20 and F21 in FIG. 15;

FIG. 22 represents a view in perspective onto a set of floor panels that is obtained, amongst others, by means of a method according to the tenth aspect of the invention;

FIG. 23 represents a cross-section according to the line XXIII-XXIII in FIG. 22;

FIG. 24 represents a variant of the tenth aspect according to a same view as in FIG. 23;

FIGS. 34 and 35 represent a method according, amongst others, the third aspect of the invention, wherein FIG. 35 represents a cross-section according to line XXXV-XXXV in FIG. 34;

FIGS. 36 and 37 represent a variant of a method with, amongst others, the characteristics of the third aspect;

FIGS. 45 to 47 represent a method with the characteristics of, amongst others, the sixth aspect of the invention, where FIGS. 46 and 47 represent cross-sections according to line XLVI-XLVI in FIG. 45 and line XLVII-XLVII in FIG. 46, respectively;

FIG. 49 represents a cross-section according to line XLIX-XLIX in FIG. 48.

DETAILED DESCRIPTION OF VARIOUS EMBODIMENTS

FIG. 1 schematically shows how floor panels 1 can be obtained by means of a method according to the first aspect of the present invention. In the represented example, this relates to rectangular floor panels 1, which, by means of two processing machines, more particularly continuous machines 2, are provided with profiled edge regions 5A-5B at their longitudinal sides 3A-3B as well as at their transverse or short sides 4A-4B. Herein, the so-called "continuous milling" is applied. First, the panels 1 are moved with their longitudinal sides 3A-3B over the mechanical cutting tools 6. Then their short or transverse sides 4A-4B are subjected to similar treatments.

It is noted that the term "panels" substantially is applied as long as the floor panels have not entirely been provided with profiled edge regions, whereas the term "floor panels" is applied when these profiled edge regions indeed have been provided. In both cases, however, the reference number 1 is applied thereto.

Figure 3:
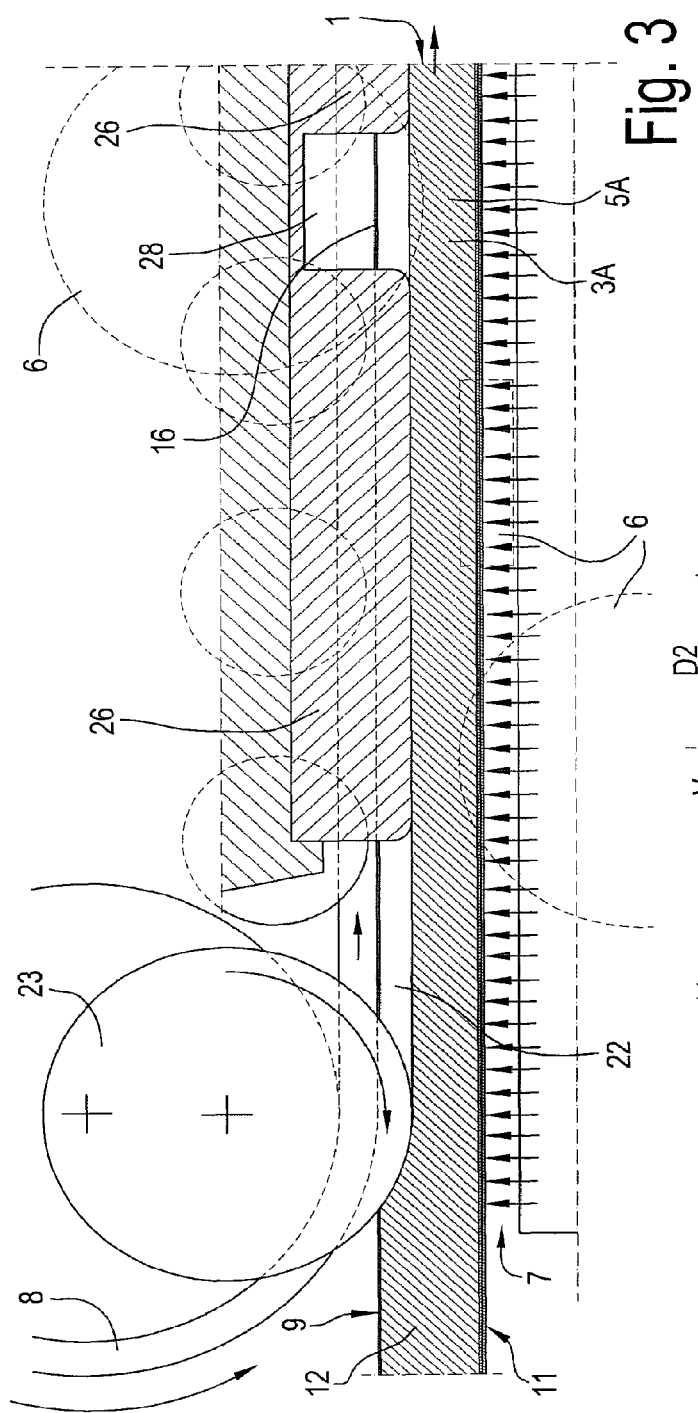
FIG. 3 represents a cross-section according to the line III-III in FIG. 2.

FIGS. 2 and 3 represent how such panels 1 can be transported through the first processing machine 2. To this aim, the machine 2 has an air bed 7 and belts, more particularly upper belts 8. The air bed 7 presses the panels 2, which are lying upside down, with their lower side 9 against the driven upper belts 8, which carry the panels 1 along by means of friction. At the height of their edges, the panels 1, by means of shoes or supports 10, are maintained on a well-defined level, whereas the panels 1 are directed with their decorative side 11 downward.

The represented panels 1 consist of laminate material of the "DPL" type, however, as explained in the introduction, it is clear that the invention is not restricted to the manufacture of panels 1 consisting of such material.

The represented laminate material comprises a core 12, a decor layer 13, as well as a so-called overlay 14, whereby the decor layer 13 and overlay 14 together form the top layer 15 and consist of carrier sheets impregnated with synthetic material, which are pressed upon the core 12 and whereby the decor layer 13 also is provided with a printed decor. The core 12 consists, for example, of a wood-based material, such as MDF or HDF. At their lower side 9, which here, when the profiled edge regions 5A-5B are formed, is oriented upward, the panels 1 are provided with a backing layer 16, which consists of a carrier sheet soaked in resin.

FIG. 2 shows that the profiled edge regions 5A-5B to be formed of the floor panels 1 comprise coupling parts 17A-17B, more particularly in the form of a tongue 18 and a groove 19. Herein, the tongue 19 is bordered by means of a lower lip 20 and upper lip 21, whereby in the example, the lower lip 20 to be formed extends beyond the upper lip 21. In a coupled condition of at least two of the aforementioned floor panels 1, the represented coupling parts 17A-17B, in a horizontal as well as in a vertical direction, result in a mutual locking of the respective floor panels 1.

As can be seen in FIG. 2, according to the invention a guiding groove 22 is formed at the lower side 9 and, as will become clear from the further described figures, profiled edge regions 5A-5B are formed, in such a manner that one of the profiled edge regions, in this case, the edge region 5A, extends such that this region, seen in a cross-section of the floor panels 1, transverse to the guiding groove 22, in other words, seen in the plane of FIG. 2, extends at the lower side 2 of each respective floor panel 1 at least up to the guiding groove 22.

Preferably, as represented in FIG. 3, when the method according to the first aspect is applied for manufacturing rectangular floor panels 1, the guiding groove 22 will extend over the entire length of a longitudinal side 3A of the floor panels 1. Within the scope of the invention, it is also possible that the guiding groove 22 is applied at a narrow side 4A or 4B of such rectangular floor panel 1, or at a longitudinal as well as at a narrow side.

In the example of FIG. 2, the profiled edge region 5A that extends at the lower side 9 of the floor panels 1 at least up to the guiding groove 22, is performed at that side at which the aforementioned tongue 18 is formed. FIG. 2 also shows how the guiding groove 22 can be provided by means of a saw treatment 23. In this case, this saw treatment 23 takes place in the processing machine 2 in which the floor panels 1 are provided with their profiled edge regions 5A-5B at their longitudinal sides 3A-3B.

Preferably, the guiding groove 22, measured in a horizontal direction, is situated at such a distance from the vertical plane V, in which the coupled floor panels 1 adjoin each other with their upper sides 24, that one or both of the following criteria are met:

such that the distance D1 between the aforementioned vertical plane V and the side 25A of the guiding groove 22 situated closest thereto, is larger than 3 mm;

such that the distance D2 between said vertical plane V and the side 25B of the guiding groove 22 that is situated the farthest from it is smaller than 12 mm.

Further, it is preferred that the guiding groove 22 is realized such that it has a width B between 1 and 4 mm, and still better between 1 and 2 mm, and shows a depth D of 1 to 4 mm, and still better 1.5 to 2.5 mm.

Figure 15:
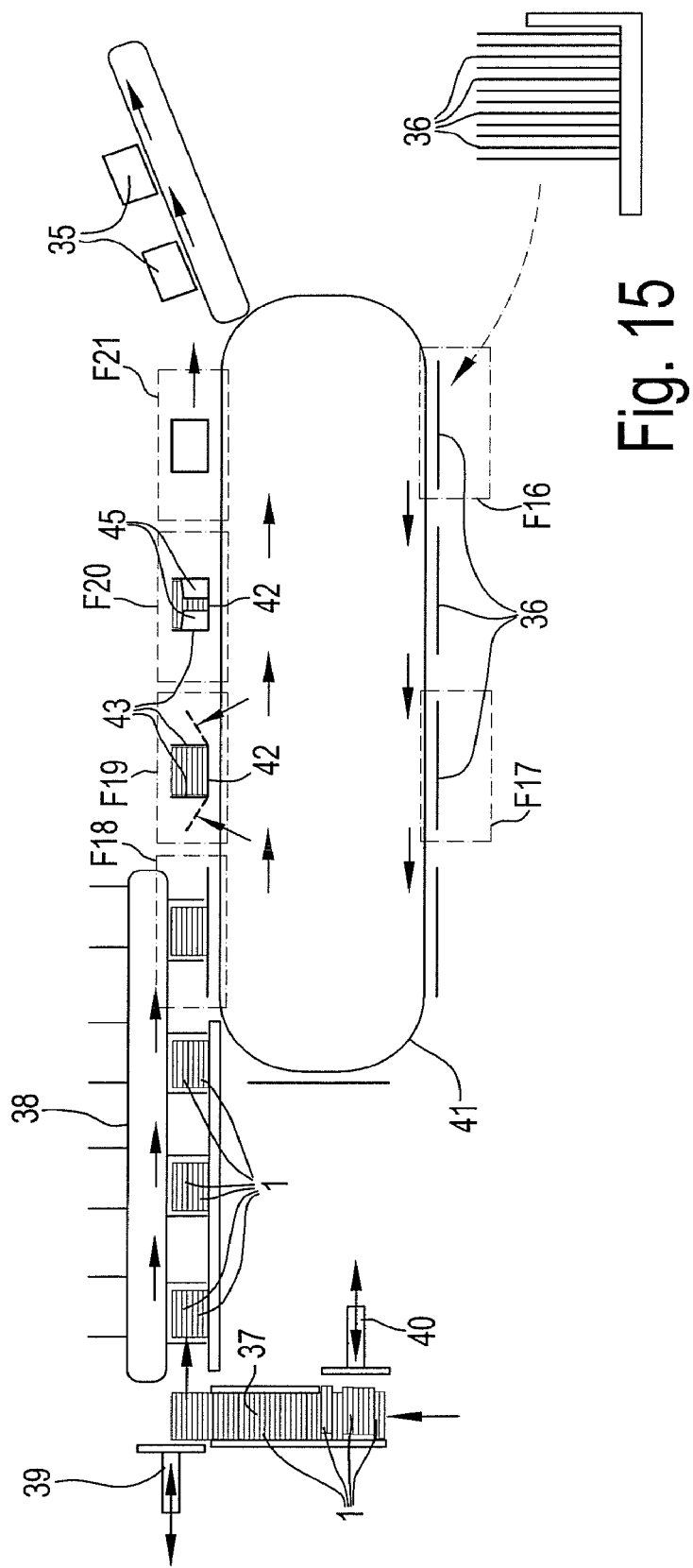
FIG. 15 shows a method according to the eighth aspect of the invention.

Forming of the aforementioned profiled edge regions 5A-5B and coupling parts 17A-17B in this case takes place by means of mechanical tools 6, such as milling cutters. As represented in FIGS. 3 to 5, herein the panels 1 are moved with the guiding groove 22 over guiding portions 26, in this case in the form of a guiding knife, with the purpose of guiding the panels 1 during the formation of at least a portion of the profiled edge regions 5A-5B. FIG. 4 shows that by means of a rough milling cutter 6 part of the top layer 15 and of the core 12 is removed. FIG. 15 shows how the tongue 18 substantially is formed. This figure shows that in some cases it is necessary to provide a recess 27 in a shoe 10, such that the respective mechanical tool 6 can rotate freely.

As represented in FIG. 3, the panels 1 are moved over at least two guiding portions 26, which together form the guiding knife, between which, at least over the height of the guiding groove 22, a gap 28 is present.

The gap 28 allows for that, as represented in FIG. 6, one of the aforementioned cutting tools 6 can be placed in this gap in order to perform a milling treatment up to the guiding groove 22. The represented milling treatment relates to the forming of the lower side of the tongue 18. This milling treatment forms, amongst others, a locking part 29A at the panels 1 that allows that two of the finally realized floor panels 1, in coupled condition, are locked in horizontal direction. In FIG.

6, with one and the same cutting tool 6 as well a portion of the actual coupling parts 17A is formed, as simultaneously a material portion is removed that extends up to at least the location where the guiding groove 22 is formed.

FIG. 7 shows the finishing treatment that forms the upper edge 24 of the panel 1. In the represented example, the guiding portions 26 herein are no longer active at the height of the location where this finishing treatment takes place, however, it is clear that according to a variant such guiding portion 26 might also be continued up to that point.

It is noted that, as becomes quite clear from FIGS. 6 and 7, after forming the profiled edge regions 5A-5B, at least a remainder of the guiding groove 22 remains present, in other words, at least two lateral flank portions of the sides 25A-25B of this guiding groove 22 are maintained at the lower side 9 of the floor panels 1, such that they can be applied for further processing.

FIG. 8 shows a variant of a method according to the first aspect of the present invention. Herein, the aforementioned finishing treatment takes place after a rough-machining treatment, such as the one of FIG. 4. Thereafter, treatments may follow as those described in respect to FIGS. 5 and 6. The particularity of this embodiment is that also at the height of the finishing treatment, the guiding portion 26 is situated in the guiding groove 22, which enables a precise edge treatment. In this manner, by means of a shoe 10, it is also possible to give a better support to the edge regions of the floor panels 1 at the height of the treatment. The precision is particularly important in this finishing treatment, as this determines the final dimensions of the floor panels 1.

Generally, it is noted that the aforementioned shoes 10 preferably are moveable independently from the guiding portions 26 and that more preferably the guiding portions 26 are fixedly connected to a frame of the processing machine or continuous machine 2.

FIG. 9 represents two floor panels 1 in a coupled condition, which are manufactured by means of a method according to the first aspect of the invention. Hereby, the guiding groove 22 and the profiled edge regions 5A-5B are performed such that the guiding groove 22, in a coupled condition of two of such floor panels 1, is at least partially covered by a material portion 30. In this example, the aforementioned material portion 30 is formed by a portion of the lower lip 20 of the groove 19.

The profiled edge regions 5A-5B of the floor panels 1 from the example of FIG. 9 comprise coupling parts 17A-17B, which are performed with locking parts 29A-29B that engage behind each other and in this manner perform a locking in horizontal direction. The locking part 29B is situated in a portion of the lower lip 20 that extends beyond the upper lip 21. Also the aforementioned material portion 30 that partially covers the guiding groove 22, is situated in the portion of the lower lip 20 that extends beyond the upper lip 21. In the coupled condition, the respective locking part 29B is partially situated in the guiding groove 22, or at least in a space 31 that originally formed part of the guiding groove 22.

Figure 10:
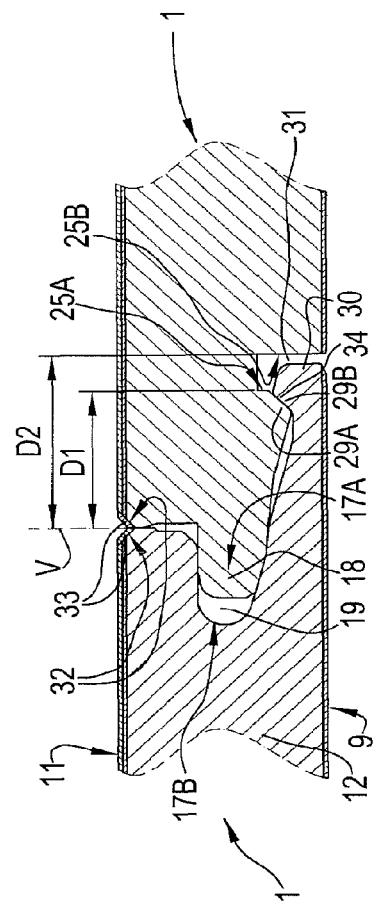

FIG. 10 shows a variant, wherein, in the represented coupled condition, the guiding groove 22 is largely covered by a material portion 30, in this case a material portion 30 that is situated in the lower lip 20. The represented floor panels are also provided with a bevelled edge 32 at their upper side 24, which bevelled edge is obtained by removing a material portion at the respective upper side 24 and the subsequent covering thereof with a decorative layer 33.

From FIGS. 9 and 10, it is clear that the forms of embodiment represented herein also correspond to the characteristics of the fifth aspect of the invention.

Figure 11:
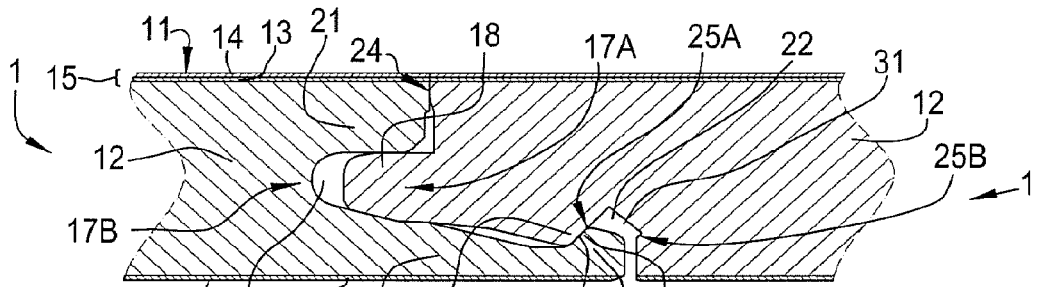

FIG. 11 shows a floor panel 1 that is obtained according to a variant of the first aspect of the invention. Herein, the guiding groove 22 comprises two substantially parallel sides, flanks or flank portions 25A-25B, which are not vertical. Herein, one of these flanks 25A forms a locking part 29A at the edge of the floor panel 1 where the tongue 18 is realized. This locking part 29A cooperates with the locking part 29B, which is situated in the lower lip 20, and herein has a contact surface 34 that coincides with one of said flanks 29A.

Figure 12:
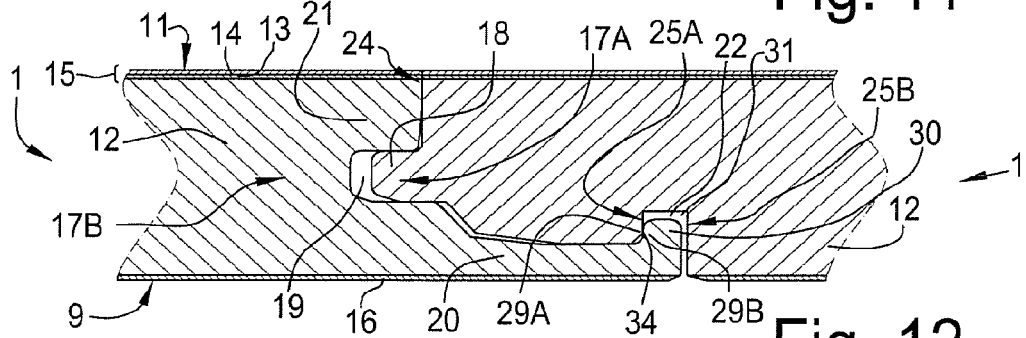

In FIG. 12, the represented floor panels comprise a guiding groove 22 with two substantially parallel and substantially vertical flanks 25A-25B, where one of these flanks 25A also forms a locking part 29A at the edge of the floor panel 1 where the tongue 18 is realized. The contact surface 34 that is formed when cooperating with the locking part 29B, which is situated in the lower lip 20, coincides with one of said flanks 25A.

Figure 13:
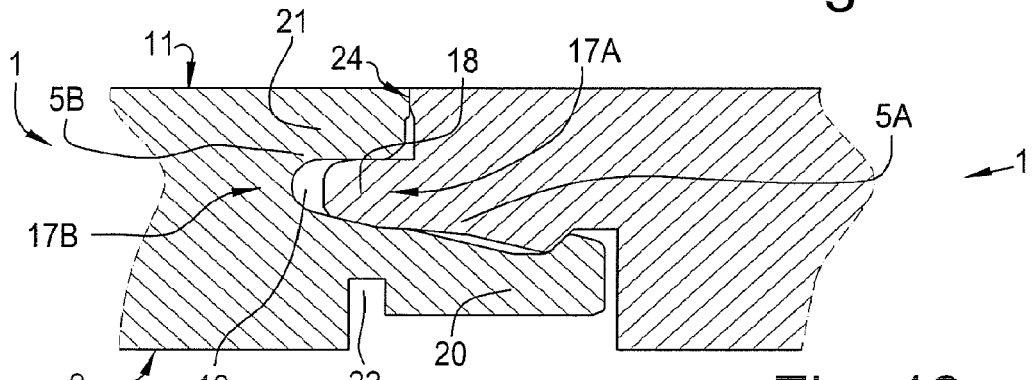
FIG. 13 represents a floor panel that is obtained according to a variant of the first aspect.

FIG. 13 represents a floor panel 1 that is obtained according to another variant of the first aspect of the invention. Herein, the profiled edge region 5B, which extends at the lower side 9 of the panel 1 at least up to the guiding groove 22, is realized at the side 3B-4B of the panel 1 at which the groove 19 is formed. It is noted that this method is particularly advantageous where a certain flexibility is expected from the lower lip 20, as this is the case, for example, with some so-called "snap-on connections", wherein during connecting two of such floor panels 1 a bending of this lower lip 20 is required. Thus, this method can promote or even determine this required flexibility of the lower lip 20 in thicker, for example, solid wooden floor panels 1. In particular, the guiding groove 22 is provided at such a distance from the upper edge 24 of the floor panels 1, that it is situated at least partially, and still better entirely, in that portion of the lower lip 20 that extends below the upper lip 21.

Figure 14:
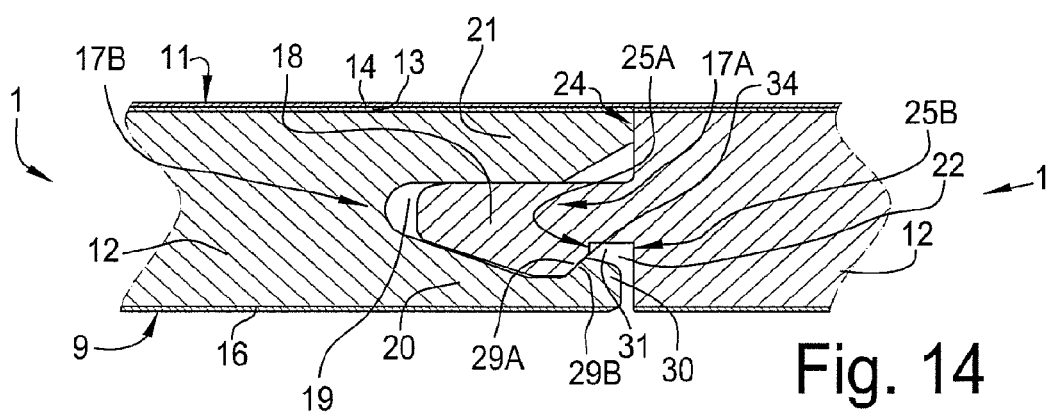
FIG. 14 represents floor panels with the characteristics of, amongst others, the fifth aspect of the present invention.

FIG. 14 represents two more floor panels 1 in a coupled condition, which, amongst others, meet the fifth aspect of the invention and which are obtained, for example, by applying a method according to the first aspect. The respective floor panels 1 comprise coupling parts 17A-17B, which are performed substantially in the form of a tongue 18 and a groove 19. In this case, the upper lip 21 and the lower lip 20 that limit the groove 19 are almost equally long.

FIGS. 15 to 21 show a method for packaging floor panels 1 according to the eighth aspect of the present invention. Hereby, several floor panels 1, which, at least at two opposite sides 3A-3B and/or 4A-4B, are provided with coupling parts, for example, 17A-17B, as described above, are packaged in a box 35. This box 35 consists of at least one sheet-shaped packaging element 36 that is composed by means of a folding process.

According to the packaging process represented in FIG. 15, floor panels 1 are supplied in stacks by pushing a fixed number of such floor panels 1, in this case seven, from a stack 37 onto a transport device 38 by means of a to- and fro-moving drive element 39. Said stack 37 is each time filled up from below and ordered by means of a pressing element 40, such that the floor panels 1 are lying precisely one above the other. The supply of the packaging elements 36 here takes place by providing them one after the other on a second transport device 41.

Said transport devices 38 and 41 bring the floor panels 1 and the packaging elements 36 together during the folding process, after which the packaging elements 36 are folded around the quantity of floor panels 1 to be packed therein and subsequently the packed floor panels 1 are transported off, such as schematically represented at the uppermost portion of the transport device 41. When bringing them together, the floor panels 1 are put on the aforementioned packaging element 36, while the packaging element 36 either is still unfolded or is already partially folded, before, as aforementioned, folding the packaging element 36 around the quantity of floor panels 1 to be packaged. Preferably, the panels 1 are automatically deposited at the right place on the packaging element 36. This is possible, for example, by adjusting the supply from both aforementioned transport devices 38 and 41 to each other, for example, by means of sensors that detect the location of the floor panels 1 as well as of the packaging elements 36 and regulate the speed of the respective supplies.

Figure 16:
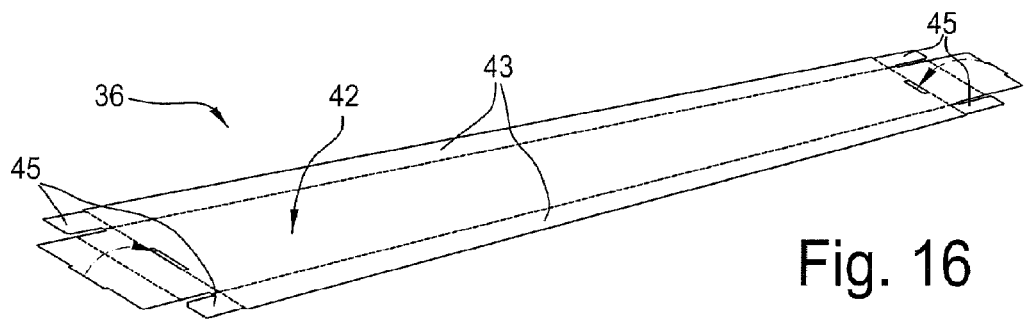
Figure 17:
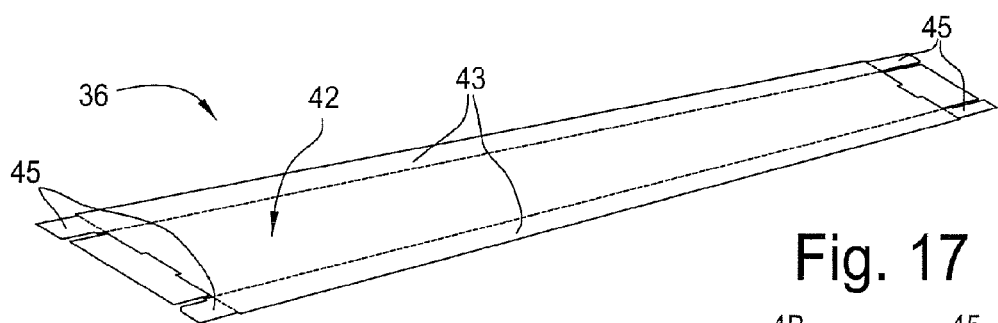
Figure 18:
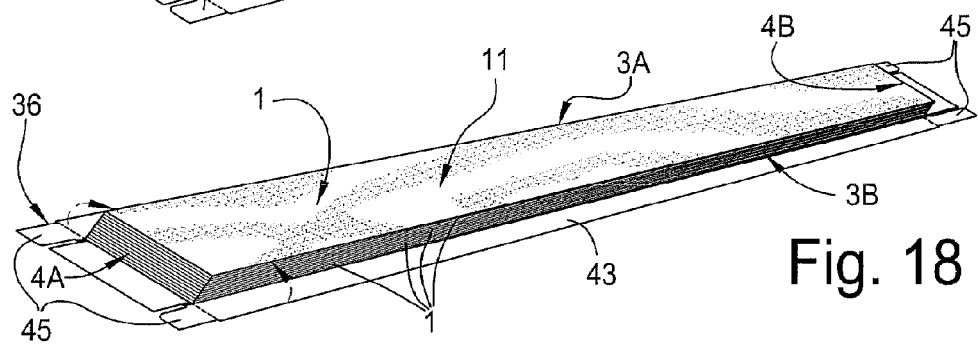
Figure 19:
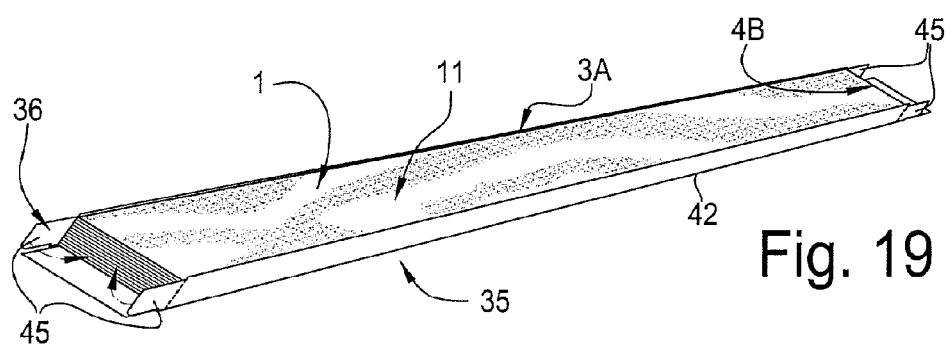

FIGS. 16 through 21 show how such packaging element 36 can be folded in various successive stages. FIGS. 16 and 17 show that, in this example, the folding process is performed in part, before the packaging element 36 is brought together with the floor panels 1. During the further course of the folding process, represented in FIGS. 18 to 21, a box 35 with a bottom 42 and sidewalls 43 is formed, wherein the quantity of floor panels 1 and the bottom 42 first, directly or indirectly, are positioned against each other and only afterwards the sidewalls 43 are folded against the quantity of floor panels 1. Preferably, at least a number of portions of the box 35 during the formation thereof are connected by means of glue 44, more particularly so-called "hot melt" glue. In the represented example, the portions that are connected by means of glue 44 can be restricted to the transverse walls of the box 35, which in this manner are connected to the flaps 45.

It is clear that the box 36 represented in FIGS. 16 to 21 also meets the characteristics of the ninth aspect of the invention.

FIGS. 22 and 23 represent a set of floor panels 1, which is obtained by means of a method according to, amongst others, the tenth aspect of this invention. In this method for packaging floor panels 1, it is started from rectangular oblong floor panels 1, which industrially have been manufactured in at least two widths, in this case three widths B1-B2-B3, and are provided with coupling parts at least at two opposite sides 3A-3B. Herein, floor panels 1 of different width are provided in the same package, more particularly in the same box 35, and preferably afterwards have been wrapped with a film 46, for example, a shrink film.

The floor panels 1 are provided in the box 35 in layers 47, wherein in at least one of these layers 47 at least two floor panels 1 are placed next to each other, with their longitudinal directions substantially parallel to each other. The filling degree of the package, seen in width direction, for each of the layers 47, as represented, preferably is at least 90%. In the example of FIG. 23, the filling degree is defined as (B1+B2)/W in respect to the layers 47 in which two floor panels 1 are provided next to each other, and B3/W in respect to the layers 47 in which only one floor panel 1 is provided. Wherein B1, B2 and B3 relate to the various total widths of the floor panels 1 and W relates to the internal width of the box 35. In this example, it applies that the sum of a first width B1 and a second width B2 is a whole, or almost a whole, multiple of the third width B3 and in this case is equal, or almost equal, to the width B3 of the widest floor panels 1.

FIG. 24 shows an important variant of such set of floor panels 1. This set is obtained by applying a method according to the tenth aspect of the invention, wherein, on the one hand, layers 47 are formed, which, seen in a cross-section, comprise exactly two floor panels 1 that have the intermediate width B2, and, on the other hand, layers 47 are formed, which, seen in cross-section, also comprise only two floor panels 1, of which a first, however, has the narrowest width B1 and a second has the largest width B3. In this example, the widths are chosen such that the sum of the width B1 of the narrowest floor panels 1 and the width B3 of the widest floor panels 1 substantially corresponds to two times the width B2 of the floor panels 1 of intermediate width.

Figure 25:
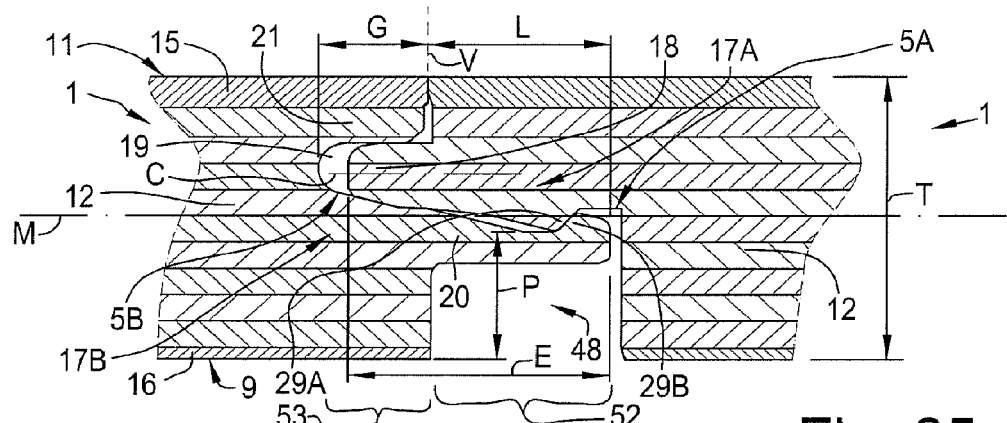
FIGS. 25, 26, 27, 28, 29A, and 29B represent floor panels according to the invention.

With reference to FIG. 25, it is noted that the present invention, according to a particular independent eleventh aspect thereof, also relates to a floor panel 1 that, at least at two opposite edges, is provided with profiled edge areas 5A-5B, which, on the one hand, comprise coupling parts 17A-17B, which substantially are performed as a tongue 18 and a groove 19, which is limited in downward direction by a lower lip 20, wherein said coupling parts 17A-17B, in a coupled condition of two of such floor panels 1, effect a locking in vertical direction, and, on the other hand, comprise locking parts 29A-29B, which, in a coupled condition of two of such floor panels 1, result in a locking in horizontal direction, wherein at least one of said locking parts 29A is provided on the tongue 18, with the characteristic that the floor panels 1 possess an overall thickness T of at least 15 millimeters and that in the lower lip 20 at least one recess 48 is provided, which extends at least from the distal end and/or from the underside of the lower lip 20 into this latter and which weakens the lower lip 20 in such a manner that the latter obtains an increased flexibility. It is noted that by the distal end of the lower lip 20, the frontal end of this lip is meant. By the underside of the lower lip 20, the theoretical underside is meant, which this lip 20 would possess in the case that the aforementioned recess 48 were not present.

Such increased flexibility generally results in a better coupling. Due to the flexibility, the coupling parts can adapt better to each other, and it is also possible to produce the coupling parts with somewhat overlapping contours, for example, in order to create a so-called pretension. Also, the flexibility allows a certain mobility in the coupling, as a result of which material stresses are reduced, when, as the floor panels are walked on, certain movements should be induced in the coupling.

Such flexibility is also particularly useful when coupling parts 17A-17B and locking parts 29A-29B are intended, in which the lower lip 20, when coupling two of such floor panels 1, is forced to perform a bending at least during a part of the coupling movement that is made therein, for example, in the case that a well-defined snap-on effect is desired.

According to the invention, the recess 48 allows to obtain a good coupling also in relatively thick floor panels, even by means of compact profiled edge regions 5A-5B.

The coupling means 17A-17B and locking parts 29A-29B that are represented in FIG. 25 are performed such that they allow that the respective two floor panels can be laterally interconnected or coupled to each other, as well as by turning the floor panels into each other along their edges, as by shifting them laterally towards each other and snapping them together. However, it is not excluded that, according to two variants, either coupling means 17A-17B are employed that exclusively allow to have the floor panels 1 engage laterally into each other by means of a turning movement, or coupling means 17A-17B are employed that exclusively allow to couple the panels 1 by shifting them towards each other.

As represented in FIG. 25, the locking part 29A, which is situated on the tongue 18, and the locking part 29B, which in this case is situated on the lower lip 20, show mutually cooperating contact surfaces. As represented, herein it is preferred that the recess 48 has at least a portion, which, in respect to the aforementioned contact surfaces, is situated proximally in respect to the panel 1, in other words, is situated in FIG. 25 to the left from the aforementioned contact surfaces. Such form of embodiment makes sure that, at least at the location of the aforementioned contact surfaces, there is a good flexibility in the coupling.

It is noted that the represented recess 48 of FIG. 25 can have been obtained as a direct consequence of the treatment of the lower side 9 of the floor panel 1.

The recess 48 and the floor panel 1 that are represented in FIG. 25, show several features, which each, separately or in combination, contribute to obtaining the aforementioned increased flexibility and/or contribute to compact profiled edge regions 5A-5B, which still offer a solid coupling. This relates to the following features:

- the groove 19 is bordered by said lower lip 20, as well as an upper lip 21, wherein the lower lip 20 distally extends beyond the upper lip 21;
- the floor panel 1 shows the characteristics of the preceding paragraph, and the length L of the portion of the lower lip 20 that distally extends beyond the upper lip 21, measured in horizontal direction, moreover is smaller than the thickness T of the floor panel 1;
- in coupled condition of two of such floor panels 1, the horizontal distance E between the tip of the tongue 18 and the distal end of the lower lip 20 is smaller than 1.5 times the thickness T of the floor panel 1;
- seen in a cross-section, the global center line C through the tongue 18 is situated above the center line M of the floor panel 1;
- the smallest vertical distance P between the upper side of the lower lip 20 and the plane that is determined by the lower side 9 of the floor panel 1 is larger than 0.2 times the thickness T of the floor panel 1.

It is noted that FIG. 13, that already has been described above, also forms an example of the eleventh aspect of the invention. Instead of a rectangular recess 48, as in FIG. 25, in FIG. 13 use is made of a recess that is formed by the combination of the guiding groove 22 and a material removal along the underside of the lower lip 20. Thus, FIG. 13 forms an example where the intended recess extends from the distal end as well as from the underside of the lower lip 20 inward into the floor panel 1.

Figure 26:
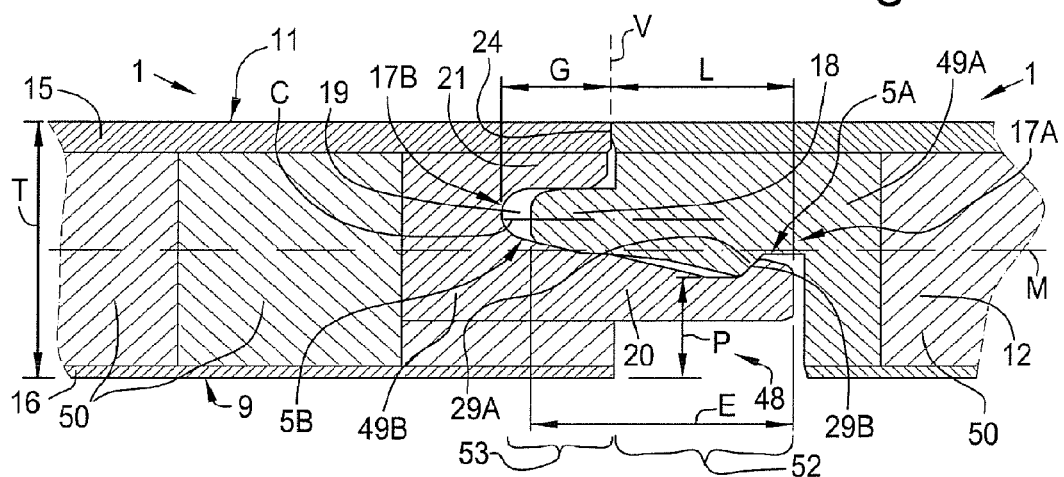

FIG. 26 shows still another possibility for obtaining such recess 48. To this aim, the coupling part 17B, more particularly the groove 19, together with the locking part 29B, is formed in an insertion part 49B, which preferably, when the coupling parts 17B were performed, already was a part of the core 12 of the panel 1. In this case, the recess 48 also extends from the distal end as well as from the underside of the lower lip 20 into this latter.

Such configuration can be employed, for example, as represented, when the core 12 of the floor panel 1 consists of lamellae 50, as can be the case with composed parquet, in other words, panels that are composed of several parts, of which the top layer 15, anyhow, consists of a noble kind of wood. It is noted that also the coupling part 17A, amongst which the tongue 18, can be realized in a, whether or not protruding, insertion piece 49A.

Figure 27:
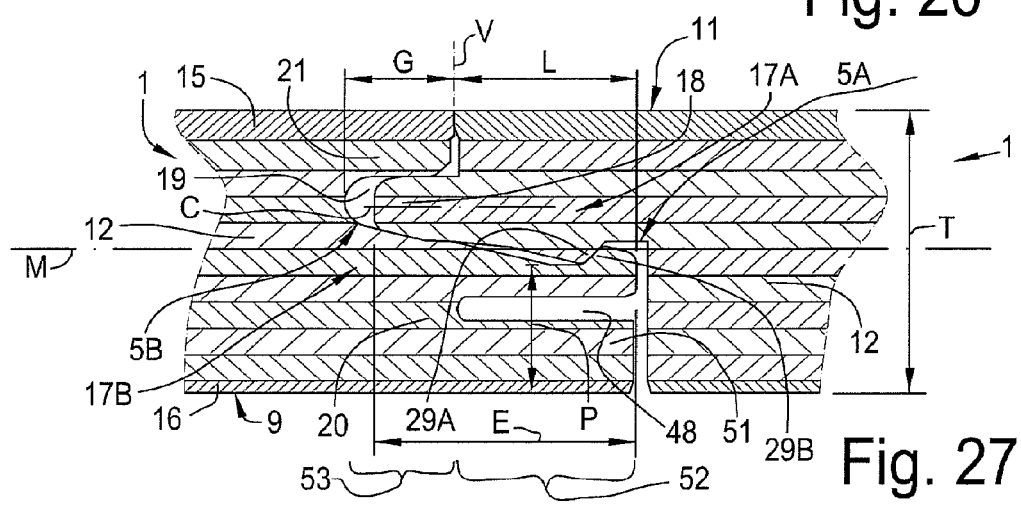

FIG. 27 shows an important preferred form of embodiment of said eleventh aspect, in which the recess 48 is performed in the form of a groove. Moreover, this groove extends from the distal end of the lower lip into this latter and is substantially parallel to the plane of the floor panel 1. In the represented example, the groove or the recess 48 in downward direction is bordered at least partially, however, in this case entirely, by a material portion 51 of the lower lip 20. Herein, in the example, the backing layer 16 extends up to the distal end of said material portion 51. The particular importance of this embodiment lies, amongst others, in the fact that it effects a particularly sturdy coupling by means of compact profiled edge regions 5A-5B. The floor panel 1 in fact keeps resting with its entire lower side 9 on the underlying surface, whereas the lower lip still has the possibility to bend out during the coupling movement, and possibly has the possibility to remain bent out after coupling, while the lower side 9 of the floor panel 1 is not deformed. That the lower lip 20 remains bent out, may possibly occur when the coupling parts 17A-17B and the locking parts 29A-29B are made with an overlapping contour, such that a so-called "pretension" is obtained. The principle of "pretension" is known from WO 97/47834. The continued presence of the backing layer 16 also reduces the risk of moisture penetration in the zone of the profiled edge regions 5A-5B or in the remainder of the core 12 of the floor panel 1.

It is clear that the backing layer 16, according to a variant, does not necessarily have to continue up into the distal end of the portion 51. Also, such floor panel 1 can be performed without such backing layer 16, whereby the floor panel 1 then over its entire thickness T, possibly with the exception of the top layer 15, consists of plywood.

Figure 28:
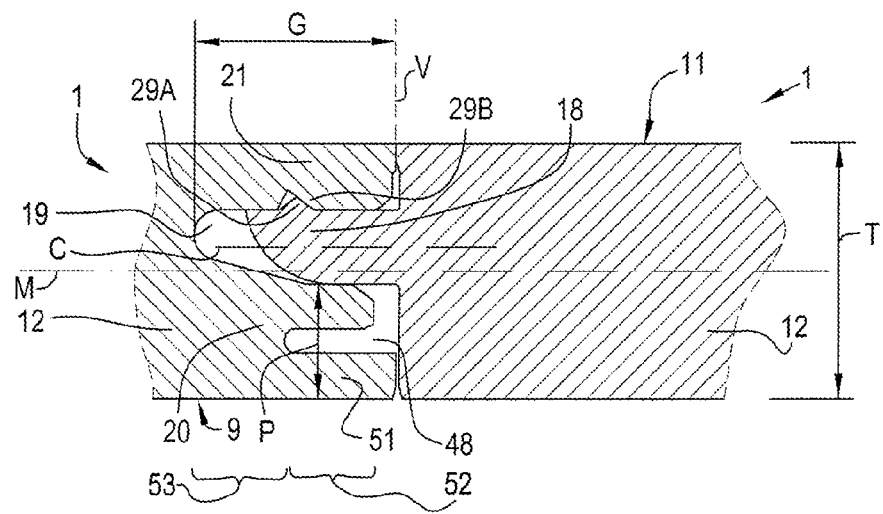

FIG. 28 shows a form of embodiment where the locking part 29B, which cooperates with the locking part 29A on the tongue, is situated in the upper lip 21. Also in this form of embodiment, the recess 48 is formed as a groove extending from the distal end of the lower lip 20 into this latter and is substantially parallel to the plane of the floor panel 1. Also, the groove or recess 48 herein is performed so deep that at least a portion thereof, in respect to the panel 1, is situated proximally in respect to the contact surfaces between the locking parts 29A-29B. Also special at the depicted form of embodiment is the fact that the material portion 51, which borders the recess 48 or the groove in downward direction, is made longer than the material portion of the lower lip 20 that borders the recess 48 in upward direction.

Figure 29A:
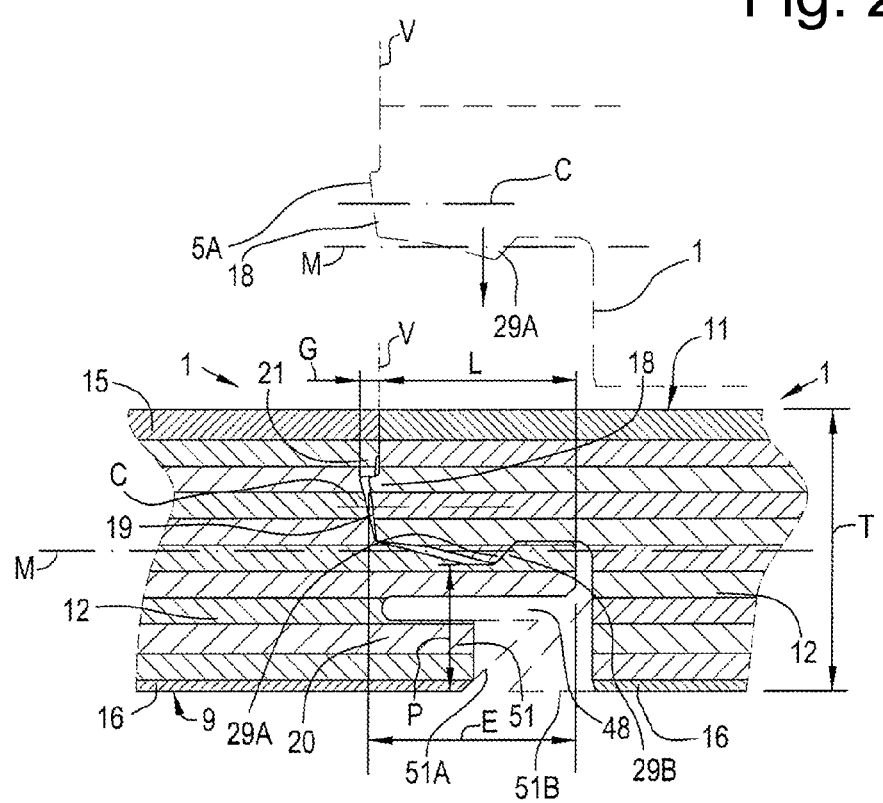

In the form of embodiment that is represented in FIG. 29A, the coupling parts 17A-17B and the locking parts 29A-29B are performed such that they allow to couple two of such floor panels by bringing the floor panels with a substantially vertical movement towards each other. In the example, herein additionally the material portion 51, which borders the recess 48 or the groove in downward direction, is made shorter than the material portion of the lower lip 20 that borders the recess 48 in upward direction.

Figure 29B:
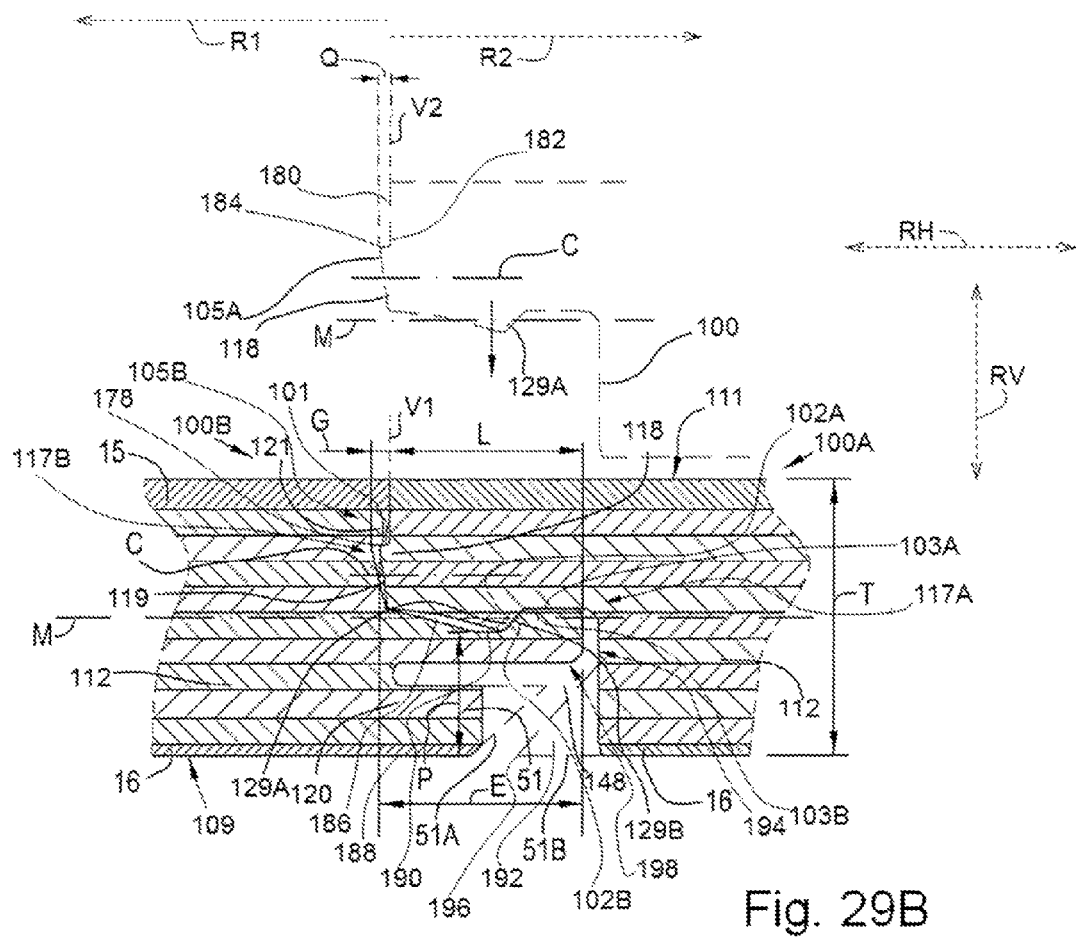
Figure 30:
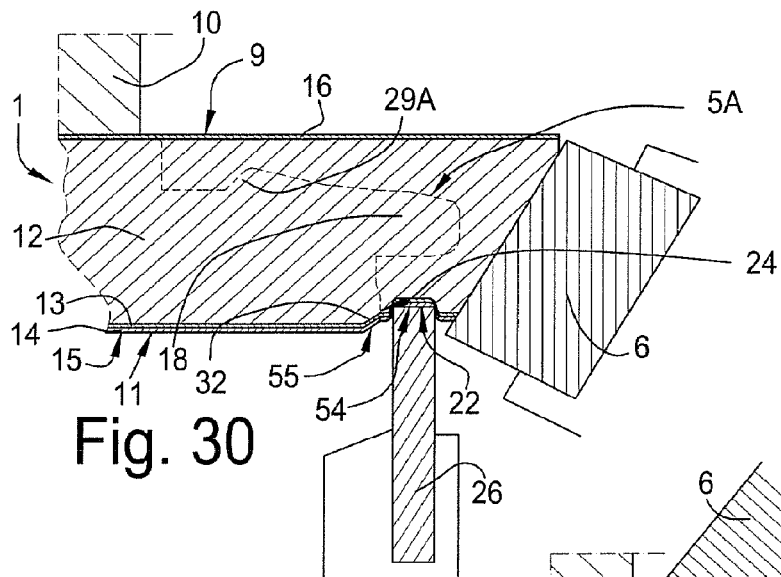
FIGS. 30 to 33 represent a method according, amongst others, the second aspect of the invention, in views similar to those of FIGS. 4 through 7.
Figure 31:
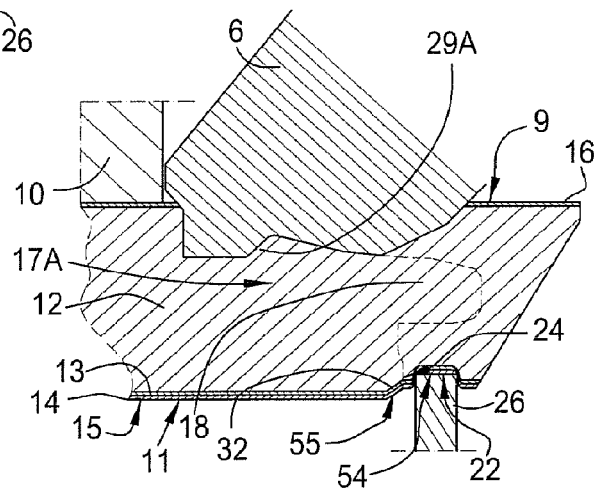

In FIGS. 29A and 29B, in dashed lines 51A 51B, another variant is represented. This variant can be realized in a simple manner with a minimum of milling tools.

In the forms of embodiment of the eleventh aspect, as represented in FIGS. 13 and 25 to 29, it is clear that by providing a recess 48 in the lower lip 20, this latter can be divided into a flexible outer portion 52, and a less flexible innermost portion 53, which, in respect to the panel, is situated proximally from the recess 48. This dividing provides for that the flexibility of the outermost portion 52 that is obtained by the invention is as good as independent from the depth G of the groove 19, such that novel possibilities are obtained for designing coupling parts 17A-17B. Herein, embodiments where the depth G of the groove 19 is larger than half the thickness T of the floor panel 1 are not excluded, as shown in FIG. 29B.

FIG. 29B depicts a vertically extending first plane V1 and a vertically extending second plane V2 generally parallel to the vertically extending first plane V1. According to the embodiment of FIG. 29B, a floor panel 100 having a core 112, a decorative upper surface 111 and at least two opposite edges, wherein said two opposite edges are provided with a first profiled edge area 105A and a second profiled edge area 105B respectively. Further, according to the embodiment of FIG. 29B, said first and second profiled edge areas 105A-105B comprises:

a first coupling part 117A and a second coupling part 117B; said first coupling part 117A comprising a first lateral protrusion 118 on said first profiled edge area 105A; said second coupling part 117B comprising a groove 119 limited in an upward direction at least partially by an undercut 178 defined by an upper lip 121 of the second profiled edge and limited in a downward direction by a lower lip 120, the first and second coupling parts 117A-117B, in a coupled condition of two of such floor panels 100A-100B, having first contact surfaces 101 to lock in a vertical direction RV;

locking parts 129A-129B, which, in a coupled condition of two of such floor panels 100A-100B, having second contact surfaces arranged to lock in a horizontal direction RH; said second contact surfaces of said locking parts 129A-129B including a first horizontally locking surface 102A on said first coupling part and a cooperating therewith a first horizontally locking surface 102B on said lower lip 120 of said second coupling part 117B; wherein:

in a coupled condition of two of such floor panels, said decorative upper surface of said second profiled edge area having a distal end along a vertically extending first plane V1;

said first profiled edge area 105A is essentially located inwardly from said first plane V1 (or in other words, towards a center of such a floor panel 100A in the horizontal direction RH from said first plane V1) and underneath said decorative upper surface 111 of said floor panel 100A; said first profiled edge area 105A further comprising an upwardly extending surface 180 above said first lateral protrusion 118; said upwardly extending surface 180 defining a point 182 along said upwardly extending surface that is furthest away from a tip 184 of said first lateral protrusion 118 in a proximal direction; said point 182 defined along a vertically extending second plane V2 generally parallel to the vertically extending first plane V1; wherein said second profiled edge area 105B is located substantially outside of the first plane V1 (or in other words, away from the center of such a floor panel 100A in the horizontal direction RH extending beyond said first plane V1);

said first lateral protrusion 118 protrudes distally from said second plane V2 and extends a first length Q in a first direction R1 from said second plane V2 towards said tip 184; wherein said lower lip 120 is located substantially distally from said first plane V1 and extends for a second length L beyond said first plane V1 in a second direction R2 opposite said first direction R1; said first length Q being substantially less than said second length L; said lower lip 120 having an upper side 186 and a bottom side 188, wherein said upper side 186 comprises a lowermost zone 190 defining a smallest vertical distance P between said upper side 186 of the lower lip 20 and a lower side 109 of the panel;

the first coupling part 117A comprises a second lateral protrusion 192;

said coupling parts 117A-117B and said locking parts 129A-129B are arranged to couple two floor panels 100A-100B by bringing the floor panels 100A-100B towards each other, wherein said first profiled edge area 105A is arranged to be brought down to said second profiled edge area 105B and coupled therewith, wherein in a coupled condition said first lateral protrusion 118 engages said undercut 178 and said second lateral protrusion 192 is positioned in a recessed portion 148 of said second profiled edge area 105B at the distal end of said lower lip 120;

said first and second profiled edge areas 105A-105B further comprise cooperating third contact surfaces; said third contact surfaces comprising at least a surface 103A along a contour 194 of said first coupling part 117A between a tip 196 of the second lateral protrusion 192 and said first horizontally locking surface 102A and at least a surface along a contour 198 of said second coupling part 117B between said cooperating first horizontally locking surface 102B on said lower lip of said second coupling part 117B and the bottom side 188 of said lower lip 120; wherein said third contact surfaces 103A-103B extend completely above said lowermost zone 190 of the upper side 186 of said lower lip 120; and said first lateral protrusion 118 and second lateral protrusion 192 are formed mainly from a material of said core, a portion of the core 112, at the location of said second lateral protrusion 192, extending vertically underneath said third contact surfaces 103A-103B.

It is noted that according to the invention, it is not excluded that several recesses 48 are provided. Also, it is not excluded that one or several of these recesses 48 are provided with a compressible material, such that the higher flexibility of the lower lip 20 obtained by means of the recess 48 is maintained at least partially.

Further, it is noted that according to the eleventh aspect of the invention, the thickness T also must be larger than 15 mm, and still better larger than 20 mm. It is in particular with such thickness values that the invention shows its advantages.

Although the forms of embodiment of FIGS. 13 and 28 are described as particularly useful for solid wood, and although FIGS. 25-27-29A-29B represent the use of a core 12 or core 112 of plywood, and FIG. 26 represents a form of embodiment in which the core is composed of lamellae 50, it is noted that the eleventh aspect of the invention is not restricted to these kinds of material. All technical designs described by means of these forms of embodiment can also be employed in floor panels that are manufactured of other materials, thus also, for example, in floor panels with a core on the basis of wood fibers and/or wood chips, for example, MDF or HDF board.

It is clear that the importance of the invention according to the eleventh aspect increases as the thickness T of the panels 1 increases. Then the distance P preferably also increases. So, for example, this distance then is larger than 0.3 times, and still better larger than 0.4 times the thickness T of the floor panel.

As aforementioned, the floor panels 1 of FIGS. 25, 26, 27, 29A, and 29A preferably possess a top layer 15 of solid wood, more particularly of a better or noble kind of wood. It is mostly with floor panels 1, of which at least the upper side or top layer 16 consists of solid wood, that it is interesting to keep the profiled edge regions 5A-5B compact, as this considerably restricts the loss of expensive solid wood when realizing the profiled edge regions 5A-5B. However, it is not excluded to also apply said eleventh aspect in floor panels 1, of which the top layer 15 is composed differently and, for example, comprises a printed and resin-impregnated carrier sheet. Also in floor panels that are composed of such materials, the restriction of material loss is of importance.

It is clear that this eleventh aspect can be employed in floor panels 1 with coupling parts 17A-17B of any shape. As becomes clear from the examples, these coupling parts 17A-17B and locking parts 29A-29B preferably are made such that they allow that two floor panels 1 are laterally interconnected or coupled by one or several of the following possibilities:

coupling by shifting the floor panels 1 with a substantially horizontal movement towards each other;

coupling by turning the floor panels 1 into each other along their edges;

coupling by bringing the floor panels 1 towards each other with a substantially vertical movement, wherein preferably, when coupling two of such floor panels 1, the lower lip 20 is forced to perform a bending-out at least during a part of the coupling movement made therein.

FIGS. 30 to 33 illustrate successive steps in a method according to, amongst others, the second aspect of the invention. As noted in the introduction, this second aspect substantially relates to the fact that during the realization of boards of laminate material, from which the floor panels are made, at least one impression 54 is provided in the laminate material by means of a press treatment, after which this impression 54 is employed as a guiding groove 22 in further treatments.

In the example of FIGS. 30 to 33, such impression 54 is employed for guiding panels 1 that are already obtained from a larger board of laminate material, while they are provided with profiled edge regions 5A-5B at least at two opposite sides 3A-3B and/or 4A-4B.

In the represented example, the impression 54 is formed in the upper side or decorative side 11 of the panel 1 and is not only this impression 54 formed during the pressing of the boards, but also one or more other impressions 55 are performed, which are determining for the appearance of the decorative side 11. In the example, this relates to impressions 55 that are intended for forming a deepened edge region, such as a beveled edge 32, at the upper edge 24 of the floor panel 1.

FIGS. 30 to 33 represent how successively, by means of the so-called "continuous milling", the profiled edge regions 5A-5B are formed at least at two opposite sides 3A-3B and/or 4A-4B. Herein, the edge areas 5A-5B of the panel that have to be profiled are moved over several cutting tools 6, thus, in this case milling cutters, while the panel 1, as represented in the FIGS. 30 to 32, therein is guided by moving it with the impression 54, which is employed as a guiding groove 22, over a guiding portion 26.

Figure 32:
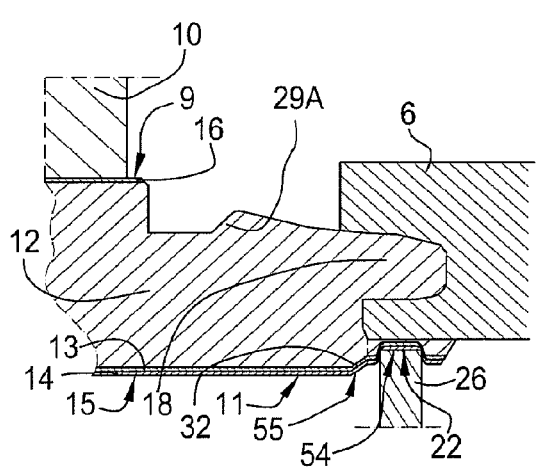
Figure 33:
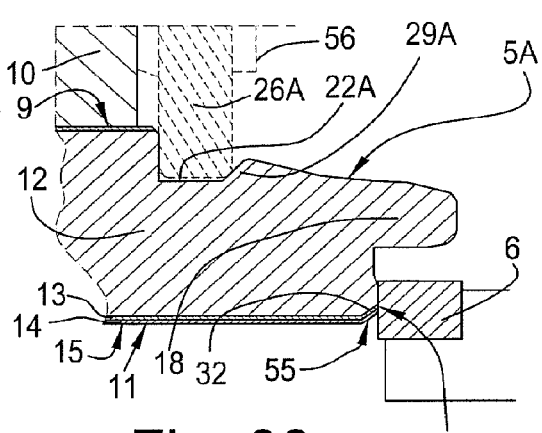

FIG. 33 represents how the guiding groove 22 present in FIG. 32 is removed in the last milling treatment. It is noted that the panel 1 can be moved over the guiding portion 26 up to directly in front of the cutting tool 6 of FIG. 33, such that this treatment, too, can be performed accurately.

Various alternatives are possible for further optimizing the guiding of the panel 1, such that a guiding effect still remains after the guiding groove 22 has already been milled away. According to a first alternative, another guiding groove and another guiding portion can be employed to provide for an additional guiding, such as, for example, a guiding groove 22A in the lower side of the panel 1, which in this case is realized by the milling treatment from FIG. 31, however, according to variants, might also be formed in other ways, such as by impressing. This guiding groove 22A then can cooperate with the guiding portion 26A represented in dashed line 56. According to a second alternative, for the guiding groove 22 use might be made of an impression 54 or other recess, which is situated in a portion that is not to be removed, but is present in the decorative side 11 at a location where it fulfills a permanent decorative function, such as, for example, the function of the imitation of a joint or the like.

It is noted that the provision of a guiding groove in the upper side of a laminate board or laminate panel from which a final floor panel is produced, and employing this guiding groove for guiding the laminate panels or floor panels during the performance of a treatment, as such also forms an independent inventive aspect. Hereby, a novel range of possibilities is obtained for guiding floor panels during processing.

Still another independent inventive aspect consists in that, when realizing the panels, at least two guiding grooves are employed, which preferably are utilized alternate, more particularly successively. Hereby, the advantage is created that a better guiding can be provided, as, when one of the guiding grooves can not be utilized or is no longer available, then a guiding by means of the other guiding groove can be provided. These guiding grooves may be situated at the same side, for example, upper side or lower side of the panel, the boards, respectively, but may also be present at the upper side, lower side, respectively, of such panel. The embodiment of FIGS. 30 to 33 forms an example of this latter.

FIGS. 34 and 35 show a method with the characteristics of, amongst others, the third aspect of the present invention. Herein, it is started from a board 57, which, in this case by means of a cutting device 58 comprising several saws 59 as cutting elements, is divided into several panels 1. The particularity of the method according to the third aspect of the invention is that it further, on the one hand, comprises the step of forming, prior to dividing into panels 1, a mechanical portion 60 at the board 57, and, on the other hand, comprises the step of employing this mechanical portion 60 for guiding the board 67, or the panels 1 into which the board 57 has been divided, in further treatments.

In the represented example, the provided mechanical portion 60 consists of a groove, more particularly a guiding groove 22, which is provided in the lower side 9 of the board 57.

The represented board 57 from which is started, has a decorative side 11 showing a pattern 61, more particularly formed by a print and/or impression. The pattern 61 can be observed by means of cameras or other sensors 62, such that the mechanical portion 60 can be applied in the board 57 in function of this pattern, more particularly in function of the location of this pattern, which allows to provide the mechanical portion 60 at a fixed position in respect to this pattern 61. Providing such mechanical portion 60, more particularly such guiding groove 22, at the right location is described further in detail.

As FIG. 35 represents, the mechanical portion 60, or in this case, thus, the guiding groove 22, can be provided at various possible locations. According to a first important possibility, this can be provided in a portion 63 of the board 57 that is intended to be removed, either when dividing such board into panels 1, or when realizing possible profiled edge regions 5A-5B at the sides 3A-3B or 4A-4B of the floor panels 1. According to a second important possibility, represented by dashed line 64, the mechanical portion 60, in this case, thus, the groove, can also be provided at a location such that this portion 60 remains present in the floor panel 1, even after the manufacture thereof. Herein, the portion 60 performed as a groove can be situated such, that, by the utilization thereof, automatically an application of the first aspect of the invention is provided.

An application, where the mechanical portion 60, and more particularly the guiding groove 22, remains present in the final floor panel, is represented in the FIGS. 36 and 37. Herein, the method is applied when manufacturing laminate floor panels 1, which, at least in the example, comprise a core 12 with a top layer 15 comprising, on the one hand, a resin-impregnated carrier sheet acting as a decor layer 13, and, on the other hand, an overlay 14 situated above this decor layer.

At the lower side 9, the represented laminate floor panel 1 comprises a backing layer 16, which also consists of a resin-impregnated carrier sheet.

The laminate material of the example is of the type "DPL". The board of laminate material, from which is started, is formed by means of a press treatment between a lower press plate 65 and an upper press plate 66. As represented, the upper press plate 66 comprises projections 67 that are intended for forming, in the upper side of the board 57, the impressions, in this case deepened edge regions, which determine the appearance of the decor side 11. The lower press plate 65 also comprises projections 68. These latter, however, are intended for forming impressions 54, or mechanical portions 60, which can be employed for guiding the board 57, or the panels 1 finally obtained from the board 57, in further treatments. It is important to accurately align the lower and upper press plate 65-66 in respect to each other, such that, for example, the distance R of the center line of the impression 54 or mechanical portion 60 to the upper edge 24 of the panel 1 to be formed and/or the distance Z of this center line to the nearby edge of the cut 69 to be formed is precisely known and/or is constant.

As represented in FIG. 37, the impressed guiding groove 22 or the mechanical portion 60 can be utilized when dividing the board 57 into panels 1. Herein, in the example, a wheel is employed as a guiding portion 26 that engages in the guiding groove 22 or the mechanical portion 60. As the distance Z between the guiding portion 26 and the saw 59 is precisely known, it is possible to perform the cut 69 with a narrow tolerance at the predetermined location in the board 57.

It is clear that the mechanical portion 60 that is formed by means of the aforementioned press treatment, can also be advantageously applied in combination with a method according to the second aspect of the invention. In particular, it is of importance herein that the distance R is well-known and/or constant, such that the profiled edge regions 5A-5B are realized with narrow tolerances on the locations provided to this aim.

The aforementioned guiding groove 22 in FIG. 34 preferably is realized by means of a tool, such as the schematically represented saw 59, which can be moved along a path. In order to obtain that the guiding groove 22 is provided at a fixed position in respect to the pattern 61, preferably in a preceding step a mutual adjustment, more particularly alignment, is performed between this tool and the board 57.

It is clear that such adjustment can be performed in various manners. As schematically indicated in FIG. 34, this is possible, for example, by providing the board 57 on a, not represented, movable table, detecting the pattern 61 or certain marks in the pattern by means of the cameras 62 or other sensors, and subsequently controlling the movable table such that this latter takes a well-defined position in respect to the path of the saw 59A, in such a manner that, after the guiding groove 22 is realized by means of the movement of the saw 59A, this guiding groove 22 is aligned and is situated at a well-defined location in respect to the cuts 69 to be formed. Herein, the movable table preferably can perform different movements, such that the board 57 provided thereupon can perform a shifting movement S as well as a rotating movement W, both in the plane of the board 57.

After the guiding groove 22 has been provided, the board 57 can be moved to the cutting device 58 for effectively providing the cuts 69, wherein the board 57 is guided in that the guiding portion 25 engages in the guiding groove 22.

Figure 38:
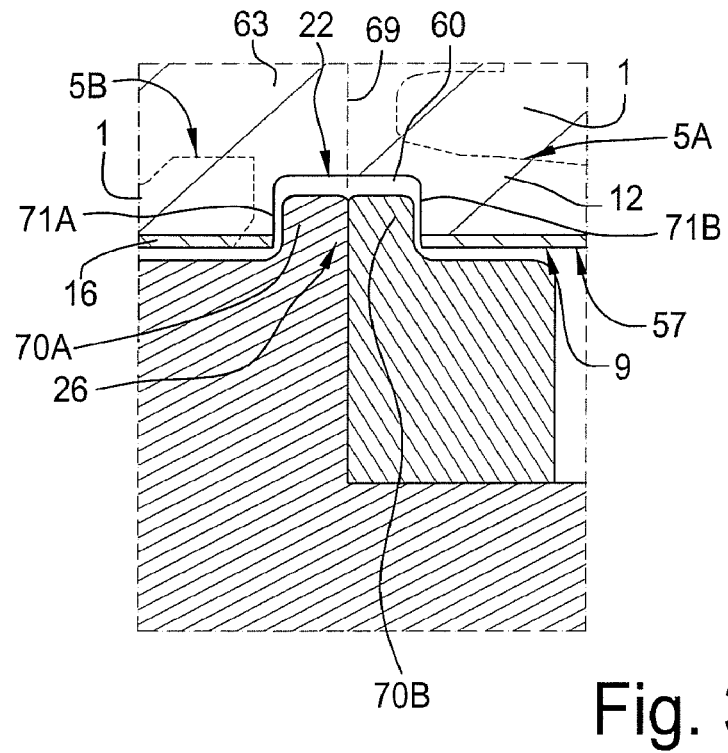
FIGS. 38 and 39, at a larger scale, represent the region indicated as F38 in FIG. 35.
Figure 39:
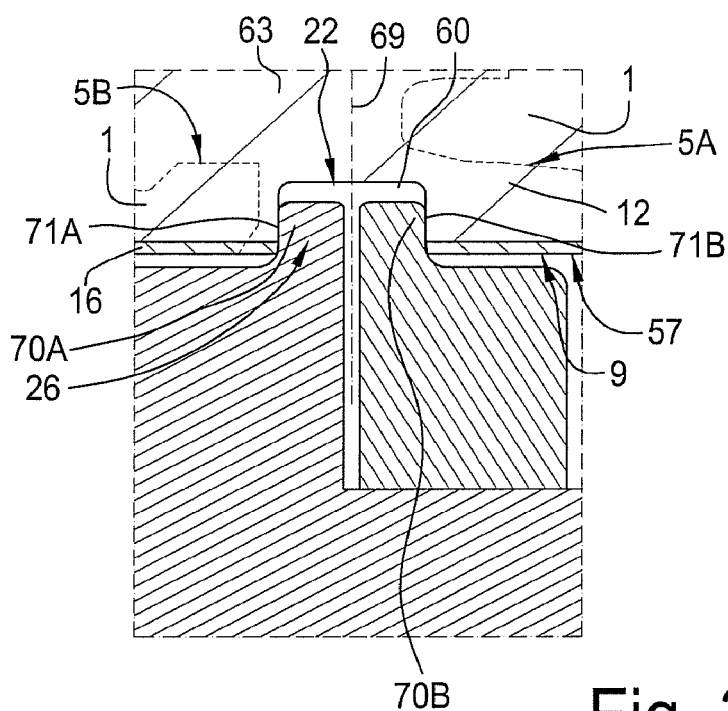

FIGS. 38 and 39 illustrate a particular form of embodiment of the aforementioned guiding portion 26, which, in the represented example, consists of two portions 70A-70B, is designed such that it can be switched between an active position, represented in FIG. 39, and a non-active position, represented in FIG. 38, wherein in the non-active position at least laterally a certain freedom of movement exists between the guiding portion 26, the portions 70A-70B, respectively, and the guiding groove 22 of a board 57 cooperating with the guiding portion 26, whereas in the active position this freedom of movement is reduced, or even annulled. Utilizing such guiding portion in a method with the characteristics of the third aspect is of particular importance. Namely, this allows a certain tolerance of the position of the board 57 when supplying the latter to the cutting device 58. In this supplying procedure, the guiding portion 26 in fact can be in the non-active position, such that the board 57 can more easily be brought with its guiding groove 22 over the guiding portion 26, after which the guiding portion 26 can be set to the active position. As a result, the possible faulty position when supplying the board 57 is remedied, such that a precise dividing of the board 57 can be obtained.

As represented in FIGS. 38 and 39, the guiding portion 26 preferably is an element that is variable in width. In the active position represented in FIG. 39, both portions 70A-70B come into contact with the walls 71A-71B, or are at least positioned very closely against them, whereas in the non-active position represented in FIG. 38, the contact between at least one of the portions 70B and the walls 71B is interrupted, such that a lateral freedom of movement is created between the guiding portion 26 and the guiding groove 22 or the walls 71A-71B thereof.

The adjustability between the non-active and the active position, or, in other words, the width variability, of the guiding portion 26 has been obtained here in that both portions 70A-70B can move away from each other and/or towards each other, more particularly with a shifting movement.

It is noted that according to the third aspect of the present invention, the adjustability of a guiding portion 26 can have been obtained in any manner, so, for example, an element that is variable in width also may be obtained by pivoting the portions 70A-70B relative to each other around a common hinge.

According to a not represented possibility, such guiding groove may also be provided in transverse direction at the board 57, for example, in the case that such board also has to be divided in transverse direction.

Figure 40:
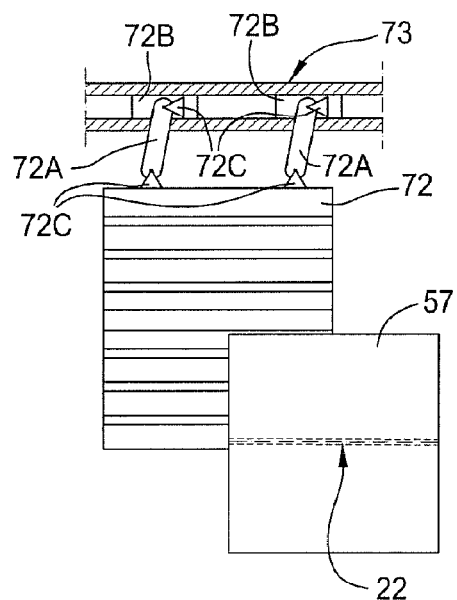
FIGS. 40 to 43 schematically represent several steps of a method fulfilling the third aspect of the invention.
Figure 41:
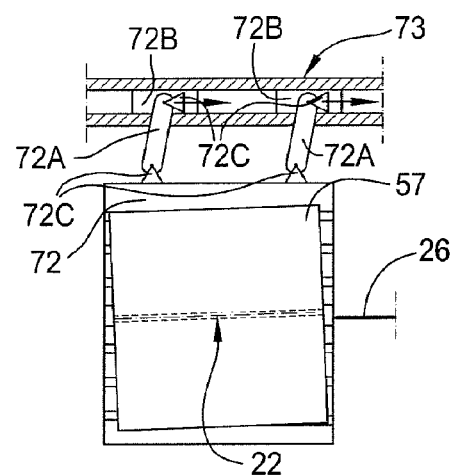
Figure 42:
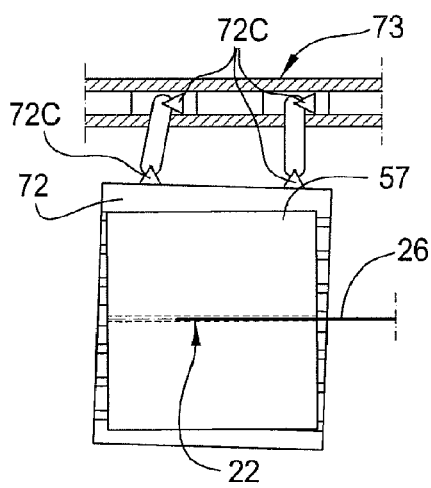
Figure 43:
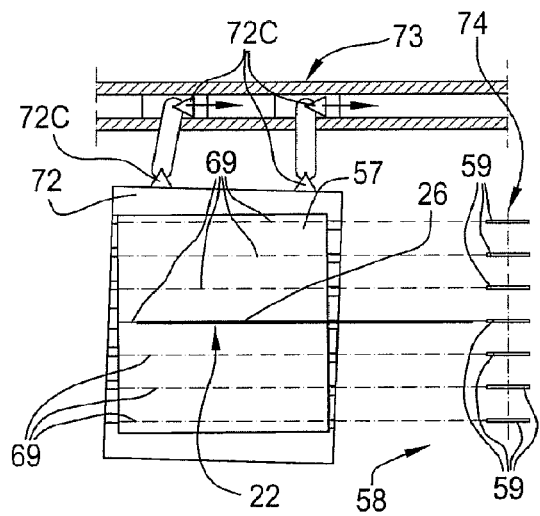

FIGS. 40 to 43 represent another important form of embodiment of the third aspect of the present invention, which further enhances the precision of such method. According to this form of embodiment, as schematically indicated in FIGS. 40 to 43, a transport device is employed for transporting the board 57 through the cutting device 58, which comprises at least a transport element 72 and a guide 73 for this transport element 72, whereby the transport element 72 is adjustable between a first condition, in which it has a certain freedom of movement that allows an adjustment in respect to the aforementioned guide 73, and a second condition, in which this freedom of movement is reduced, if not annulled. In the represented example, the transport element 72 is a movable carriage with a table, at which a board 57 can be attached by means of vacuum or another technique, wherein this carriage, by means of arms 72A, is attached at portions 72B that are movable in the guide 73. In order to be able to provide for the aforementioned freedom of movement, the arms 72A are connected to the carriage and the portions 72B by means of schematically indicated hinge points 72C, wherein these hinge points 72C, for example, are designed such that they, in the aforementioned first condition, allow at least a minor hinge movement, whereas in the second condition, they are blocked. It is clear that such lockable hinge points 72C can be realized in various manners and that the construction thereof is within the knowledge of a person skilled in the art. The method then comprises the following steps:

fixing the board 57 on the transport element 72, as schematically indicated in FIGS. 40 and 41;

contacting the board 57, which is fixed on the transport element 72, with the aforementioned guiding portion 26, while the transport element 72 is in the first condition, until, by this contact, at least a certain adjustment of the board 57 has taken place, as schematically represented in FIG. 42;

subsequently bringing the transport element 72 into the second condition, which, in the represented example, means that the aforementioned hinge points 72C are brought into a locked condition; and performing the cutting treatment, wherein at least during a part of this treatment the transport element 72 is maintained in the second condition, as represented in FIG. 43.

The aforementioned transport device may have any form. So, for example, a vacuum table can be employed as a transport element 72, upon which the board 57 is fixed by means of negative pressure. It is noted that "fixing the board" is to be interpreted in the broadest sense. So, the board 57 can be provided upon as well as below the transport element 72, in the last case, for example, by suspending the board or suctioning it on. Further, it is clear that the aforementioned freedom of movement or the reduction thereof also can be obtained in any manner. So, for example, may the transport element 72 be connected to the guide 73 by means of any hinge elements, which in the first condition allow a rotational movement of the transport element 72 in respect to the guide 73, whereas in the second condition, these hinge elements are fixed, such that possible angular rotations performed by the transport element 72 when contacting the board 57 with the guiding portion 26 are maintained when dividing the board 57 in the cutting device 58. When performing a method according to this form of embodiment, it is obtained that the board 57, after providing, in its adjusted position, the guiding groove 22, can be manipulated and possibly stocked, while it is still possible to obtain an accurate dividing.

Figure 44:
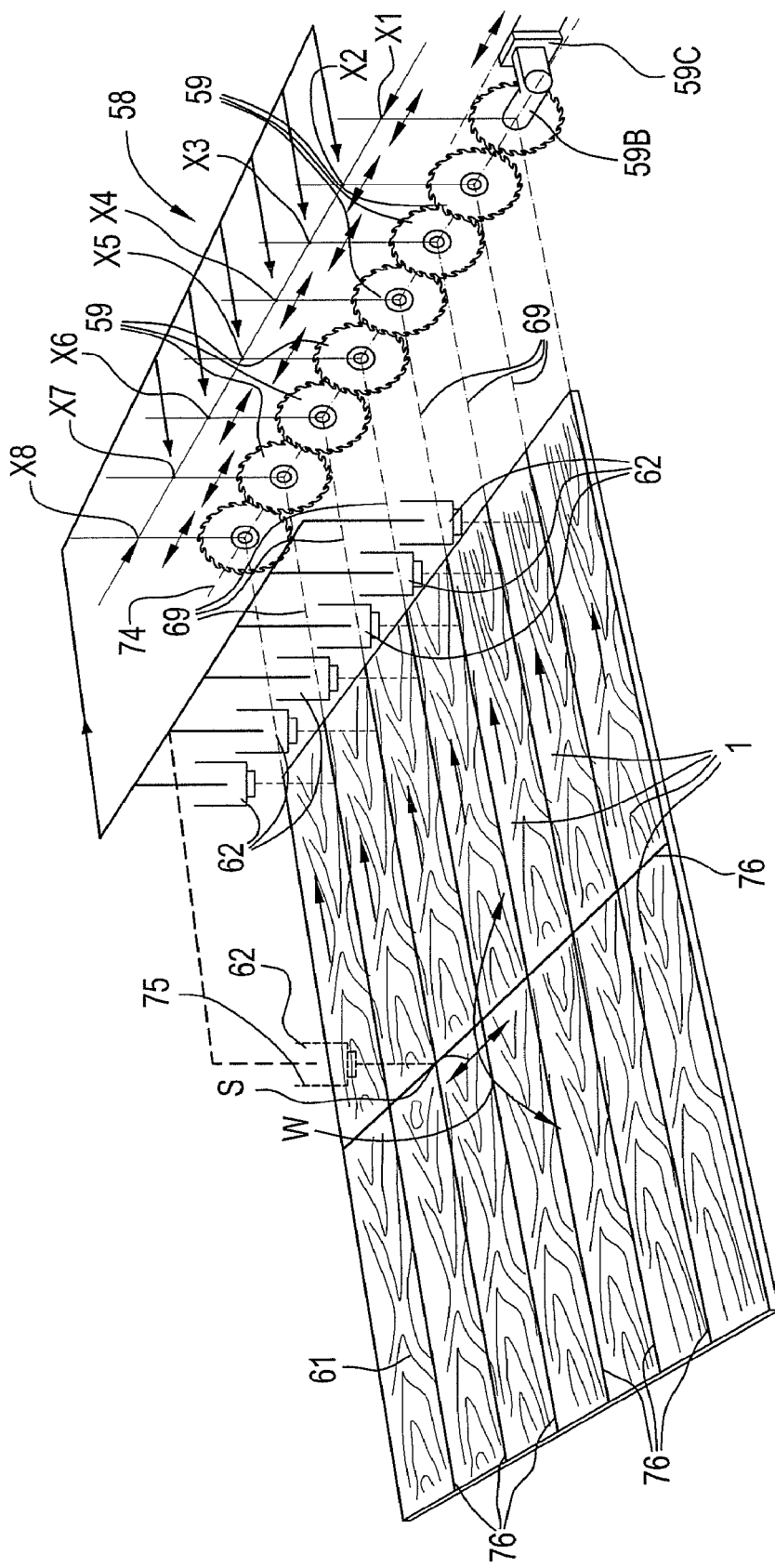
FIG. 44 represents a method according to the fourth aspect of the invention.

FIG. 44 illustrates a method for manufacturing floor panels 1 with the characteristics of the fourth aspect of the invention. Herein, a board 57 having an upper side, more particularly a decorative side, with at least a pattern 61 formed by a printing process, is divided by means of the cutting elements or saws 59 of a cutting device 58 into panels 1, from which by means of further treatments actual floor panels 1 are to be formed. Herein, cuts 69 are formed in function of the aforementioned pattern 61, in that the cutting elements 59, which perform cuts 69, are adjusted in a manner independent from each other in function of this pattern 61.

In the example of FIG. 44, the positions X1, X2, X3, X4, X5, X6, X7 and X8 of the saws 59, which are employed for forming the eight substantially parallel, longitudinal cutting lines 69, are adjusted independently from each other. To this aim, the saws 59 are displaced along their axis 74 on the basis of observations that are performed at the upper side of the respective board 57, distributed over the width of the board 57 to be divided. In the example, these observations are performed automatically by means of cameras or other sensors 62, which are also distributed over the width of the board 57 to be divided. It is noted that the cutting elements 59 on the outermost positions X1 and X8 additionally can be equipped with a so-called machining device or also may consist solely of a machining device processing the edge of the board 57.

The independent axial displacement of the cutting elements, in this case the saws 59, can be performed in any manner. As schematically represented, to this aim each cutting element 59 can be equipped with its own drive element, such as an electric motor 59B, wherein the whole 59-59B is axially adjustable by means of a drive element 59C. In FIG. 44, the motor 59B and the drive element 59C are depicted solely for the first cutting element 59, however, it is clear that these then, according to the fourth aspect of the invention, are present at several cutting elements 69, and preferably even at each of these cutting elements 59.

In the represented example, per longitudinal cut 69 to be performed, one camera 62 is employed. However, it is not excluded that several cameras 62 per cut 69 are employed, or also less cameras than cuts 69 are present, wherein then at least three cutting elements 59 are axially adjusted independently from each other, whereas the positions of the remaining cutting elements then are determined and adjusted in another manner, for example, by interpolation.

It is noted that, although the employed cameras or sensors 62 in the example are represented on one line, one or more of these cameras 62 can be shifted, for example, to a position in which these cameras 62 fulfill still other functions. So, for example, a camera 62 is represented in dashed line 75, which camera at the same time allows to observe the respective longitudinal as well as the respective transverse cutting line 69. Such arrangement allows an adaptation to a possible stretching in width as well as to a possible stretching in length manifesting itself in the pattern 61. Moreover, it allows to control a possible preceding adjustment of the board 57 by means of several, preferably at least three, of the present cameras 62, such as described by means of FIG. 34.

Further, it is noted that in the pattern 61 of the example of FIG. 44, a reference line 76 per cut 69 to be realized is present. The presence of reference lines 76 or other reference marks simplifies the automatic observation of the pattern 61.

It is also not excluded to perform various of the necessary detections with a common camera or other sensor. So, for example, may a camera be applied that takes an overall image of the pattern of the entire board, from which subsequently the positions of the cutting elements 59 are derived, for example, in function of the observed locations of the reference lines 76 or in function of the recognition of a pattern. Another possibility consists in applying a line scanner, which is active in transverse direction to the reference lines 76 and in this manner can determine the locations of these reference lines.

FIGS. 45 and 46 represent a method showing, amongst others, the characteristics of the sixth aspect of the invention. Herein, panels 1 are transported through a processing machine or continuous machine 2 by means of a first mechanical carrier element 77 and a second mechanical carrier element 78. Herein, the panels 1, at their opposite flat panel sides, thus, at the panel side formed by the decorative side 11, as well as at the lower side 9, come into contact with an carrier element, 77-78, respectively. This contact is indicated by reference 79.

As becomes clear from FIGS. 45 and 46, both mechanical elements 77-78, at the height of these contact surfaces 74, are freely movable in a direction transverse to the respective flat panel side 9-11 and can both carrier elements 77-78 adapt themselves in the aforementioned direction to the location of each floor panel 1. So, for example, does the mobility of both carrier elements in the arrangement of the example allow that also the, seen in transfer direction, second floor panel 1 that adopts another location at the height of the carrier elements, can be transported smoothly, as the carrier elements adapt themselves in such a manner that the contacts 79 still can be formed.

As becomes clear from FIG. 47, the respective panel 1 has a bending K, as a result of which it takes another location at the height of the carrier elements 77-78. As aforementioned, this panel 1, by applying a method according to the sixth aspect of the invention, without a problem still can be provided with profiled edge regions 5A-5B. The mobility of the mechanical carrier elements 77 and 78, namely, is such that they allow to form the contacts 79 with the respective panel sides 9 and 11 over a distance that is larger than the bending K, measured at the height of these contact surfaces 79.

In the present case, the aforementioned mobility is obtained in that both mechanical elements 77-78 comprise belts 8, which, by means of travel wheels 80, are pressed into the direction of said flat panel sides 9 and 11. It is clear that such pressing-on can be realized in various manners. So, for example, may the travel wheels 80 be performed as pressing rollers that are borne in elements, wherein a spring system provides for that these elements, with the pressing rollers borne therein, are pressed against the respective side of the elements 77-78.

From FIGS. 45 to 47, it becomes clear that the illustrated method also shows the characteristics of the seventh aspect of the invention.

It is noted that the panels 1, as is evident from FIG. 47, are provided with a guiding groove 22, that the panels 1 are guided by means of a guiding portion 26 that engages in this guiding groove 26 and that, while the panels 1 are transported through the processing machine 2, they are pressed, in the immediate proximity of their edge regions 5A-5B to be profiled, onto a sliding shoe 81. As schematically represented with the springs 82, the two pressure shoes 10 can be moved independently from the guiding portion 26. Moreover, the guiding portion 26 is fixedly installed in respect to the frame 83 of the processing machine 2.

Figure 48:
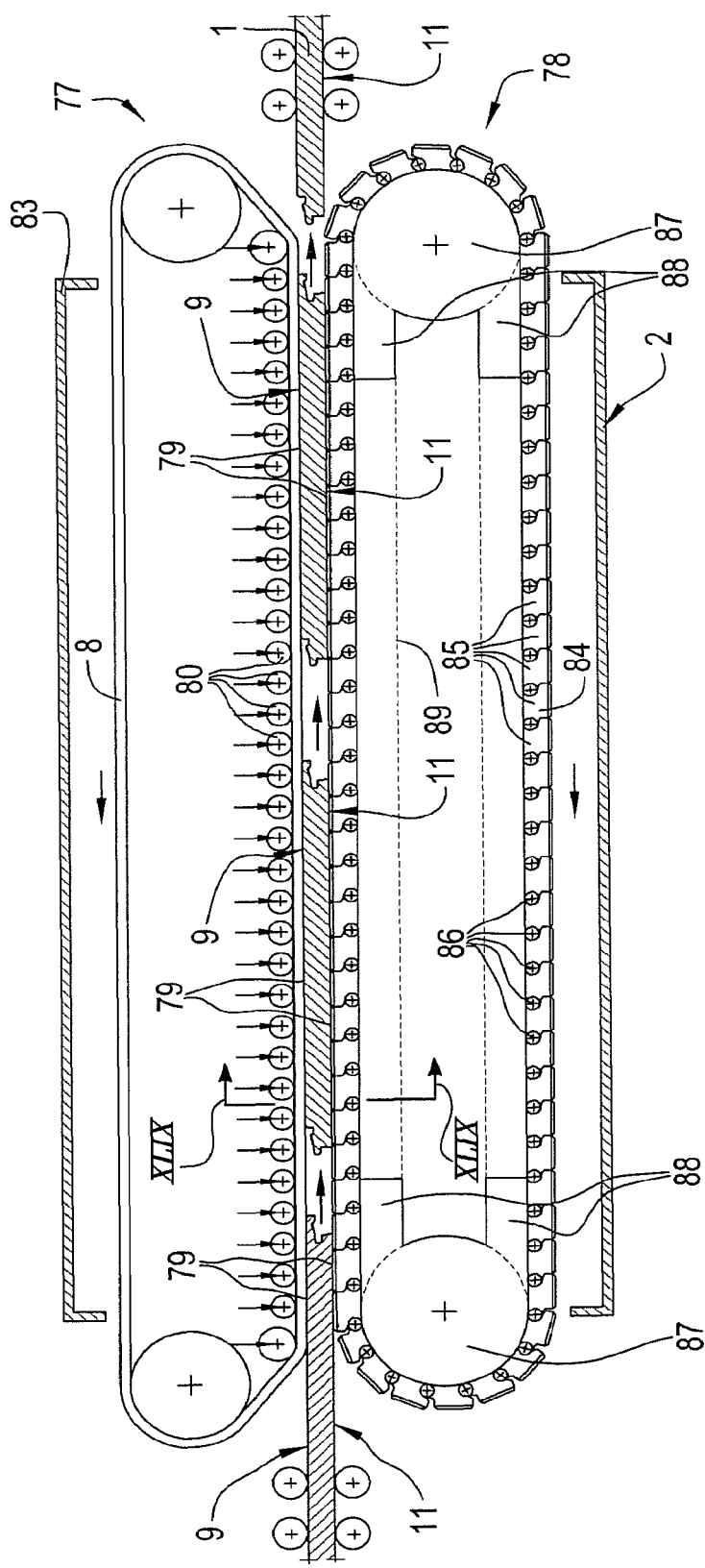
FIGS. 48 and 49 represent a method with the characteristics of, amongst others, the first aspect of the invention, whereby

With reference to FIG. 48, it is further noted that the method according to, amongst others, the first aspect of the present invention does not exclude that, when forming the aforementioned profiled edge regions 5A-5B, use is made of a processing machine, of which the aforementioned first mechanical element 77 comprises a belt 8 and the second mechanical element 78 comprises a conveyor chain 84. As represented, such conveyor chain 84 consists of links 85 that are connected to each other by means of hinges 86. The chain is reversed over minimum 2 return wheels 87 and, over a part of its path, is transported along a guiding element 88. As represented by the dashed line 89, it is not excluded that the guiding element 88 supports the chain over its entire length.

Figure 49:
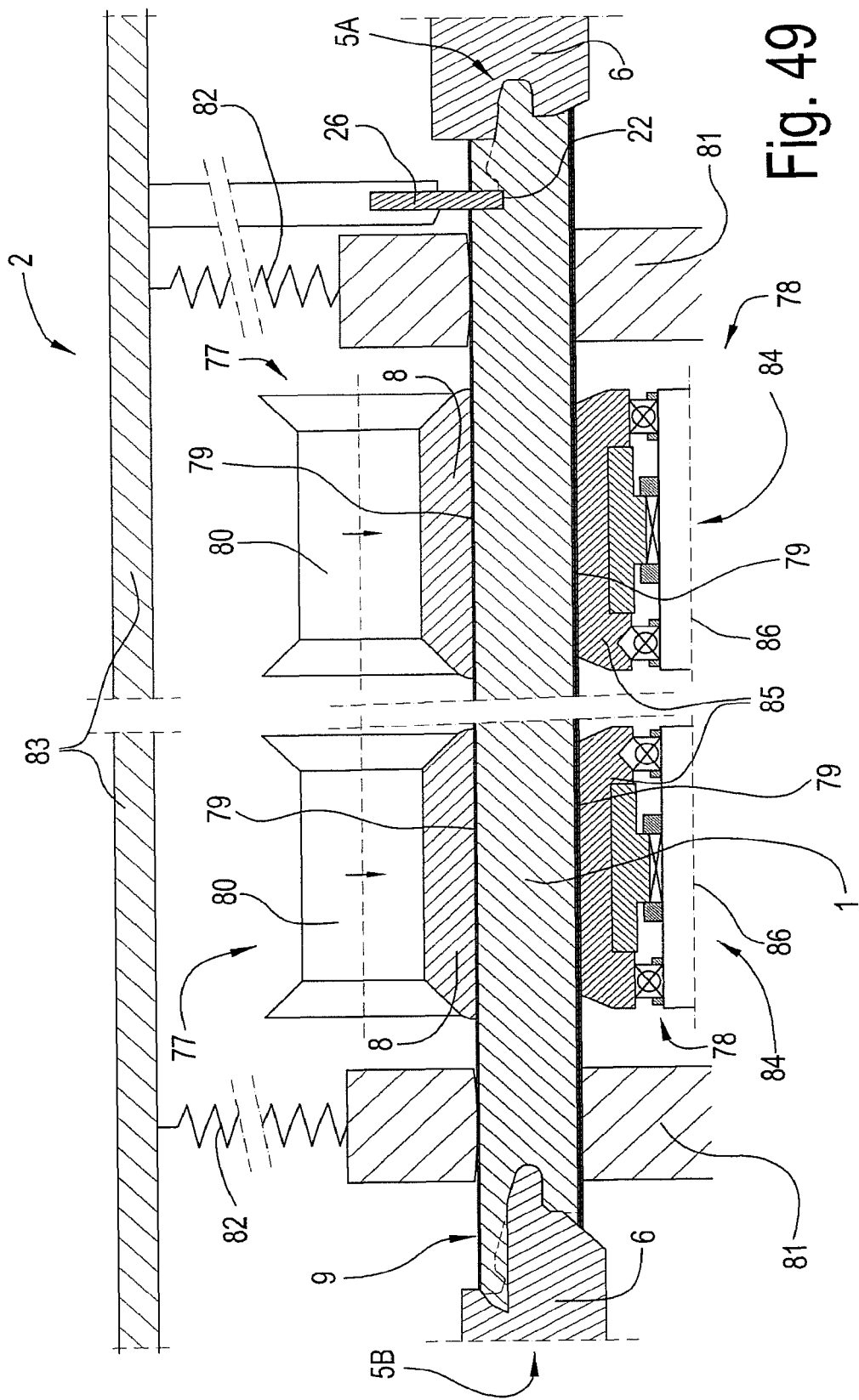

In combination with the conveyor chain 84, as represented in FIG. 49, also a fixedly installed guiding portion 26 is employed. This offers particular advantages when realizing profiled edge regions 5A-5B. Employing a fixedly installed guiding portion 26 in fact minimizes the influence of possible vibrations of the chain onto the panel 1 or generally offers a more stable transport and/or processing of the panels 1.

According to its twelfth aspect, the invention thus also relates to a method for manufacturing floor panels 1, wherein the method comprises at least the following steps:
  transporting panels 1 through a processing machine 2 by means of at least one carrier element 78 that consists of a conveyor chain 84;
  realizing profiled edge portions 5A-5B at least at two opposite sides 3A-3B, 4A-4B of the panels 1, while the panels 1, by means of the aforementioned conveyor chain 84, are transported through the aforementioned processing machine 2 and therein are moved with their edge regions 5A-5B to be profiled along cutting tools 6;
  guiding the panels 1 by means of a guiding portion 26, which engages in a guiding groove 22 provided in the panels 1 to this aim, while the panels, as aforementioned, are transported through the processing machine 2;
  with the characteristic that the guiding portion 26 is fixedly installed, more particularly is rigidly connected to a frame 83 of the processing machine 2.

In the case that at least one mechanical carrier element 78 is realized as a conveyor chain, the processing machine 2 shall preferably also be provided with additional means that minimize the risk of possible vibrations in the chain and/or enhance the stability of the transport or the treatments. Such vibrations or instabilities, namely, may lead to an inferior processing quality.

According to its thirteenth aspect, the invention also relates to a method for manufacturing floor panels 1, wherein the method comprises at least the following steps:
  transporting panels 1 through a processing machine 2 by means of at least one carrier element 77-78 that consists of a conveyor chain 84 formed by links 85;
  realizing profiled edge portions 5A-5B at least at two opposite sides 3A-3B and/or 4A-4B of the panels 1, while the panels 1, by means of the aforementioned conveyor chain 84, are transported through the aforementioned processing machine 2 and therein are moved with their edge regions 5A-5B to be profiled along cutting tools 6;
  with the characteristic that during the transport through the processing machine 2, at least a combination of two of the following three techniques is applied:
  the technique where the conveyor chain 84, at least over a portion of its path, is transported along a guiding element 88 and is pressed by means of magnetic forces against the guiding element 88;
  the technique where means are applied for minimizing the polygon effect of the conveyor chain 84;
  the technique where the panels 1 are laterally guided by means of a guiding portion 26 that engages in a guiding groove 22 provided in the panels, while they, as aforementioned, are transported through the processing machine 2.

It is clear that the invention also relates to the three possible combinations of two of the above techniques, as well as the combination of all above techniques.

When employing the first technique, in other words, the technique where the conveyor chain 84 is pressed upon the guiding element 88 by means of an attraction force, the risk of vibrations occurring due to upsetting of the conveyor chain 84 is minimized. It is clear that such attraction force can be realized in any manner by creating magnetic attraction forces or pressing forces between, on the one hand, certain parts of the conveyor chain 84, and, on the other hand, certain parts of the guiding element 88. In view of the fact that such magnetic systems for attracting conveyor chains against their guide are known as such, this will not be further discussed in detail. Preferably, the magnetic attraction takes place at guiding elements 88, or portions thereof that are situated at locations where the conveyor chain 84 runs onto the return wheels 87, leave these, respectively. It is, however, clear that the attraction can also be realized at other locations, for example, at the location of the guide 89 and/or at the location of the circumference of the return wheels 87.

When employing the second technique, in other words, the technique where the polygon effect in the conveyor chain 84 is minimized, also the occurrence of vibrations in the conveyor chain 84 is minimized. As aforementioned, the polygon effect occurs there, where the conveyor chain 84 is reversed over the return wheels 87. As a consequence of its link length, the conveyor chain 84 bends irregularly when reversing. This irregular reversion results in speed variations of the conveyor chain 84 and vibrations that can continue into other parts of the processing machine 2.

The aforementioned means for minimizing the polygon effect can consist of one or preferably a combination of at least two of the following precautions:

- the aforementioned guiding element 88, along which the conveyor chain is transported at least over a part of its path, is provided with a portion that subjects the conveyor chain 84 to a gradual transition movement towards and/or from the return wheel 87, such that the mutual bending of the links 85 during reversion of the conveyor chain 84 occurs more gradually, wherein the length of this transition movement preferably is shorter than two link lengths;
- the portion mentioned in the preceding paragraph that subjects the conveyor chain 84 to a gradual transition movement, is installed such that an arriving chain portion, previous to the transition movement, is supplied in a straight line by means of a theoretical path, the prolongation of which is situated outward of the pitch circle of the pertaining return wheel 87;
- the conveyor chain 84 comprises links 85 with a maximum link length of 100 millimeter;
- the return wheel 87 is such that minimum ten links 85 can be situated thereupon;
- the pitch circle of the return wheel 87 has a minimum radius of one and a half times the link length, and best is larger than two times the link length.

Compensating polygon effects in a conveyor chain is a technique that is known as such, in which respect reference is made to EP 1 304 302, however, the combination of this technique with the other techniques of the thirteenth aspect as such is novel and inventive.

When employing the third technique, namely, guiding the panels 1 by means of a guiding portion 26 that engages in said guiding groove 22, it is achieved that the panels 1 are positively guided during their transport through the processing machine 2. In a preferred form of embodiment, the guiding portion 26 is fixedly installed, more particularly rigidly connected to a frame 83 of the processing machine. This arrangement allows a very stable transport of the panels 1 and a correspondingly high quality of the treatments in the machine 2.

It is clear that combining the aforementioned stabilizing means can offer various synergetic effects.

It is, for example, clear that the application of the aforementioned second technique, namely, the application of means in order to minimize the polygon effect, preferably is combined with the aforementioned first technique, namely, employing a conveyor chain 84, which, by magnetic attraction, is retained on a guiding element 88. This is quite clear, when the aforementioned guiding element 88, over which the conveyor chain 84 is running, is provided with a portion that subjects the conveyor chain 84 to a gradual transition movement towards and/or from the return wheel 87, such that the mutual bending of the links 85 during reversing of the conveyor chain 84 occurs more gradually.

It becomes also clear from the thirteenth aspect that combining the first technique with the third technique may have many advantages for the stability of the transport and/or the quality of the processing of the panels 1.

When combining the second and the third technique, also an improvement of the stability of the transport and/or the quality of the processing of the panels 1 is obtained. Preferably, however, as aforementioned, all three aforementioned techniques are applied in combination, such that the risk of the occurrence of vibrations of which kind whatsoever is minimized.

It is clear that further all aspects of the present invention that relate to a method can be combined in an unlimited manner, wherein then advantageous synergetic effects may or may not occur.

Further, it is noted that the present invention also relates to floor panels that are realized according to any of the aforementioned manufacturing processes or by means of a combination of the above-described manufacturing processes.

It is also clear that the invention also relates to sets of floor panels that are packaged by the application of methods with the characteristics of the eighth and/or tenth aspect of the invention.

The invention claimed is:

1. A floor panel having a core, a decorative upper surface and at least two opposite edges, wherein said two opposite edges are provided with a first profiled edge area and a second profiled edge area respectively, said first and second profiled edge areas comprising:

a first coupling part and a second coupling part; said first coupling part comprising a first lateral protrusion on said first profiled edge area; said second coupling part comprising a groove limited in an upward direction at least partially by an undercut defined by an upper lip of the second profiled edge and said groove being limited in a downward direction by a lower lip, the first and second coupling parts, in a coupled condition of two of such floor panels, having first contact surfaces to lock in a vertical direction;

locking parts, which, in a coupled condition of two of such floor panels, having second contact surfaces arranged to lock in a horizontal direction; said second contact surfaces of said locking parts including a first horizontally locking surface on said first coupling part and cooperating therewith a first horizontally locking surface on said lower lip of said second coupling part;

wherein, in a coupled condition of two of such floor panels, said decorative upper surface of said second profiled edge area having a distal end along a vertically extending first plane;

wherein said first profiled edge area is essentially located inwardly from said first plane and underneath said decorative upper surface of said floor panel; said first profiled edge area further comprising an upwardly extending surface above said first lateral protrusion; said upwardly extending surface defining a point along said upwardly extending surface that is furthest away from a tip of said first lateral protrusion in a proximal direction; said point defined along a vertically extending second plane generally parallel to the vertically extending first plane; wherein said second profiled edge area is located substantially outside of the first plane;

wherein said first lateral protrusion protrudes distally from said second plane and extends a first length in a first direction from said second plane towards said tip; wherein said lower lip is located substantially distally from said first plane and extends for a second length beyond said first plane in a second direction opposite said first direction; said first length being substantially less than said second length; said lower lip having an upper side and a bottom side, wherein said upper side comprises a lowermost zone defining a smallest vertical distance between said upper side of the lower lip and a lower side of the panel;

wherein the first coupling part comprises a second lateral protrusion;

wherein said coupling parts and said locking parts are arranged to couple two floor panels by bringing the floor panels towards each other, wherein said first profiled edge area is arranged to be brought down to said second profiled edge area and coupled therewith, wherein in a coupled condition said first lateral protrusion engages said undercut and said second lateral protrusion is positioned in a recessed portion of said second profiled edge area at the distal end of said lower lip;

wherein said first and second profiled edge areas further comprise cooperating third contact surfaces; said third contact surfaces comprising at least a surface along a contour of said first coupling part between a tip of the second lateral protrusion and said first horizontally locking surface on said first coupling part and at least a surface along a contour of said second coupling part between said cooperating first horizontally locking surface on said lower lip of said second coupling part and the bottom side of said lower lip; wherein said third contact surfaces extend completely above said lowermost zone of the upper side of said lower lip; and wherein said first lateral protrusion and second lateral protrusion are formed mainly from a material of said core, a portion of the core, at the location of said second lateral protrusion, extending vertically underneath said third contact surfaces.

2. The floor panel of claim 1, wherein the first and second planes coincide.

3. The floor panel of claim 1, wherein said first contact surfaces locking in a vertical direction include an upper vertically locking contact surface formed at the upper side of said first lateral protrusion; said upper vertically locking contact surface being located entirely distally from said second plane and proximally from said tip of said first lateral protrusion.

4. The floor panel of claim 1, wherein, in a coupled condition of two of such floor panels, said decorative upper surfaces of two of such floor panels meet along said first plane.

5. The floor panel of claim 1, wherein said first and second coupling parts, including said first and second lateral protrusions, are formed entirely out of the material of said core.

6. The floor panel of claim 1, wherein the tip of said first lateral protrusion and the tip of said second lateral protrusion are vertically and horizontally offset, wherein the tip of said second lateral protrusion is located below and proximal from said first lateral protrusion.

7. The floor panel of claim 1, wherein said first horizontally locking surfaces are formed by substantially vertical portions of said first and second profiled edge areas.

8. The floor panel of claim 1, wherein said recessed portion is formed as a recess extending from the distal end of said lower lip inwardly.

9. The floor panel of claim 8, wherein said recess is performed in the form of a groove.

10. The floor panel of claim 9, wherein said groove is substantially parallel to the plane of the floor panel.

11. The floor panel of claim 1, wherein said floor panel possesses an overall thickness between 5 and 15 millimeters.

12. The floor panel of claim 1, wherein said floor panel has a thickness, and wherein said lower lip extends distally beyond said first plane over a length, measured in horizontal direction, wherein said length is smaller than the thickness of said floor panel.

13. The floor panel of claim 1, wherein said lower lip is made flexible and wherein, when coupling two of such floor panels, said lower lip is forced to perform a bending at least during a part of the coupling movement that is made therein.

14. The floor panel of claim 1, wherein said first horizontally locking surfaces extend in an inclined manner.

15. The floor panel of claim 1, wherein said floor panel has a thickness, wherein said lower lip comprises an upper side having a lowermost portion, and wherein said floor panel comprises a bottom side defining a plane, wherein the vertical distance from said lower most portion to said plane is larger than 0.2 times said thickness of said floor panel.

16. The floor panel of claim 1, wherein said core is chosen from the list consisting of:
a core consisting of lamellae;
a core consisting of solid wood;
a core consisting of synthetic material;
a core consisting of plywood;
a core on the basis of wood fibers and/or wood chips.

17. The floor panel of claim 1, wherein said floor panel comprises a top layer applied to said core, wherein said top layer is chosen from the list consisting of:
a top layer of solid wood;
a top layer comprising a printed carrier sheet.

18. The floor panel according to claim 1, wherein the first horizontally locking surface on said first coupling part and the first horizontally locking surface on said lower lip of said second coupling part are located proximally toward the first plane relative to the second horizontally locking surface of the first coupling part.

* * * * *